United States Patent
Shi et al.

(10) Patent No.: US 12,068,880 B2
(45) Date of Patent: Aug. 20, 2024

(54) DEVICE CONTROL METHOD AND DEVICE

(71) Applicant: Huawei Technologies Co., Ltd., Shenzhen (CN)

(72) Inventors: Wei Shi, Hangzhou (CN); Li Yi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 587 days.

(21) Appl. No.: 17/427,399

(22) PCT Filed: Dec. 11, 2019

(86) PCT No.: PCT/CN2019/124454
§ 371 (c)(1),
(2) Date: Jul. 30, 2021

(87) PCT Pub. No.: WO2020/155870
PCT Pub. Date: Aug. 6, 2020

(65) Prior Publication Data
US 2022/0103395 A1    Mar. 31, 2022

(30) Foreign Application Priority Data
Jan. 31, 2019    (CN) .......................... 201910101408.0

(51) Int. Cl.
*H04L 12/28*    (2006.01)
*G05B 15/02*    (2006.01)
*G05B 19/418*    (2006.01)

(52) U.S. Cl.
CPC .......... *H04L 12/2821* (2013.01); *G05B 15/02* (2013.01); *G05B 19/418* (2013.01); *H04L 12/282* (2013.01); *G05B 2219/2642* (2013.01)

(58) Field of Classification Search
CPC ... H04L 12/2821; H04L 12/282; G05B 15/02; G05B 19/418; G05B 2219/2642
See application file for complete search history.

(56) References Cited

U.S. PATENT DOCUMENTS

| 7,511,975 | B2 | 3/2009 | Hammond |
| 2002/0024332 | A1 | 2/2002 | Gardner |

(Continued)

FOREIGN PATENT DOCUMENTS

| CN | 1183860 A | 6/1998 |
| CN | 1879451 A | 12/2006 |

(Continued)

OTHER PUBLICATIONS

Yu, C. et al., "A Continuous Switching Mode Step-Down Switched-Capacitor Regulator With Inrush Current Control Scheme", 2016 International Symposium on Integrated Circuits (ISIC), Dec. 12-14, 2016, 6 pages.

(Continued)

*Primary Examiner* — Charles R Kasenge
(74) *Attorney, Agent, or Firm* — Slater Matsil, LLP

(57) ABSTRACT

A device control method is disclosed. When a first device and a second device are required to perform actions, a first instruction is sent to the first device, and a second instruction is sent to the second device after a first time interval; and when the first device, the second device, and a third device are required to perform actions, the first instruction is sent to the first device, the second instruction is sent to the second device after the first time interval, and a third instruction is sent to the third device after a second time interval, where the second time interval is greater than the first time interval, so that the third device performs a third action after a delay.

19 Claims, 48 Drawing Sheets

(56) References Cited

U.S. PATENT DOCUMENTS

| | | |
|---|---|---|
| 2013/0126320 A1 | 5/2013 | Kim |
| 2015/0057825 A1 | 2/2015 | Steele et al. |
| 2016/0043596 A1 | 2/2016 | Yamaguchi et al. |
| 2016/0231721 A1 | 8/2016 | Lakshmanan et al. |
| 2019/0020294 A1 | 1/2019 | Nishimaki et al. |

FOREIGN PATENT DOCUMENTS

| | | |
|---|---|---|
| CN | 1967642 A | 5/2007 |
| CN | 101136546 A | 3/2008 |
| CN | 101252272 A | 8/2008 |
| CN | 101436972 A | 5/2009 |
| CN | 102332713 A | 1/2012 |
| CN | 202939471 U | 5/2013 |
| CN | 103918156 A | 7/2014 |
| CN | 104002833 A | 8/2014 |
| CN | 104102316 A | 10/2014 |
| CN | 104181870 A | 12/2014 |
| CN | 104181898 A | 12/2014 |
| CN | 203984377 U | 12/2014 |
| CN | 104578019 A | 4/2015 |
| CN | 104618440 A | 5/2015 |
| CN | 204651612 U | 9/2015 |
| CN | 104978299 A | 10/2015 |
| CN | 105191221 A | 12/2015 |
| CN | 105263043 A | 1/2016 |
| CN | 205428175 U | 8/2016 |
| CN | 104183997 B | 9/2016 |
| CN | 106124956 A | 11/2016 |
| CN | 106500449 A | 3/2017 |
| CN | 106839574 A | 6/2017 |
| CN | 106873551 A | 6/2017 |
| CN | 107431649 A | 12/2017 |
| CN | 107783781 A | 3/2018 |
| WO | 2012030772 A2 | 3/2012 |
| WO | 2017139707 A1 | 8/2017 |
| WO | 2018011723 A1 | 1/2018 |

OTHER PUBLICATIONS

Rahmati, A. et al., "IFTTT vs. Zapier: A Comparative Study of Trigger-Action Programming Frameworks", arXiv:1709.02788v1 [cs.CR] Sep. 8, 2017, 4 pages.

Fernandes, E., "Securing Personal IoT Platforms through Systematic Analysis and Design", A dissertation submitted in partial fulfillment of the requirements for the degree of Doctor of Philosophy (Computer Science and Engineering) in The University of Michigan, 2017, 212 pages.

Zhaoze, L., "How to Select a Proper UPS for a Data Center Precision Air Conditioner", with an English translation, Data Center Energy White Paper 07, Huawei Technologies Co., Ltd., Nov. 2017, 27 pages.

Jingchun, H. et al., "A heterogeneous combination of remote wireless network control system", Application of Electronic Technique, Jun. 20, 2015, vol. 41, Issue 6, 5 pages.

Wikipedia, "Inrush current", URL:https://en.wikipedia.org/wiki/Inrush_current, Mar. 2017, 4 pages.

JS, "Detailed explanation of power supply startup impulse current", with an English translation version, Dec. 2016, 11 pages.

Ur, B. et al., "Practical Trigger-Action Programming in the Smart Home", CHI 2014, Toronto, ON, Canada, Apr. 26-May 1, 2014, 10 pages.

Chen, H. et al., "Technical Support Report on National Energy Efficiency Standard for Color TV Sets in China", with an English translation, China National Institute of Standardization, Mar. 2015, 334 pages.

Murata, "What is inrush current?", Noise Suppression Filter Guide, Oct. 29, 2012, URL:https://article.murata.com/en-global/article/what-is-inrush-current, 3 pages.

DEVICE CONTROL METHOD AND DEVICE

CROSS-REFERENCE TO RELATED APPLICATIONS

This application is a National Stage of International Application No. PCT/CN2019/124454, filed on Dec. 11, 2019, which claims priority to Chinese Patent Application No. 201910101408.0, filed on Jan. 31, 2019, both of which are hereby incorporated by reference in their entireties.

TECHNICAL FIELD

This application relates to the field of electronic technologies, and in particular, to a device control method and a device.

BACKGROUND

As internet of things technologies continuously develop, smart home devices are increasingly popular. A smart home system constituted by networking a plurality of smart home devices is increasingly widely used. In a smart home scenario, because there is a particular rule between devices in the smart home system, a plurality of devices can collaboratively complete complex tasks, to provide more convenience and comfort to a home life of a user.

There are increasingly more devices in the smart home system. Running of the smart home devices may cause an electrical safety problem, and consequently cause harm to smart home devices and cables.

SUMMARY

This application discloses a device control method and a device, to reduce harm caused by a surge current to smart home devices and cables, and improve safety of a smart home system.

In embodiments of this application, a first device (for example, a smart light) performs a first action (for example, the light is turned on), and after T1, a second device (for example, a smart air conditioner) performs a second action (for example, the air conditioner is turned on). In this way, harm caused by a superposition of a first surge current of the first device and a second surge current of the second device to devices and cables is reduced, and safety of a smart home system is improved.

According to a first aspect, an embodiment of this application provides a device control method. The method includes: displaying a first interface, where the first interface includes a first condition, a name of a first device, and a name of a second device; determining a first time interval based on a first parameter of the first device and a second parameter of the second device, where the first parameter is related to a first surge current of the first device, and the second parameter is related to a second surge current of the second device; when the first condition is satisfied, sending a first instruction to the first device, and sending a second instruction to the second device after the first time interval, where the first instruction enables the first device to perform a first action, and the first action generates the first surge current; and the second instruction enables the second device to perform a second action, and the second action generates the second surge current; displaying a second interface, where the second interface includes the first condition, the name of the first device, the name of the second device, and a name of a third device; determining a second time interval based on the first parameter, the second parameter, and a third parameter of the third device, where the third parameter is related to a third surge current of the third device; and when the first condition is satisfied, sending the first instruction to the first device, sending the second instruction to the second device after the first time interval, and sending a third instruction to the third device after the second time interval, where the third instruction enables the third device to perform a third action, the third action generates the third surge current, and the second time interval is greater than the first time interval.

In the device control method, when setting is performed to enable the first device to perform the first action, the second device to perform the second action, and the third device to perform the third action, it may be determined, based on the first parameter, the second parameter, and the third parameter that are related to the surge currents, that the third device performs the third action after a delay. This can reduce harm caused, to devices and cables, by an excessive surge current generated when the three devices perform the actions, and improve safety of a smart home system.

In some possible embodiments, when the first condition is satisfied, the sending a first instruction to the first device, and sending a second instruction to the second device after the first time interval includes: when the first condition is satisfied, sending a fourth instruction to the server; and when receiving the fourth instruction, sending, by the server, the first instruction to the first device, and sending the second instruction to the second device after the first time interval.

In some possible embodiments, the determining a second time interval based on the first parameter of the first device, the second parameter of the second device, and a third parameter of the third device includes: determining whether a superposition of the first surge current, the second surge current, and the third surge current is greater than or equal to a first threshold; and when the superposition of the first surge current, the second surge current, and the third surge current is greater than or equal to the first threshold, setting a time interval between a time for sending the second instruction and a time for sending the third instruction as the second time interval.

In some possible embodiments, the determining a first time interval based on a first parameter of the first device and a second parameter of the second device includes: determining whether a superposition of the first surge current and the second surge current is greater than or equal to the first threshold; and when the superposition of the first surge current and the second surge current is less than the first threshold, setting a time interval between a time for sending the first instruction and a time for sending the second instruction as the first time interval.

An electronic device may determine whether the superposition of the first surge current and the second surge current is greater than or equal to the first threshold, and then send a determining result to the server; and the server determines the first time interval based on the determining result. Alternatively, an electronic device may perform the determining step, then determine the first time interval, and send the first time interval to the server. Alternatively, the server may determine whether the superposition of the first surge current and the second surge current is greater than or equal to the first threshold, and then determine the first time interval based on a determining result.

The superposition of the first surge current and the second surge current is a superposition of peak values of the surge currents, or may be a superposition of valid values of the surge currents.

Optionally, the first threshold may be a specified threshold. The specified threshold may be determined based on maximum power or a rated current that can be supported by a drop cable, may be specified by a user on the electronic device, may be determined based on a trip current of home electricity, or may be an empirical value.

Optionally, the first surge current of the first device and the second surge current of the second device each may be a preset value. The preset value may be an empirical value or a measurement value. All of the first surge current, the second surge current, and the first threshold may be stored on the electronic device, or may be stored on the server. Alternatively, the first surge current may be determined in the following manner: A smart meter collects surge currents when the first device in the smart home system is started for several latest times (for example, 100 times); and the electronic device or the server calculates an average value of the surge currents that are collected when the first device is started for the latest 100 times, and uses the average value as a value of the first surge current. A similar manner is used to determine the second surge current.

Optionally, the first time interval is 0. When the server sends two instructions in sequence, there is a non-manual time interval, namely, the first time interval, between the two instructions.

Optionally, the first parameter may be a parameter determined based on the first surge current. For example, the first parameter may be a power value.

Optionally, the first parameter is used to represent a value of the first surge current. The second parameter is used to represent a value of the second surge current.

Optionally, the first instruction and the second instruction may be sent by the server. Specifically, when the first condition is satisfied, the fourth instruction is sent to the server. When receiving the fourth instruction, the server sends the first instruction to the first device, and sends the second instruction to the second device after the first time interval.

The fourth instruction may be sent by the electronic device to the server, or may be sent by a fourth device to the server. For example, when detecting that a door is unlocked for entrance, the fourth device (an intelligent door lock) sends the fourth instruction to the server.

In some possible embodiments, the second time interval is determined based on one or more of the following: duration of the surge of the first device, duration of the surge of the second device, and duration of the surge of the third device; and impact duration of the surge of the first device, impact duration of the surge of the second device, and impact duration of the surge of the third device.

In some possible embodiments, the duration of the surge of the first device, the duration of the surge of the second device, the duration of the surge of the third device, the impact duration of the surge of the first device, the impact duration of the surge of the second device, and the impact duration of the surge of the third device are obtained by the smart meter.

Optionally, the smart meter may periodically update these surge parameters based on actions of the first device and the second device.

In some possible embodiments, the second time interval is a first preset value, for example, fixed duration of 100 ms.

In some possible embodiments, the first time interval is 0.

In some possible embodiments, the first condition is a first operation of the user, or is that a first message from the fourth device is detected.

In some possible embodiments, the first interface further includes a first control; and before the determining a first time interval based on a first parameter of the first device and a second parameter of the second device, the method further includes: detecting a third operation performed by the user on the first control, where the first time interval is determined in response to the third operation based on the first parameter of the first device and the second parameter of the second device.

In some possible embodiments, the second interface further includes a second control; and before the determining a second time interval based on the first parameter, the second parameter, and a third parameter of the third device, the method further includes: detecting a fourth operation performed by the user on the second control, where the second time interval is determined in response to the fourth operation based on the first parameter, the second parameter, and the third parameter of the third device.

The first control and the second control may be complete controls, or may be options in a device task setting interface.

According to a second aspect, an embodiment of this application provides a device control method. The method includes: sending, by a server, a first instruction, and starting a timer T1; receiving, by a first device, the first instruction, and performing a first action in response to the first instruction, where the first action generates a first surge current; sending, by the server, a second instruction when the timer T1 expires; and receiving, by a second device, the second instruction, and performing a second action in response to the second instruction, where the second action generates a second surge current, and the timer T1 is set based on the first surge current and the second surge current.

In the device control method, after the first device performs the first action, delay is implemented upon expiry of the timer T1, and the second device performs the second action. When the second device performs the second action, impact of the surge current generated by the first action has been reduced. This reduces harm caused by a superposition of surge currents to smart home devices and cables, and improves safety of a smart home system.

The timer T1 may be configured to implement the second time interval described in the context.

In some possible embodiments, before the sending, by a server, a first instruction, the method further includes: when a first condition is satisfied, determining, by the server, the timer T1 based on a first parameter of the first device and a second parameter of the second device, where the first parameter is related to the first surge current of the first device, and the second parameter is related to the second surge current of the second device.

In some possible embodiments, the determining the timer T1 based on a first parameter of the first device and a second parameter of the second device includes: determining whether a superposition of the first surge current and the second surge current is greater than or equal to a first threshold; and determining the timer T1 when the superposition of the first surge current and the second surge current is less than the first threshold.

An electronic device may determine whether the superposition of the first surge current and the second surge current is greater than or equal to the first threshold, and then send a determining result to the server; and the server determines the timer T1, for example, 100 ms, based on the determining result. Alternatively, an electronic device may perform the determining step, then determine the timer T1, and send the timer T1 to the server. Alternatively, the server may determine whether the superposition of the first surge current and the second surge current is greater than or equal to the first threshold, and then determine the timer T1 based on a determining result.

The superposition of the first surge current and the second surge current is a superposition of peak values of the surge currents, or may be a superposition of valid values of the surge currents.

Optionally, the first threshold may be a specified threshold. The specified threshold may be determined based on maximum power or a rated current that can be supported by a drop cable, may be specified by a user on the electronic device, may be determined based on a trip current of home electricity, or may be an empirical value.

Optionally, the first surge current of the first device and the second surge current of the second device each may be a preset value. The preset value may be an empirical value or a measurement value. All of the first surge current, the second surge current, and the first threshold may be stored on the electronic device, or may be stored on the server. Alternatively, the first surge current may be determined in the following manner: A smart meter collects surge currents when the first device in the smart home system is started for several latest times (for example, 100 times); and the electronic device or the server calculates an average value of the surge currents that are collected when the first device is started for the latest 100 times, and uses the average value as a value of the first surge current. A similar manner is used to determine the second surge current.

Optionally, when it is determined that the superposition of the first surge current and the second surge current is less than the first threshold, a time interval between a time for performing the first action by the first device and a time for performing the second action by the second device is set as the first time interval.

Optionally, the first time interval is 0. When the server sends two instructions in sequence, there is a non-manual time interval, namely, the first time interval, between the two instructions.

Optionally, the first parameter may be a parameter determined based on the first surge current. For example, the first parameter may be a power value.

Optionally, the first parameter is used to represent a value of the first surge current. The second parameter is used to represent a value of the second surge current.

Optionally, the first instruction and the second instruction may be sent by the server. Specifically, when the first condition is satisfied, a fourth instruction is sent to the server. When receiving the fourth instruction, the server sends the first instruction to the first device, and sends the second instruction to the second device after the timer T1 expires.

The fourth instruction may be sent by the electronic device to the server, or may be sent by a fourth device to the server. For example, when detecting that a door is unlocked for entrance, the fourth device (an intelligent door lock) sends the fourth instruction to the server.

In some possible embodiments, the determining, by the server, the timer T1 based on a first parameter of the first device and a second parameter of the second device includes: determining, by the server, whether a superposition of the first surge current and the second surge current is greater than or equal to a first threshold; and when the superposition of the first surge current and the second surge current is greater than or equal to the first threshold, determining, by the server, that the timer T1 is a first preset value, or determining the timer T1 based on one or more of the following: duration of the surge of the first device and duration of the surge of the second device; and impact duration of the surge of the first device and impact duration of the surge of the second device.

In some possible embodiments, when the superposition of the first surge current and the second surge current is less than the first threshold, the timer T1 is equal to 0 or delay duration between the two instructions after the server simultaneously sends the two instructions.

In some possible embodiments, before the sending, by the server, a first instruction, the method further includes: determining, by the electronic device, the timer T1 based on the first parameter of the first device and the second parameter of the second device;
sending, by the electronic device, a second message, where the second message indicates the timer T1; and
receiving, by the server, the second message.

In some possible embodiments, the first condition is a first operation of the user, or is that the fourth device detects a second operation.

According to a third aspect, an embodiment of this application provides a device control method, where the method includes: displaying a first interface, where the first interface includes a first condition, a name of a first device, and a name of a second device; determining, based on a first parameter of the first device and a second parameter of the second device, whether to set a time interval between a time for sending a first instruction and a time for sending a second instruction as a second time interval, where the first parameter is related to a first surge current of the first device, and the second parameter is related to a second surge current of the second device; and when it is determined that the time interval between the time for sending the first instruction and the time for sending the second instruction is set as the second time interval, and when the first condition is satisfied, sending the first instruction to the first device, and sending the second instruction to the second device after the second time interval, where the first instruction enables the first device to perform a first action, and the first action generates the first surge current; and the second instruction enables the second device to perform a second action, and the second action generates the second surge current.

In the device control method, when setting is performed to enable the first device to perform the first action and the second device to perform the second action, it may be determined, based on the first parameter and the second parameter that are related to the surge currents, that the second device performs the second action after a delay. This can reduce harm caused, to devices and cables, by an excessive surge current generated when the two devices perform the actions, and improve safety of a smart home system.

In some possible embodiments, when the first condition is satisfied, sending the first instruction to the first device, and sending the second instruction to the second device after the second time interval includes: when the first condition is satisfied, sending a fourth instruction to the server; and when receiving the fourth instruction, sending, by the server, the first instruction to the first device, and sending the second instruction to the second device after the second time interval.

In some possible embodiments, the determining a second time interval based on a first parameter of the first device and a second parameter of the second device includes: determining whether a superposition of the first surge current and the second surge current is greater than or equal to a first threshold; and when the superposition of the first surge current and the second surge current is less than the first threshold, setting the time interval between the time for sending the first instruction and the time for sending the second instruction as the second time interval.

An electronic device may determine whether the superposition of the first surge current and the second surge current is greater than or equal to the first threshold, and then send a determining result to the server; and the server determines the first time interval based on the determining result. Alternatively, an electronic device may perform the determining step, then determine the first time interval, and send the first time interval to the server. Alternatively, the server may determine whether the superposition of the first surge current and the second surge current is greater than or equal to the first threshold, and then determine the first time interval based on a determining result.

The superposition of the first surge current and the second surge current is a superposition of peak values of the surge currents, or may be a superposition of valid values of the surge currents.

Optionally, the first threshold may be a specified threshold. The specified threshold may be determined based on maximum power or a rated current that can be supported by a drop cable, may be specified by a user on the electronic device, may be determined based on a trip current of home electricity, or may be an empirical value.

Optionally, the first surge current of the first device and the second surge current of the second device each may be a preset value. The preset value may be an empirical value or a measurement value. All of the first surge current, the second surge current, and the first threshold may be stored on the electronic device, or may be stored on the server. Alternatively, the first surge current may be determined in the following manner: A smart meter collects surge currents when the first device in the smart home system is started for several latest times (for example, 100 times); and the electronic device or the server calculates an average value of the surge currents that are collected when the first device is started for the latest 100 times, and uses the average value as a value of the first surge current. A similar manner is used to determine the second surge current.

Optionally, the first parameter may be a parameter determined based on the first surge current. For example, the first parameter may be a power value.

Optionally, the first parameter is used to represent a value of the first surge current. The second parameter is used to represent a value of the second surge current.

Optionally, the first instruction and the second instruction may be sent by the server. Specifically, when the first condition is satisfied, the fourth instruction is sent to the server. When receiving the fourth instruction, the server sends the first instruction to the first device, and sends the second instruction to the second device after the second time interval.

The fourth instruction may be sent by the electronic device to the server, or may be sent by a fourth device to the server. For example, when detecting that a door is unlocked for entrance, the fourth device (an intelligent door lock) sends the fourth instruction to the server.

According to a fourth aspect, an embodiment of this application provides an electronic device, including one or more processors, a memory, and a display. The memory and the display are coupled to the one or more processors. The memory is configured to store computer program code. The computer program code includes computer instructions. When the one or more processors execute the computer instructions, the electronic device is enabled to perform the device control method according to any one of the first aspect, the third aspect, the possible implementations of the first aspect, or the possible implementations of the third aspect.

According to a fifth aspect, an embodiment of this application provides a system. The system includes an electronic device, a server, a first device, a second device, and a third device. The electronic device is configured to display a first interface, where the first interface includes a first condition, a name of the first device, and a name of the second device. The electronic device is further configured to determine a first time interval based on a first parameter of the first device and a second parameter of the second device, where the first parameter is related to a first surge current of the first device, and the second parameter is related to a second surge current of the second device. The server is configured to: when the first condition is satisfied, send a first instruction to the first device, and send a second instruction to the second device after the first time interval. The first device is configured to perform a first action when receiving the first instruction, where the first action generates the first surge current. The second device is configured to perform a second action when receiving the second instruction, where the second action generates the second surge current. The electronic device is further configured to display a second interface, where the second interface includes the first condition, the name of the first device, the name of the second device, and a name of the third device. The electronic device is further configured to determine a second time interval based on the first parameter, the second parameter, and a third parameter of the third device, where the third parameter is related to a third surge current of the third device. The server is configured to: when the first condition is satisfied, send the first instruction to the first device, send the second instruction to the second device after the first time interval, and send a third instruction to the third device after the second time interval. The third device is configured to perform a third action when receiving the third instruction, where the third action generates the third surge current, and the second time interval is greater than the first time interval.

According to a sixth aspect, an embodiment of this application provides a system. The system includes a server, a first device, a second device, and a third device, to perform the device control method according to any one of the second aspect or the possible implementations of the second aspect.

According to a seventh aspect, this application provides a computer storage medium, including computer instructions. When the computer instructions are run on an electronic device, the electronic device is enabled to perform the device control method according to any one of the first aspect, the third aspect, the possible implementations of the first aspect, or the possible implementations of the third aspect.

According to an eighth aspect, this application provides a computer storage medium, including computer instructions. When the computer instructions are run on an electronic device, the system is enabled to perform the device control method according to any one of the second aspect or the possible implementations of the second aspect.

According to a ninth aspect, an embodiment of this application provides a computer program product. When the computer program product runs on a computer, the computer is enabled to perform the device control method according to any one of the first aspect, the second aspect, the third aspect, the possible implementations of the first aspect, the possible implementations of the second aspect, or the possible implementations of the third aspect.

It may be understood that, the electronic device according to the fourth aspect, the system according to the fifth aspect, the system according to the sixth aspect, the computer storage medium according to the seventh aspect, the computer storage medium according to the eighth aspect, or the computer program product according to the ninth aspect is configured to perform the device control method according to any one of the first aspect, the second aspect, or the third aspect. Therefore, for beneficial effects that can be achieved, refer to the beneficial effects achieved in the corresponding method. Details are not described herein again.

BRIEF DESCRIPTION OF THE DRAWINGS

The following describes the accompanying drawings used in the embodiments of this application.

DETAILED DESCRIPTION OF ILLUSTRATIVE EMBODIMENTS

The following describes the embodiments of this application with reference to the accompanying drawings in the embodiments of this application. Terms used in implementations in the embodiments of this application are merely intended to explain specific embodiments of this application, but are not intended to limit this application.

Figure 1:
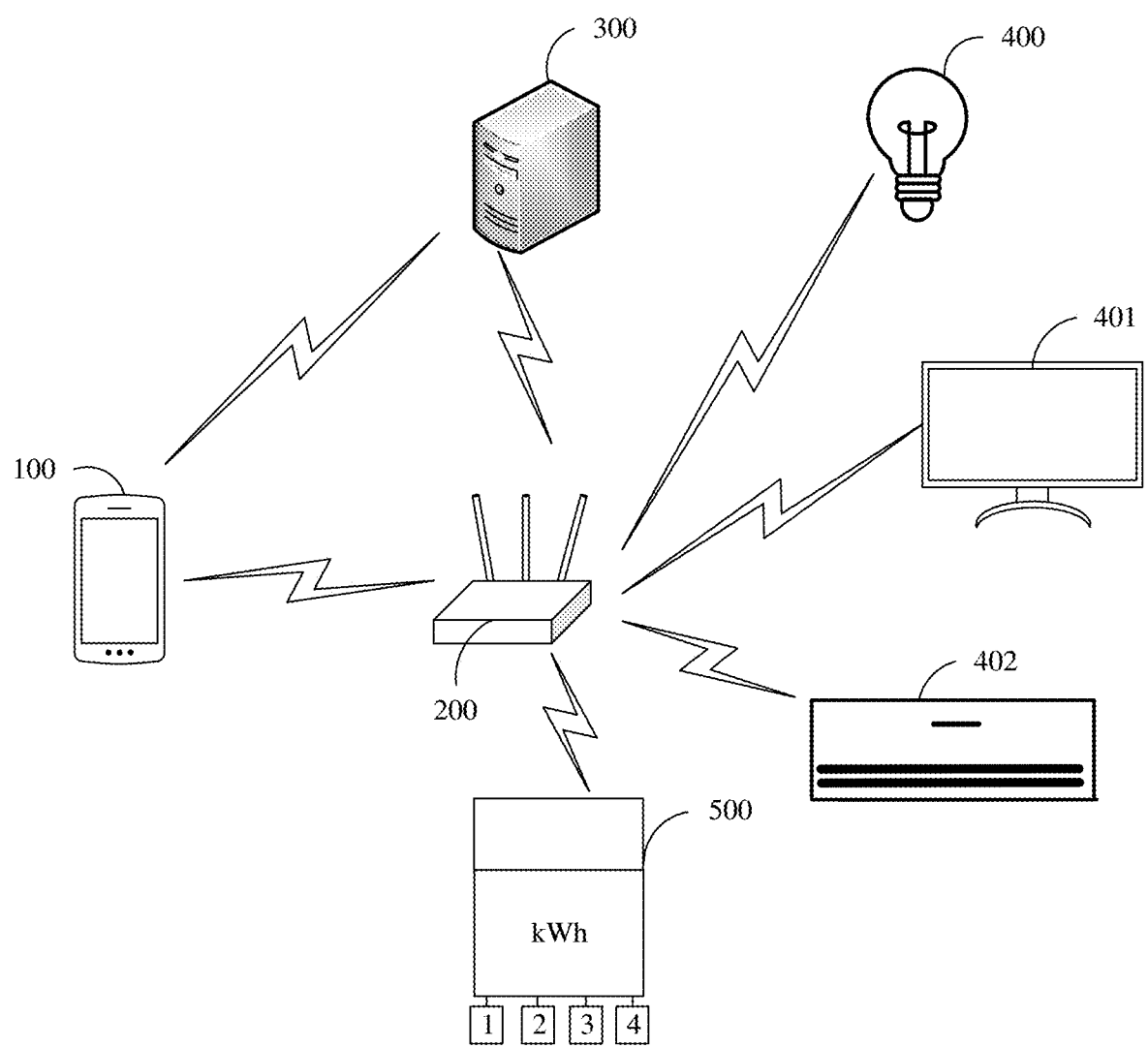
FIG. 1 is a schematic diagram of a network architecture of a smart home system according to an embodiment of this application.

The following describes a system architecture used in the embodiments of this application. FIG. 1 is a schematic diagram of a network architecture of a smart home system according to an embodiment of this application.

As shown in FIG. 1, the network architecture of the smart home system may include an electronic device 100, a router 200, a server 300, and one or more smart home devices. The smart home devices may include a smart light 400, a smart television 401, and a smart air conditioner 402. The smart home device may include a smart meter 500.

The electronic device 100 may communicate with the router 200. The router 200 may communicate with the server 300. The electronic device 100 may further communicate with the server 300.

When the smart home device is connected to a Wi-Fi hotspot generated by the router 200, the electronic device 100 may send a control instruction to the smart home device through the router 200 and the server 300. For example, in a scenario in which a user is not at home, the electronic device is not connected to the Wi-Fi hotspot generated by the router 200, and the user performs a tap operation on the electronic device 100 (for example, a mobile phone), to send an instruction to the smart air conditioner 402 at home, to turn on the smart air conditioner 402. The instruction for turning on the smart air conditioner is sent by the electronic device 100 to the smart air conditioner 402 through the server 300 and the router 200. The smart home device (for example, the television 401) may also communicate with the server 300 through the router 200. For example, in the scenario in which the user is not at home, after the smart air conditioner 402 is turned on, the smart air conditioner 402 sends a notification to the server 300 through the router 200, and the server 300 may send the notification to the electronic device 100, to notify the user that the smart air conditioner 402 is turned on. The smart home devices may further communicate with each other through the router 200. For example, the smart light 400 may communicate with the smart television 401 through the router 200.

When both the smart home device and the electronic device 100 are connected to the Wi-Fi hotspot generated by the router 200, the electronic device 100 may also send a control instruction to the smart home device through the router 200. For example, in a scenario in which the user is at home, both a smart home device and the electronic device 100 are connected to the Wi-Fi hotspot generated by the router 200. The user performs a tap operation on the electronic device 100 (for example, a mobile phone), to send an instruction to the smart air conditioner 402 at home, to turn on the smart air conditioner 402. The instruction for turning on the air conditioner is sent by the electronic device 100 to the smart air conditioner 402 through the router 200. The smart home device may also communicate with the electronic device 100 through the router 200. For example, in the scenario in which the user is at home, after the smart air conditioner 402 is turned on, the smart air conditioner 402 sends a notification to the electronic device 100 through the router 200, to notify the user that the smart air conditioner 402 is turned on.

In some embodiments of this application, another wireless connection, for example, a Wi-Fi direct connection, a Bluetooth connection, or a ZigBee connection, may alternatively be established between the smart home devices. A Wi-Fi direct connection, a Bluetooth connection, or a ZigBee connection may alternatively be established between the electronic device and the smart home device. This is not limited in this embodiment of this application.

In addition, the network architecture of the smart home system shown in FIG. 1 is merely used as an example to explain this embodiment of this application, but does not constitute a limitation. Alternatively, there may be another system architecture. For example, in a 5G scenario, the electronic device 100, the smart home device, and the server 300 each include a chip that supports 5G communication. In this case, the router 200 does not need to perform forwarding. The electronic device 100 may directly communicate with the smart home device, and the server 300 may also directly communicate with the smart home device. The smart home devices may also directly communicate with each other. The network architecture of the smart home system is not limited in this embodiment of this application.

An APP used to control the smart home device is installed on the electronic device 100. The APP may be, for example, a smart home APP. The server 300 may be an application server corresponding to the APP used to control the smart home device, and the server 300 may be, for example, an application server corresponding to the smart home APP.

The electronic device 100 in this embodiment of this application may be a mobile phone, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, a virtual reality device, or the like.

As shown in FIG. 1, in this embodiment of this application, the smart home devices include the smart light 400, the smart television 401, and the smart air conditioner 402. The smart home system shown in FIG. 1 is merely used as an example, but does not constitute a limitation. The smart home devices may further include an anti-theft door lock, a smart speaker, a sweeping robot, a smart socket, a smart body fat scale, a smart lamp, an air purifier, a smart refrigerator, a smart washing machine, a smart water heater, a smart microwave oven, a smart rice cooker, a smart curtain, a smart fan, a smart television, a smart set-top box, a smart door, a smart window, and the like. The smart home device in this embodiment of this application is a home device having a network connection function.

Figure 2:
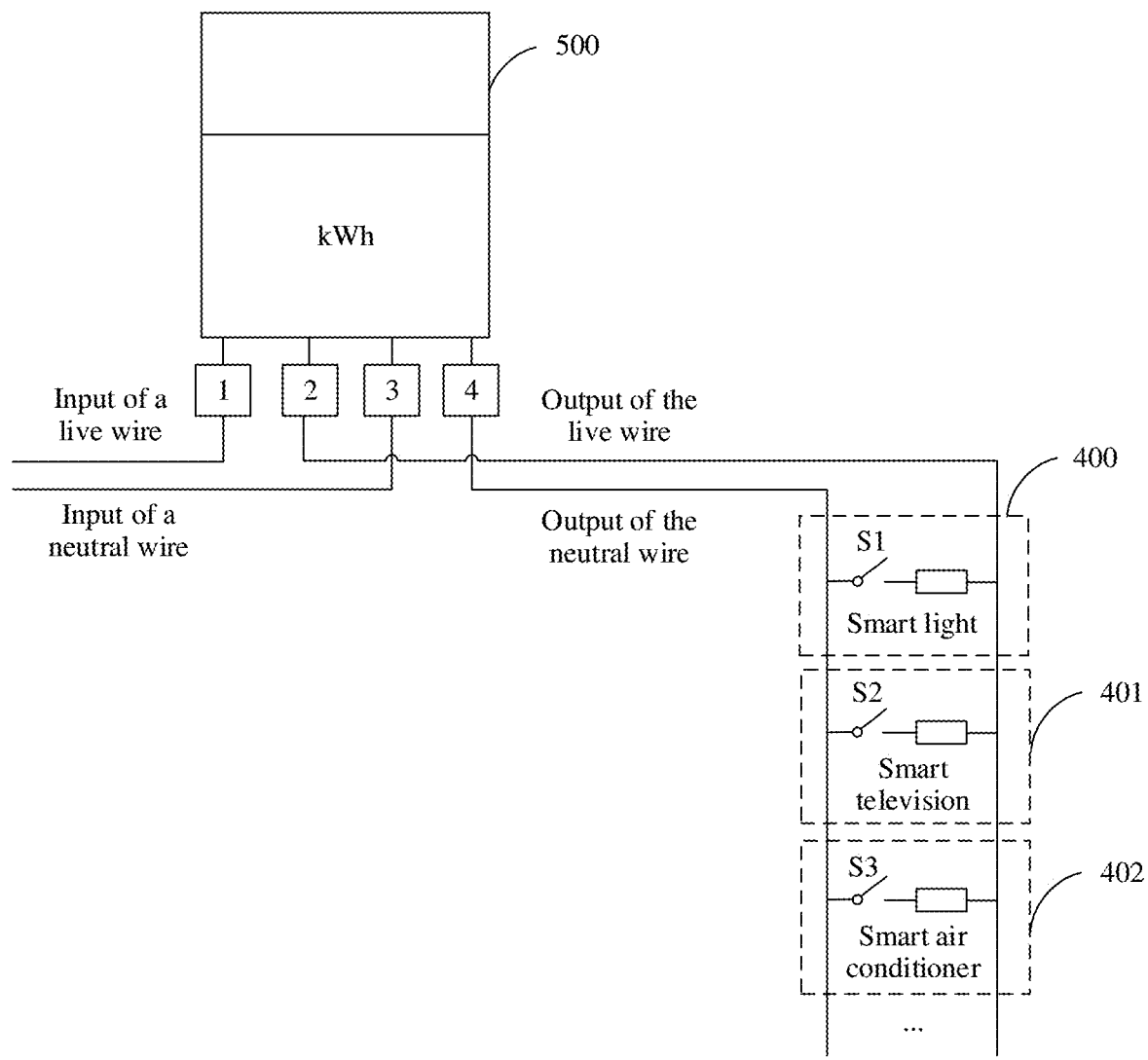
FIG. 2 is a schematic diagram of a circuit structure for smart home devices according to an embodiment of this application.

The following describes a circuit connection structure for smart home devices. FIG. 2 is a schematic diagram of a circuit structure for smart home devices according to an embodiment of this application. Wiring terminals 1 and 3 of a smart meter 500 are respectively connected to an input end of a live wire and an input end of a neutral wire. Power is supplied to the smart home devices at the input end of the live wire and the input end of the neutral wire. Wiring terminals 2 and 4 of the smart meter 500 are respectively used as an output of the live wire and an output of the neutral wire. The smart home devices (a smart light 400, a smart television 401, and a smart air conditioner 402), the output of the live wire, and the output of the neutral wire form a parallel circuit.

The smart meter 500 may obtain electricity parameters of the smart home devices, for example, electricity use, a surge current of each smart home device, duration of the surge, and impact duration of the surge.

The smart home device may be started according to a received instruction. For example, after a start instruction sent by an electronic device is received, a switch S1 is closed and the smart light is turned on. Similarly, after a start instruction sent by the electronic device is received, a switch S2 is closed and the smart television may be turned on. After the start instruction sent by the electronic device is received, the switch S1 is closed and the smart light is turned on.

The embodiments of this application provide a method and a device for staggered start of smart home devices, to improve safety during operating of a smart home system by a user. The following describes an electronic device used in the embodiments of this application.

Figure 3:
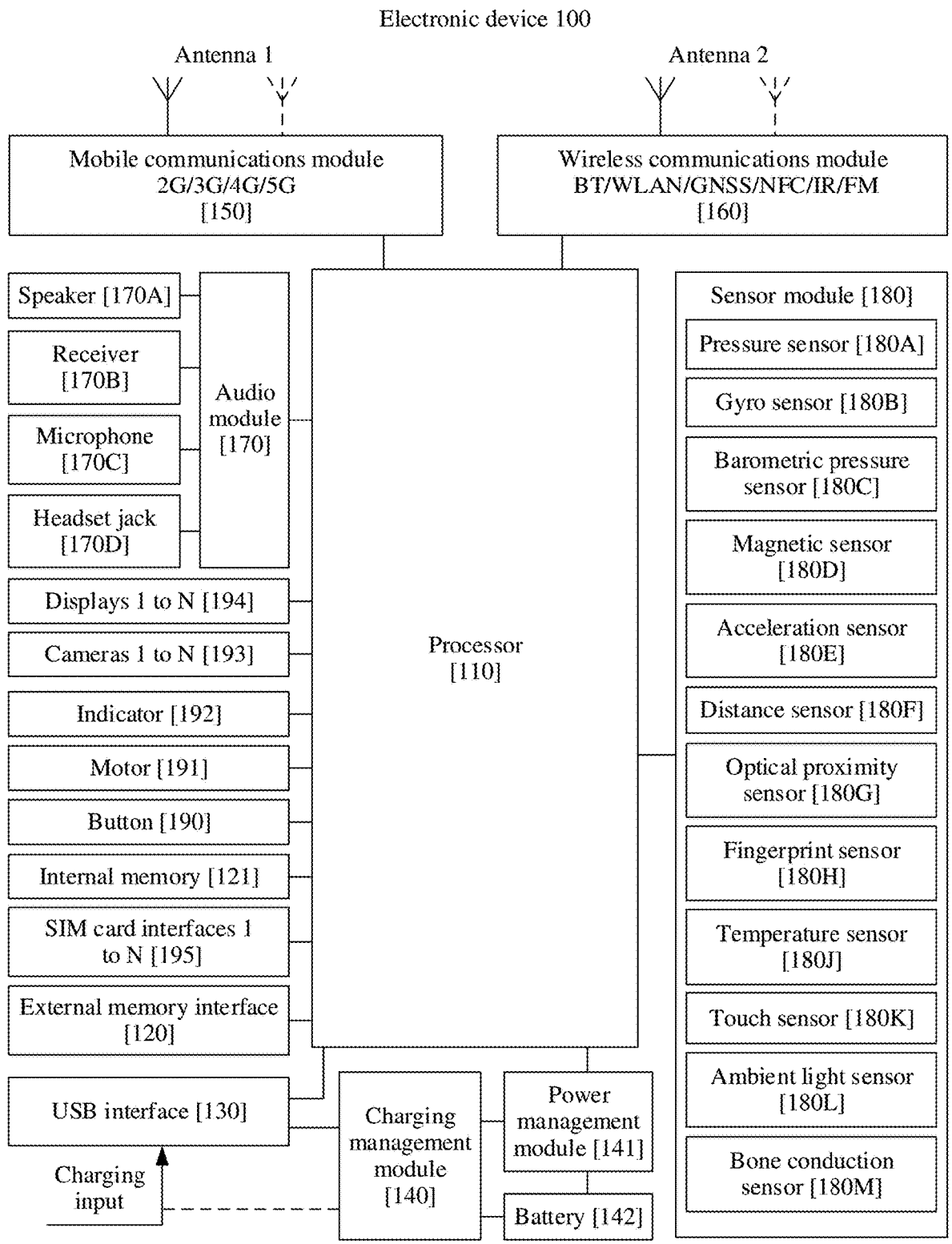
FIG. 3 is a schematic structural diagram of an electronic device 100 according to an embodiment of this application.

FIG. 3 is a schematic structural diagram of an electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instruction or the data from the memory, to avoid repeated access, reduce a waiting time of the processor 110, and improve system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor no may be separately coupled to the touch sensor 180K, a charger, a flashlight, the camera 193, and the like through different I2C bus interfaces. For example, the processor 110 may be coupled to the touch sensor 180K through the I2C interface, and the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger for charging the electronic device 100, may be used for data transmission between the electronic device 100 and a peripheral device, or may be configured to connect to a headset for playing audio by using the headset. The interface may alternatively be configured to connect to another electronic device, for example, an AR device.

It may be understood that an interface connection relationship between the modules shown in this embodiment of the present invention is merely used as an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device 100 may be configured to include a single communications frequency band or a plurality of communications frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more devices that integrate at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite based augmentation systems, SBAS).

The electronic device 100 implements a display function by using the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode or active-matrix organic light-emitting diode (active-matrix organic light emitting diode, AMOLED), a flexible light-emitting diode (flex light-emitting diode, FLED), a mini-LED, a micro-LED, a micro-OLED, quantum-dot light-emitting diodes (quantum dot light emitting diodes, QLED), or the like In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, namely, converting the electrical signal into a visible image. The ISP may further perform algorithm optimization on noise, brightness, and complexion of the image. The ISP may further optimize an exposure parameter, a color temperature parameter, and the like in a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process other digital signals in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more types of video codecs. Therefore, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external storage card such as a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to execute various function applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, or may include a non-volatile memory such as at least one magnetic disk storage device, a flash storage device, or a universal flash storage (universal flash storage, UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When the electronic device 100 is used to answer a call or receive audio information, the receiver 170B may be put close to a human ear to listen to a voice.

The microphone 170C, also referred to as a "mike" or a "microphone", is configured to convert a sound signal into an electrical signal. When making a call or sending voice information, a user may make a sound near the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce noise, recognize a sound source, implement a directional recording function, and the like.

The headset jack 170D is configured to connect to a wired headset. The headset jack 170D may be the USB interface 130, a 3.5 mm open mobile terminal platform (open mobile terminal platform, OMTP) standard interface, or a cellular telecommunications industry association (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines strength of the force based on a change of the capacitance. When a touch operation is performed on the display 194, the electronic device 100 detects strength of the touch operation by using the pressure sensor 180A. The electronic device 100 may further calculate a touch location based on a detection signal of the pressure sensor 180A. In some embodiments, touch operations that are performed at a same touch location but have different touch operation strength may correspond to different operation instructions. For example, when a touch operation with touch operation strength less than a first pressure threshold is performed on a Messages application icon, an instruction for viewing an SMS message is executed. When a touch operation with touch operation strength greater than or equal to a first pressure threshold is performed on a Messages application icon, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in navigation and motion-sensing game scenarios.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitude of accelerations in various directions (usually on the three axes) of the electronic device 100, and may detect magnitude and a direction of the gravity when the electronic device 100 is still. The acceleration sensor 180E may be further configured to recognize a posture of the electronic device, and is applied to switching between landscape mode and portrait mode, a pedometer, or the like.

The distance sensor 180F is configured to measure a distance. The electronic device 100 may measure the distance in an infrared or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, so that the electronic device 100 automatically turns off the screen for power saving. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J is greater than a threshold, the electronic device 100 degrades performance of a processor near the temperature sensor 180J, to reduce power consumption and implement thermal protection. In some other embodiments, when the temperature is less than another threshold, the electronic device 100 heats up the battery 142, to prevent the electronic device 100 from being shut down abnormally due to the low temperature. In some other embodiments, when the temperature is less than still another threshold, the electronic device 100 boosts an output voltage of the battery 142, to avoid abnormal shutdown caused by the low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 at a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The buttons 190 include a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may be further compatible with an external memory card. The electronic device 100 interacts with a network by using the SIM card, to implement a call function, a data communication function, and the like. In some embodiments, the electronic device 100 uses an eSIM, that is, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system with a layered architecture is used as an example to illustrate a software structure of the electronic device 100.

Figure 4:
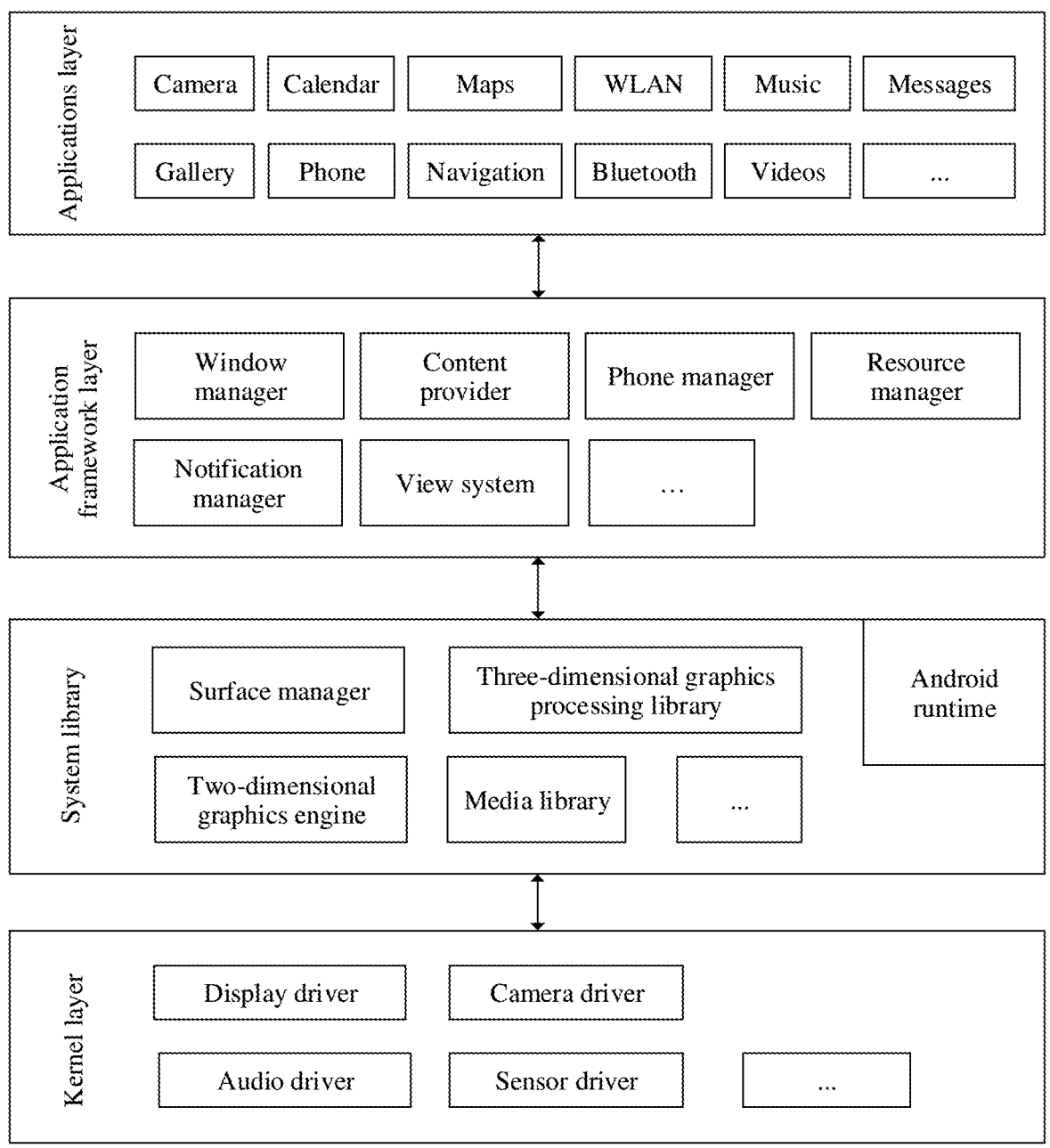
FIG. 4 is a block diagram of a software structure of an electronic device 100 according to an embodiment of this application.

FIG. 4 is a block diagram of a software structure of an electronic device 100 according to an embodiment of this application.

In a layered architecture, software is divided into several layers, and each layer has a clear role and task. The layers communicate with each other through a software interface. In some embodiments, the Android system is divided into four layers: an applications layer, an application framework layer, Android runtime (Android runtime) and a system library, and a kernel layer from top to bottom.

The application layer may include a series of application packages.

As shown in FIG. 4, the application packages may include applications such as Camera, Gallery, Calendar, Phone, Maps, Navigation, WLAN, Bluetooth, Music, Video, and Messages.

The application framework layer provides an application programming interface (application programming interface, API) and a programming framework for an application at the applications layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying an image. The view system may be configured to construct an application. A displayed interface may include one or more views. For example, a displayed interface including a Messages notification icon may include a text display view and an image display view.

The phone manager is configured to provide a communication function for the electronic device 100, for example, management of a call status (including answering or declining a call).

The resource manager provides various resources for an application, such as a localized character string, an icon, an image, a layout file, and a video file.

The notification manager enables an application to display notification information in a status bar, and may be configured to convey a notification message. The notification manager may automatically disappear after a short pause without user interaction. For example, the notification manager is configured to: notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, a prompt tone is played, the electronic device vibrates, or the indicator light blinks.

The Android runtime includes a core library and a virtual machine. The Android runtime is responsible for scheduling and management of the Android system.

The core library includes two parts: a function that needs to be invoked in Java language and a core library of Android.

The applications layer and the application framework layer run on the virtual machine. The virtual machine executes Java files at the applications layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working processes of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a camera application icon. The camera application invokes an interface at the application framework layer to enable the camera application, then enables a camera driver by invoking the kernel layer, and captures a static image or a video through the camera 193.

Figure 5:
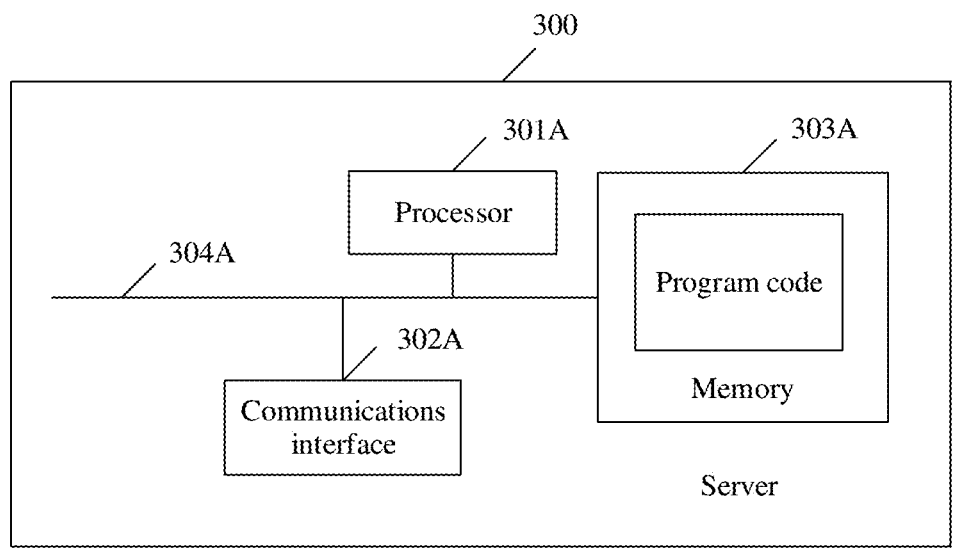
FIG. 5 is a schematic structural diagram of a server according to an embodiment of this application.

The following describes a schematic structural diagram of a server used in the embodiments of this application. FIG. 5 is a schematic structural diagram of a server according to an embodiment of this application. The server is applied to a smart home system. The smart home system may be the smart home system described in FIG. 1. As shown in FIG. 5, the server includes one or more processors 301A, a communications interface 302A, and a memory 303A. The processor 301A, the communications interface 302A, and the memory 303A may be connected through a bus or in another manner. In this embodiment of this application, that the processor 301A, the communications interface 302A, and the memory 303A are connected through a bus 304 is used as an example.

The processor 301A may include one or more general-purpose processors, for example, CPUs. The processor 301A may be configured to run related program code for staggered start of smart home devices.

The communications interface 302A may be a wired interface (for example, an Ethernet interface) or a wireless interface (for example, a cellular network interface or a wireless local area network interface), and is configured to communicate with another node. In this embodiment of this application, the communications interface 302A may be specifically configured to communicate with an electronic device 100, and further configured to communicate with a router 200.

The memory 303A may include a volatile memory (volatile memory), for example, a RAM. The memory may further include a non-volatile memory (non-volatile memory), for example, a ROM, a flash memory (flash memory), an HDD, or a solid-state drive SSD. Alternatively, the memory 303A may include a combination of the foregoing types of memories. The memory 303A may be configured to store a group of program code. The processor 301A invokes the program code stored in the memory 303A, to implement a device control method that is implemented on the server 300 side in the embodiments of this application.

It should be noted that the server 300 shown in FIG. 5 is merely an implementation of this embodiment of this application. In actual application, the server 300 may alternatively include more or fewer components. This is not limited herein.

In the embodiments of this application, a schematic structural diagram of a router 200 is similar to that of the server shown in FIG. 5. Details are not described herein. In addition, in actual application, the router 200 may alternatively include more or fewer components. This is not limited herein.

In the embodiments of this application, a smart home device may also include a processor, a communications interface, a memory, and a bus. For specific descriptions of the processor, the communications interface, the memory, and the bus, refer to the embodiment shown in FIG. 5. Details are not described herein. In addition, different smart home devices may include more or fewer components. For example, a smart television 401 may further include a display. A smart light 400 may further include a luminous filament. A smart air conditioner may further include a temperature regulation module, a humidity regulation module, and the like.

In this embodiment of this application, a trigger action programming (trigger action programming) model may be used to implement collaborative work by a plurality of smart home devices. The trigger action programming model may be, for example, IFTTT (if this then that). IFTTT is triggered based on a task-based condition. To be specific, if a device A performs an action B, the device A performs an action C. The trigger condition (if the device A performs the action B) is called a trigger, the subsequent task (the action C) or a result is called an action, and a complete process is called a rule. If a user wants to set a rule for collaboratively completing tasks by smart home devices, the user may install a smart home APP on an electronic device, and set, in the smart home APP, a rule for collaboration by the home devices.

Figure 6:
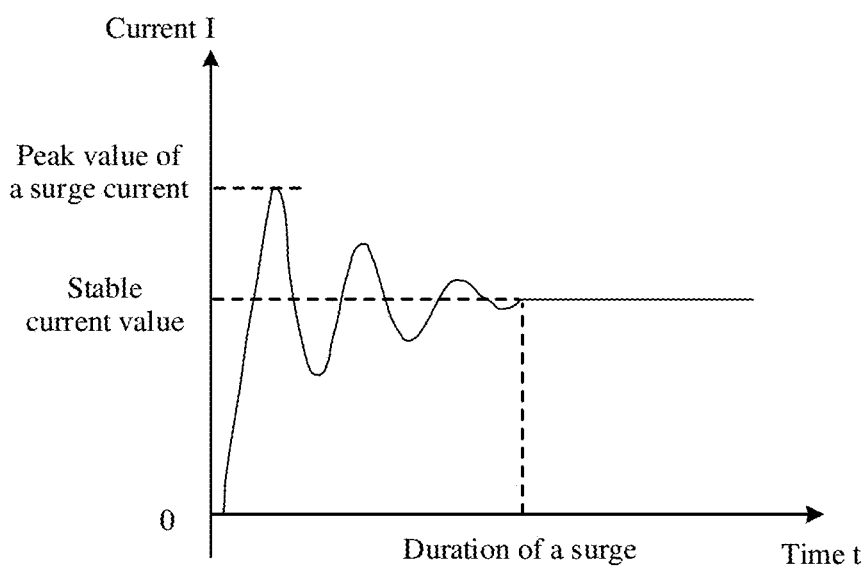
FIG. 6 is a schematic diagram of a surge current according to an embodiment of this application.

A surge current is generated when a smart home device is started, closed, or an operating parameter of a smart home device is changed. The following describes the surge current. At a moment at which a smart home device is powered on or powered off, a peak current flows into the smart home device. Because filter capacitance is input for quick charging after the smart home device is started, the peak current is much higher than a steady-state input current. FIG. 6 is a schematic diagram of a surge current according to an embodiment of this application. As shown in FIG. 6, at a moment 0, the smart home device is started, and a current flowing into the smart home device has a peak value. The peak value oscillates with time until the peak value of the current maintains a stable current value. The stable current value is an operating current of the smart home device. A time between the moment for starting the smart home device and a moment at which the peak value of the current flowing into the smart home device becomes stable is duration of a surge of the smart home device.

The foregoing describes the surge current by using an example in which the smart home device is started. A surge current is also generated when the smart home device is closed or an operating parameter of the smart home device is changed.

In the embodiments of this application, starting a smart home device means that the smart home device enters an operating state from a power-off state or a standby state. For example, when a smart television is in a standby state or a power-off state, a display and a speaker are in an off state. However, the smart television can receive and respond to a power-on instruction (for example, a power-on instruction from a mobile phone) to turn on the display and the speaker, and plays audio and a video. An on state of the display and the speaker in the smart television is an operating state of the smart television. For another example, when a smart air conditioner is in a standby state or a power-off state, modules used for cooling, heating, and humidity regulation are in an off state. However, the smart air conditioner can receive and respond to a power-on instruction (for example, a power-on instruction from a mobile phone) to turn on the modules used for cooling, heating, and humidity regulation, to regulate a temperature and humidity. An on state of the modules used for cooling, heating, and humidity regulation in the smart air conditioner is an operating state of the smart air conditioner. For still another example, when a smart light is in an off state, a light-emitting module (for example, a light-emitting diode) is in an off state, in other words, the light-emitting module does not emit light. However, the smart light can receive and respond to a start instruction (for example, a start instruction from a mobile phone) to start the light-emitting module, to emit light. An on state of the light-emitting module in the smart light is an operating state of the smart light.

Turning off a smart home device means that the smart home device enters a power-off state or a standby state from an operating state. For example, when a smart television is in an operating state, a display and a speaker are in an on state to play audio and a video. The smart television can receive and respond to a power-off instruction (for example, a power-off instruction from a mobile phone) to turn off the display and the speaker, and enters a standby state or a power-off state. When the smart television is in the power-off state or the standby state, the display and the speaker in the smart television are turned off. For another example, when a smart air conditioner is in an operating state, modules used for cooling, heating, and humidity regulation are in an on state to regulate a temperature and humidity. The smart television can receive and respond to a power-off instruction (for example, a power-off instruction from a mobile phone) to turn-off the modules used for cooling, heating, and humidity regulation and stop regulating the temperature and the humidity, and enters a standby state or a power-off state. When the smart air conditioner is in the power-off state or the standby state, the modules used for cooling, heating, and humidity regulation in the smart air conditioner are closed.

For example, the operating parameter of the smart home device may be a volume of a smart speaker, a color or brightness of a smart light, or an operating mode or a wind speed of an air purifier. The operating parameter of the smart home device is changed. For example, a supplied current is increased to increase the brightness of the smart light. For another example, the volume of the smart speaker is reduced.

When a plurality of smart home devices collaboratively complete tasks, if the plurality of smart home devices need to be simultaneously started or started in a short time, surge currents of the plurality of smart home devices are superposed, and instantaneous power and an instantaneous current are very high and exceed a safe current threshold and a safe power threshold, causing harm to smart home devices and cables.

An embodiment of this application provides a method for staggered start of smart home devices, to reduce harm caused by a surge current to smart home devices and cables, and improve safety of a smart home system.

The following describes some human-computer interaction embodiments related to setting of a rule for collaboratively completing tasks by smart home devices in the embodiments of this application. These human-computer interaction interfaces are application interfaces displayed on an electronic device 100.

Figure 7A:
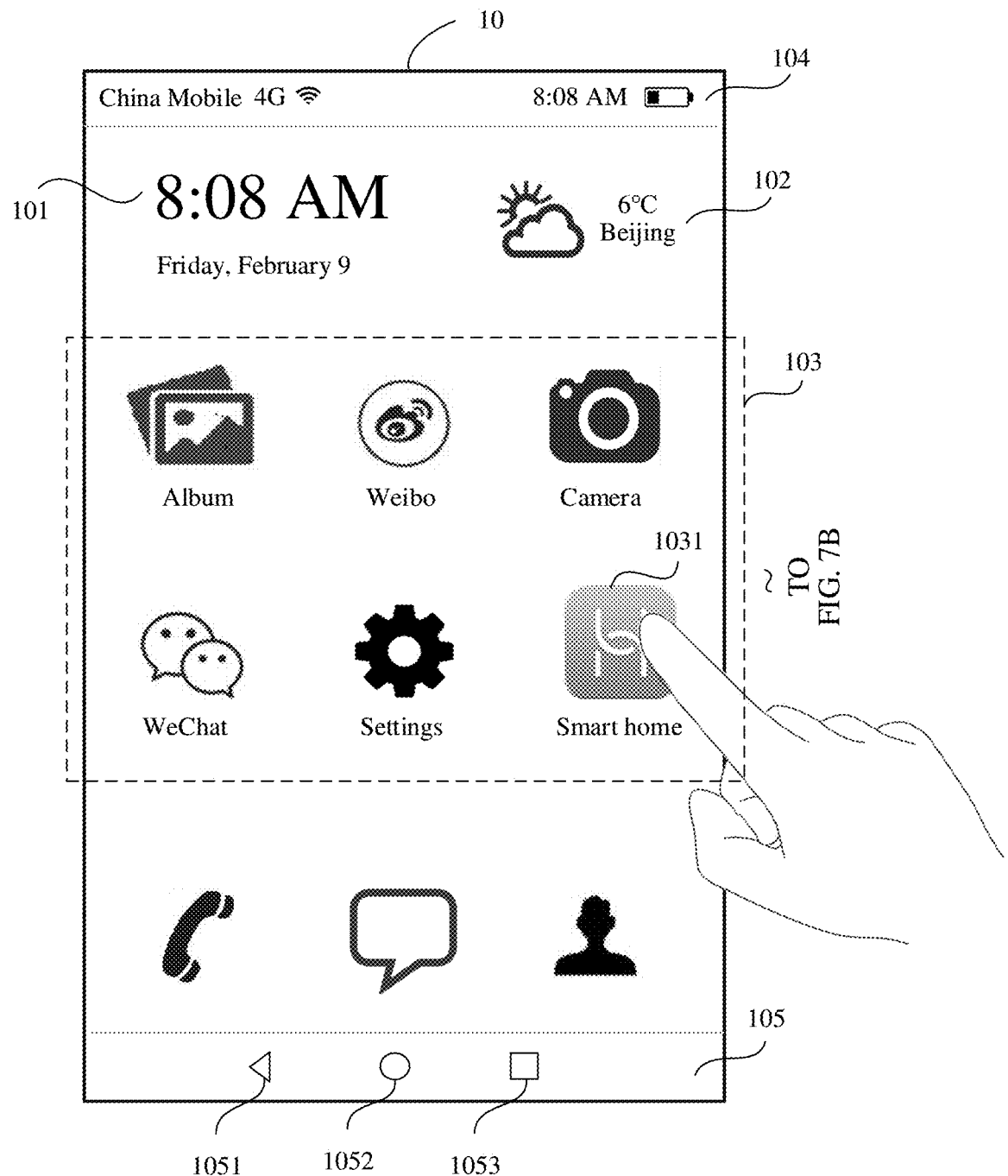
FIG. 7A and FIG. 7B are a schematic diagram of a human-computer interaction interface according to an embodiment of this application.
Figure 7B:
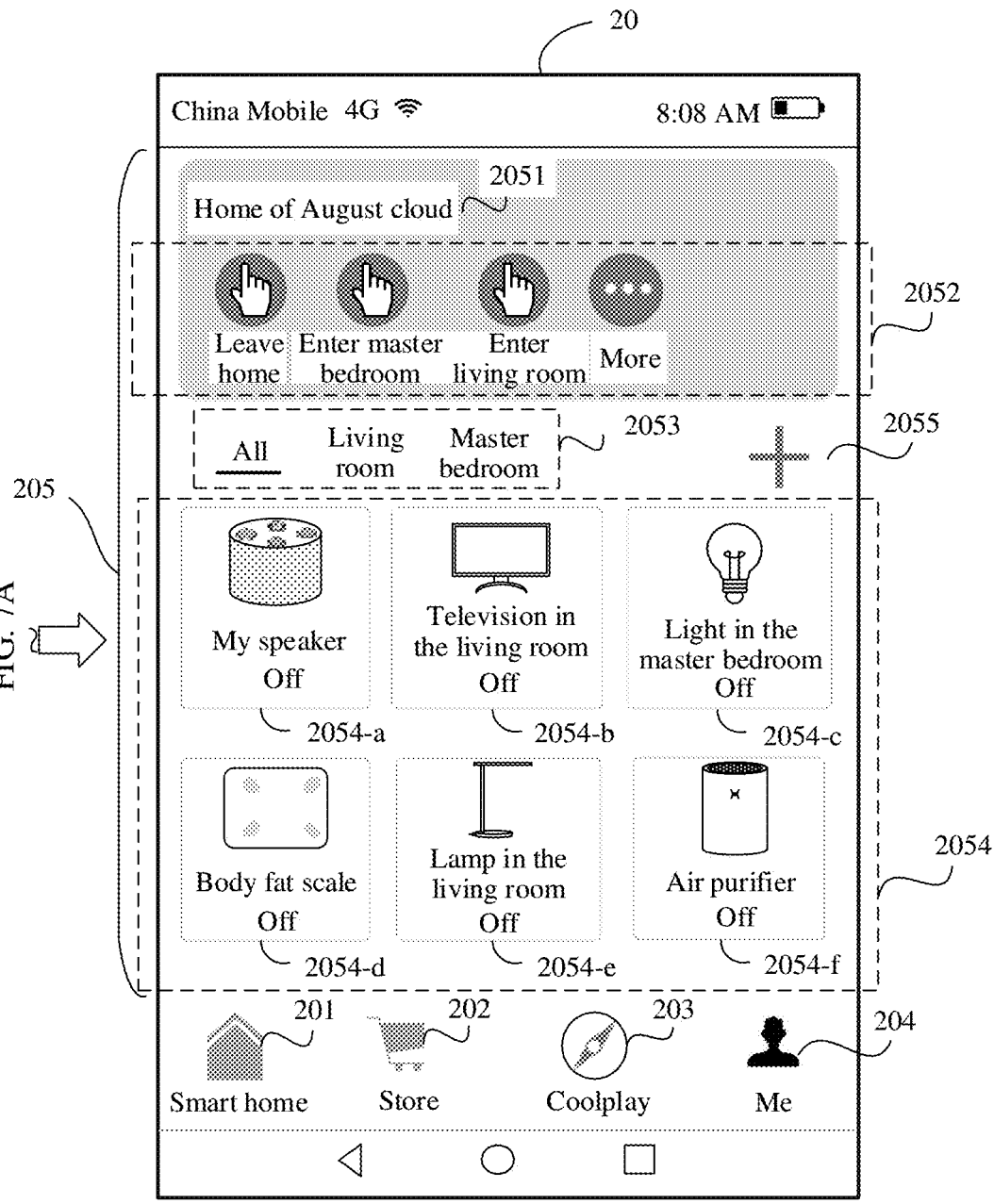

FIG. 7A and FIG. 7B are a schematic diagram of a human-computer interaction interface according to an embodiment of this application. As shown in FIG. 7A, an electronic device 100 displays a home screen 10. A smart home APP is installed on the electronic device 100, and an application icon of the smart home APP is correspondingly displayed on the home screen 10. As shown in FIG. 7A, the home screen 10 includes a calendar indicator 101, a weather indicator 102, application icons 103, a status bar 104, and a navigation bar 105.

The calendar indicator 101 may be used to indicate a current time, for example, a date, a day of a week, and hour and minute information.

The weather indicator 102 may be used to indicate a weather type, for example, cloudy to sunny or light rain, may be used to indicate information such as a temperature, or may be used to indicate a location.

The application icons 103 may include, for example, a camera icon, a microblog icon, an Alipay icon, a WeChat icon, a settings icon, a phone icon, a messages icon, and a contacts icon. The application icons 103 further include the smart home APP icon 1031.

The status bar 104 may include an operator name (for example, China Mobile), time, a Wi-Fi icon, signal strength, and a current battery level.

The navigation bar 105 may include system navigation buttons such as a back button 1051, a home (home screen) button 1052, and a button 1053 used for calling historical tasks. The home screen is an interface displayed by the electronic device 100 after a user operation performed on the home button 1052 in any user interface is detected. When a user tap performed on the back button 1051 is detected, the electronic device 100 may display a user interface previous to a current user interface. When a user tap performed on the home button 1052 is detected, the electronic device 100 may display the home screen. When a user tap performed on the button 1053 used for calling historical tasks is detected, the electronic device 100 may display a task recently opened by a user. The navigation buttons may alternatively have other names. For example, 1051 may be referred to as a back button, 1052 may be referred to as a home button, and 1053 may be referred to as a menu button. This is not limited in this application. The navigation buttons in the navigation bar 105 are not limited to virtual buttons, and may alternatively be implemented as physical buttons.

If the user wants to add, modify, execute, or delete, in the smart home APP, a rule for collaboration by home devices, the user may tap the smart home APP icon 1031 on the home screen 10. As shown in FIG. 7B, in response to a touch operation performed by the user on the smart home APP icon 1031, the electronic device displays a smart home application interface 20. As shown in FIG. 7B, the smart home application interface 20 includes four menu controls (smart home 201, store 202, coolplay 203, and me 204) and a content display area 205. Content displayed in the content display area varies with the menu controls. A currently selected menu type shown in FIG. 7B is the smart home 201. In other words, content displayed in the content display area 205 is content displayed in a menu of the smart home 201.

The content display area 205 may include a user name indicator 2051, a scenario list 2052, a category bar 2053, a smart home device list 2054, and an add control 2055.

The user name indicator 2051 is used to indicate a name of the user. For example, the user name indicator "Home of August cloud" shown in FIG. 7B indicates that the name of the user is "August cloud".

The scenario list 2052 may include one or more scenario controls. Each scenario control may correspond to one rule for collaboratively completing tasks by smart home devices. Therefore, different scenario controls correspond to different started smart home devices, and an operating parameter of a same smart home device started in different scenarios may also be different. For example, the operating parameter of the smart home device may be a volume of a smart speaker, a color or brightness of a smart light, or an operating mode or a wind speed of an air purifier.

For example, the scenario list 2052 includes icons for three scenarios, and the three scenario controls are respectively "leave home", "enter master bedroom", and "enter living room". The electronic device 100 may detect a user operation performed on any scenario control (for example, the "leave home" scenario control) in the three scenario controls (for example, a tap operation performed on the "leave home" scenario control). In response to the operation, the electronic device 100 may send an instruction for starting a smart home device corresponding to the scenario, and an instruction for setting an operating parameter of the started smart home device. In other words, the user may tap a scenario control to start or close a smart home device corresponding to the scenario control, and set an operating parameter of the smart home device.

The scenario list 2052 may further include a "more" icon. The electronic device 100 may detect a user operation performed on the "more" icon (for example, a tap operation performed on the "more" icon). In response to the operation, the electronic device 100 displays a page in which there are more scenario controls. In other words, the user may tap the "more" icon to view more scenario controls.

For example, an operating state of the smart speaker corresponding to the "leave home" scenario control is "off". For another example, an operating state of the smart speaker corresponding to the "enter master bedroom" scenario control is "on", and a volume is 20, and an operating state of the smart speaker corresponding to the "enter living room" scenario control is "on", and a volume is 15.

The category bar 2053 may include one or more categories. In response to a user operation performed by the user on one of the categories, the electronic device 100 displays a smart home device icon corresponding to the category in the smart home device list 2054.

As shown in FIG. 7B, the category bar 2053 may include three category options: "all", "living room", and "master bedroom". Different categories correspond to different smart home device icons that are included in the smart home device list 2054. When the "all" option is selected, all smart home device icons, that is, device icons of all smart home devices that are currently connected to the electronic device 100 through a router 200, are displayed in the smart home device list 2054. The "living room" option and the "master bedroom" option may be set by the user. For example, smart home device icons may be classified into the two categories. If the "all" option corresponds to an air purifier, a smart air conditioner 1, a smart air conditioner 2, and a smart television, the "living room" option may correspond to the air purifier, the smart air conditioner 1, and the smart television, and the "master bedroom" option may correspond to the smart air conditioner 2. This is not limited to the "living room" option and the "master bedroom" option that are included in the category bar 2053, and the user may further set other categories. This embodiment of this application is merely used as an example for description, and is not limited thereto.

The smart home device list 2054 may include one or more smart home device identifiers. The smart home device identifier may include a picture, a name, and an operating state of a smart home device. The name of the smart home device may be a name set by the user, or may be a default name of the smart home device. The operating state of the smart home device may include "on" and "off".

For example, as shown in FIG. 7B, the smart home device list 2054 may include a speaker identifier 2054-a, a television identifier 2054-b, a light identifier 2054-c, a body fat scale identifier 2054-d, a lamp identifier 2054-e, and an air purifier identifier 2054-f. The electronic device 100 may detect a slide operation performed on the smart home device list 2054. In response to the slide operation, the electronic device 100 may display more smart home device identifiers.

Each smart home device identifier corresponds to one smart home device in a smart home system. For example, the speaker identifier 2054-a corresponds to a smart speaker in the smart home system.

The following describes, with reference to a user interface, a procedure of adding a rule for collaboratively completing tasks by smart home devices. In the embodiments of this application, a "go home" rule is used as an example for description, in other words, a name of a rule for cooperatively completing tasks is set to "go home" on the electronic device side. It may be understood that procedures of adding and using another rule for cooperatively completing tasks are similar to procedures of adding and using the "go home" rule in the embodiments of this application.

Figure 8A:
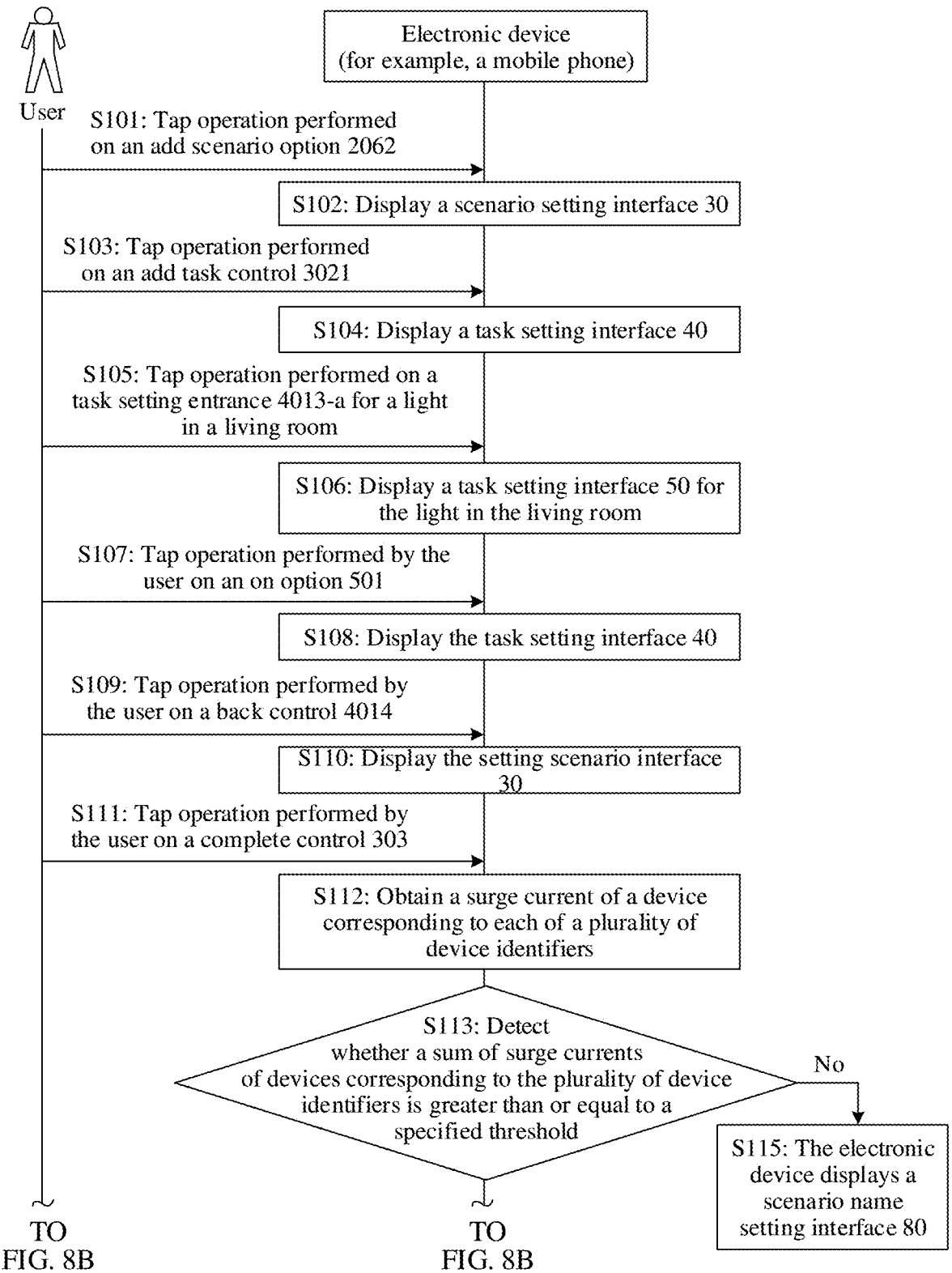
FIG. 8A and FIG. 8B are a schematic diagram of a procedure of adding a rule for collaboratively completing tasks according to an embodiment of this application.
Figure 8B:
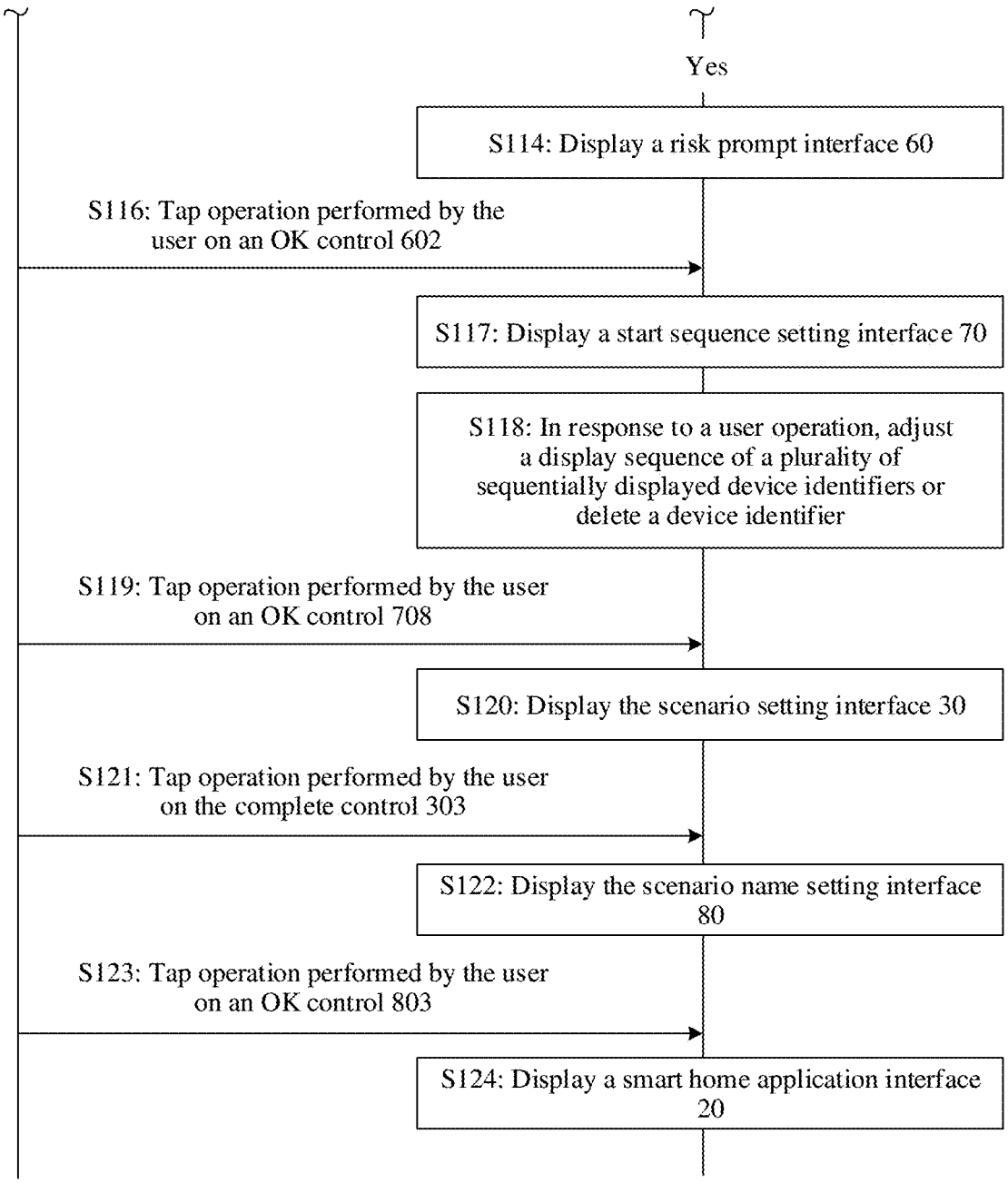

FIG. 8A and FIG. 8B are a schematic diagram of a procedure of adding a rule for collaboratively completing tasks according to an embodiment of this application. As shown in FIG. 8A and FIG. 8B, the procedure includes steps S101 to S124.

Figure 9A:
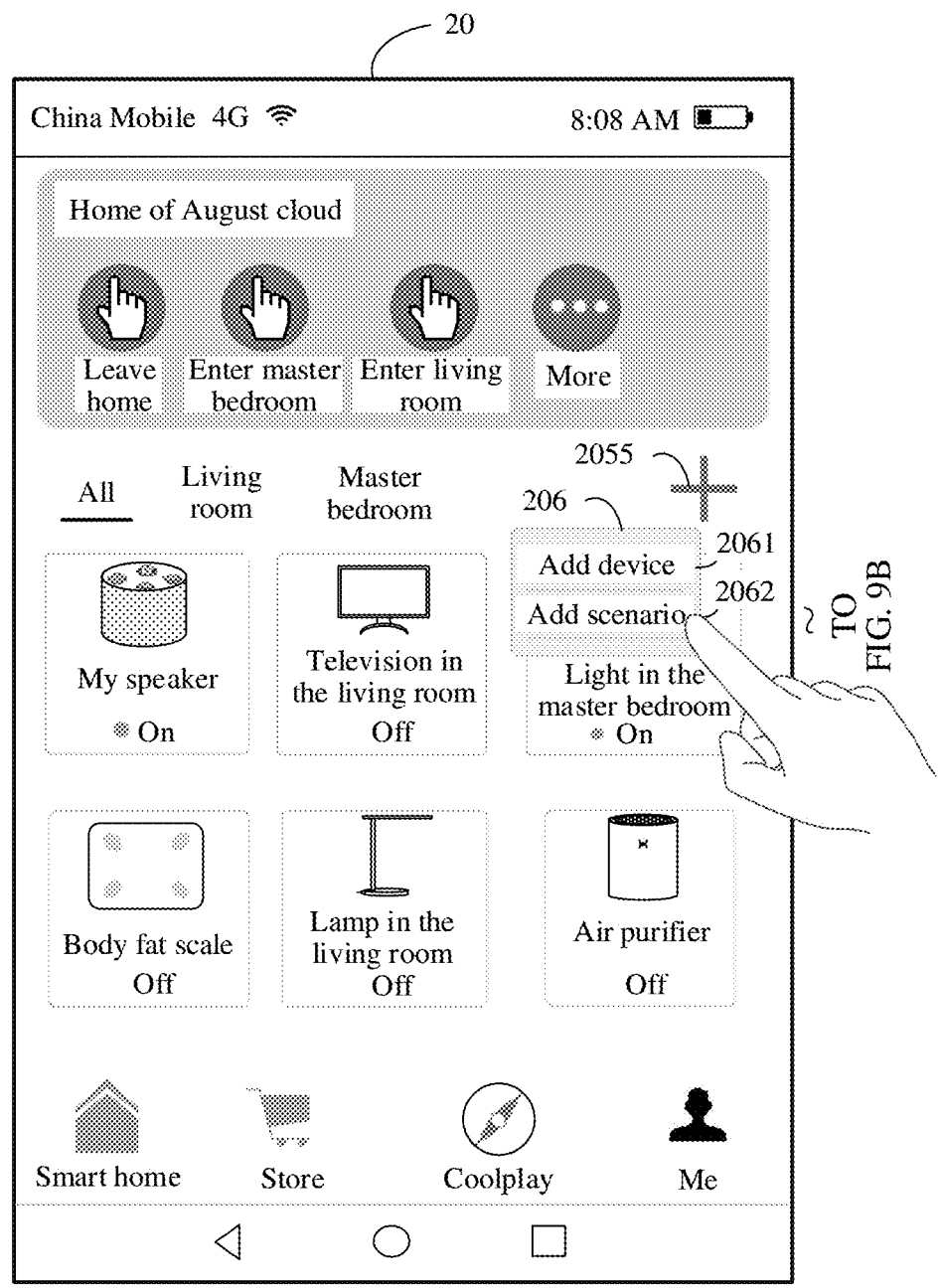
FIG. 9A to FIG. 9E to FIG. 16A and FIG. 16B are respectively schematic diagrams of human-computer interaction interfaces according to embodiments of this application.

If a user wants to add a "go home" rule to a smart home APP, the user may tap an add control 2055 in a smart home application interface 20. FIG. 9A to FIG. 9E are a schematic diagram of a human-computer interaction interface according to an embodiment of this application. As shown in FIG. 9A, in response to a touch operation performed by the user on the add control 2055, an electronic device displays a selection entry 206, where the selection entry 206 includes an add device option 2061 and an add scenario option 2062. The add device option 2061 is used to add a smart home device connected to the electronic device 100. The add scenario option 2062 is used to add a rule for collaboratively completing tasks by smart home devices, for example, the "go home" rule.

S101: The electronic device receives a tap operation performed on the add scenario option 2062.

S102: The electronic device displays a scenario setting interface 30.

Figure 9B:
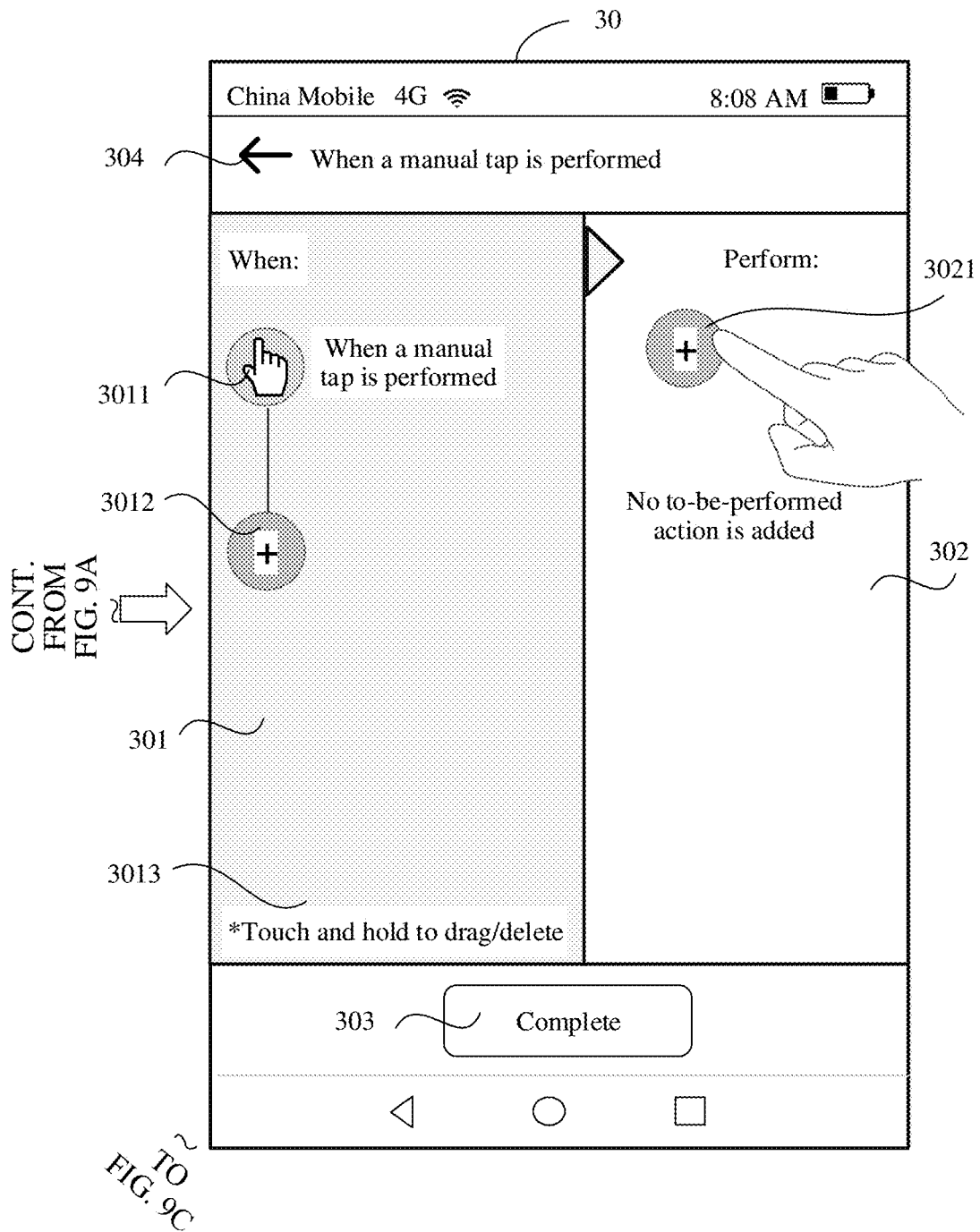

As shown in FIG. 9B, in response to the tap operation performed by the user on the add scenario option 2062, the electronic device displays the scenario setting interface 30. As shown in FIG. 9B, the scenario setting interface 30 includes a condition setting area 301, a task setting area 302, a complete control 303, and a back control 304.

The condition setting area 301 includes a "when a manual tap is performed" control 3011, an add condition control 3012, and a prompt 3013.

The "when a manual tap is performed" control 3011 is used to indicate that a selected trigger condition for the rule for cooperatively completing tasks is "when a manual tap is performed". For example, as shown in FIG. 9B, the electronic device 100 may select a trigger condition by default: When a manual tap is performed. The selected default trigger condition may be deleted. In response to a user operation performed on the "when a manual tap is performed" control 3011, for example, a touch and hold operation, the "when a manual tap is performed" control 3011 may be deleted or moved. For details, refer to descriptions in FIG. 16A and FIG. 16B.

The add condition control 3012 is used to add a trigger condition for the rule for cooperatively completing tasks. For details, refer to descriptions in FIG. 15A to FIG. 15D.

The prompt 3013 may be used to prompt "touch and hold to drag/delete".

The back control 304 is used to return to an interface previous to the scenario setting interface 30. In response to a tap operation performed by the user on the back control 304, the electronic device 100 displays the smart home application interface 20.

The task setting area 302 includes an add task control 3021.

S103: The electronic device receives a tap operation performed on the add task control 3021.

S104: The electronic device displays a task setting interface 40.

Figure 9C:
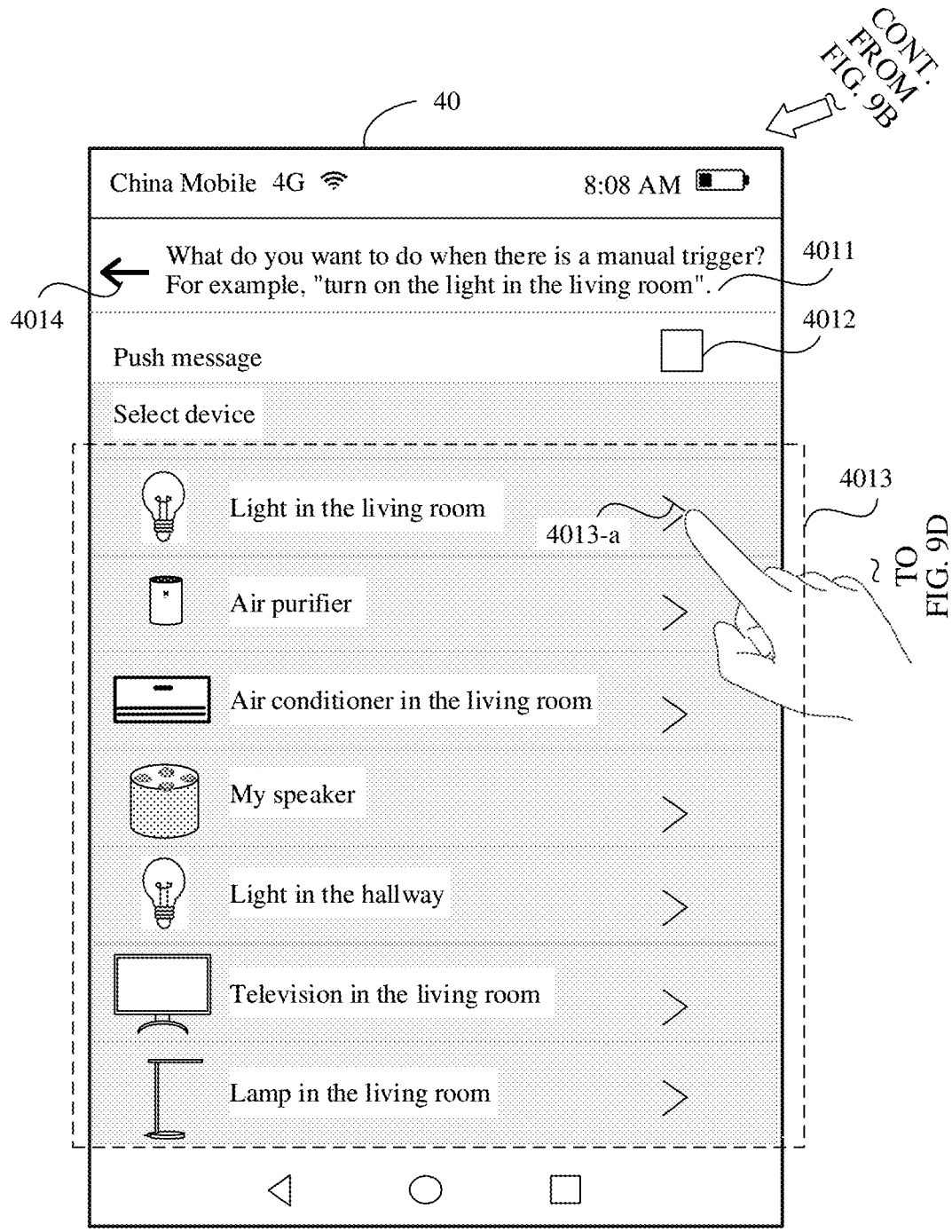

As shown in FIG. 9C, in response to a tap operation performed by the user on the add task control 3021, the electronic device displays the task setting interface 40. The task setting interface 40 includes a prompt 4011 "what do you want to do when there is a manual trigger?For example, "turn on the light in the living room"", a prompt message selection control 4012, a device setting list 4013, and a back control 4014.

The prompt message selection control 4012 is used to specify whether a push message is included and displayed for a task when cooperatively completing tasks is performed. For example, when the prompt message selection control 4012 is selected, and after cooperatively completing tasks by smart home devices is performed, the electronic device may display a push message: A light in a living room, a light in a hallway, a television in the living room, and an air conditioner in the living room are already sequentially turned on.

In this embodiment of this application, sequentially turning on the light in the living room, the light in the hallway, the television in the living room, and the air conditioner in the living room means that these devices are started in sequence. For example, sequentially turning on the light in the living room, the light in the hallway, the television in the living room, and the air conditioner in the living room may be implemented as: first turning on the light in the living room and the light in the hallway, then turning on the television in the living room after a delay of a time period (for example, 500 ms), and finally turning on the air conditioner in the living room after a delay of a time period (for example, 600 ms).

The device setting list 4013 includes a task setting entrance for one or more smart home devices. For example, as shown in FIG. 9C, the device setting list 4013 may include task setting entrances for the following smart home devices: the light in the living room, an air purifier, the air conditioner in the living room, a speaker, the light in the hallway, the television in the living room, and a lamp in the living room. In response to a slide operation performed by the user on the device setting list 4013, the electronic device may display task setting entrances for more smart home devices.

The back control 4014 is used to return to an interface previous to the task setting interface 40. In response to a tap operation performed by the user on the back control 4014, the electronic device 100 displays the scenario setting interface 30.

If the user wants to execute or use the "go home" rule to turn on the light in the living room, the user may tap a task setting entrance 4013-a for the light in the living room in the device setting list 4013, to enter a task setting interface 50 for the light in the living room, and perform setting in the interface 50.

S105: The electronic device receives a tap operation performed on the task setting entrance 4013-a for the light in the living room.

S106: The electronic device displays the task setting interface 50 for the light in the living room.

In response to the tap operation performed by the user on the task setting entrance 4013-a for the light in the living room, the electronic device displays the task setting interface 50 for the light in the living room. The task setting interface 50 for the light in the living room includes an on option 501, an off option 502, an on/off option 503, a switch to auto mode option 504, and a back control 505.

In response to a tap operation performed by the user on the on option 501, the light in the living room is turned on when the "go home" rule is executed. In response to a tap operation performed by the user on the off option 502, the light in the living room is turned off when the "go home" rule is executed. In response to a tap operation performed by the user on the on/off option 503, when the "go home" rule is executed, the electronic device obtains an on/off state of the light in the living room. If the light in the living room is in the on state, the light in the living room is turned off. If the light in the living room is in the off state, the light in the living room is turned on. In response to a tap operation performed by the user on the switch to auto mode option 504, when the "go home" rule is executed, the light in the living room is switched to a mode in which brightness and a color are automatically adjusted based on an environment.

Figure 9D:
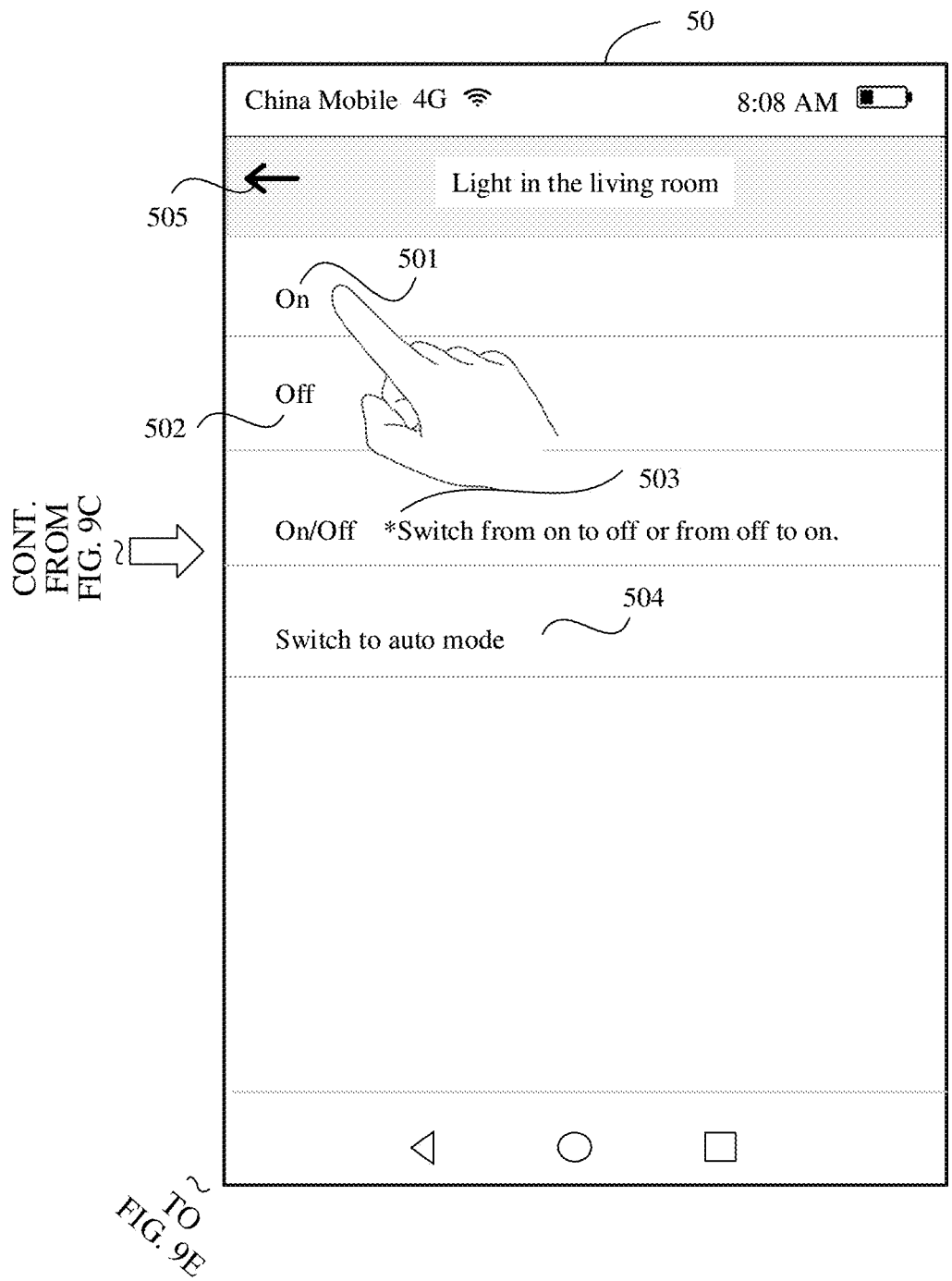

As shown in FIG. 9D, the task setting interface 50 for the light in the living room may further include a prompt "switch from on to off or from off to on" for the on/off option 503.

For example, as shown in FIG. 9D, the user may tap the on option 501. The task setting interface 50 for the light in the living room may further include another option, for example, brightness is increased by 50 units. Alternatively, the user may tap other options. In this embodiment of this application, a device task is not limited to being set to "on", and may be set as another task.

S107: The electronic device receives a tap operation performed by the user on the on option 501.

In response to the tap operation performed by the user on the on option 501, the electronic device 100 stores the "go home" rule in which a task "turn on the light in the living room" is included.

S108: The electronic device displays the task setting interface 40.

Figure 9E:
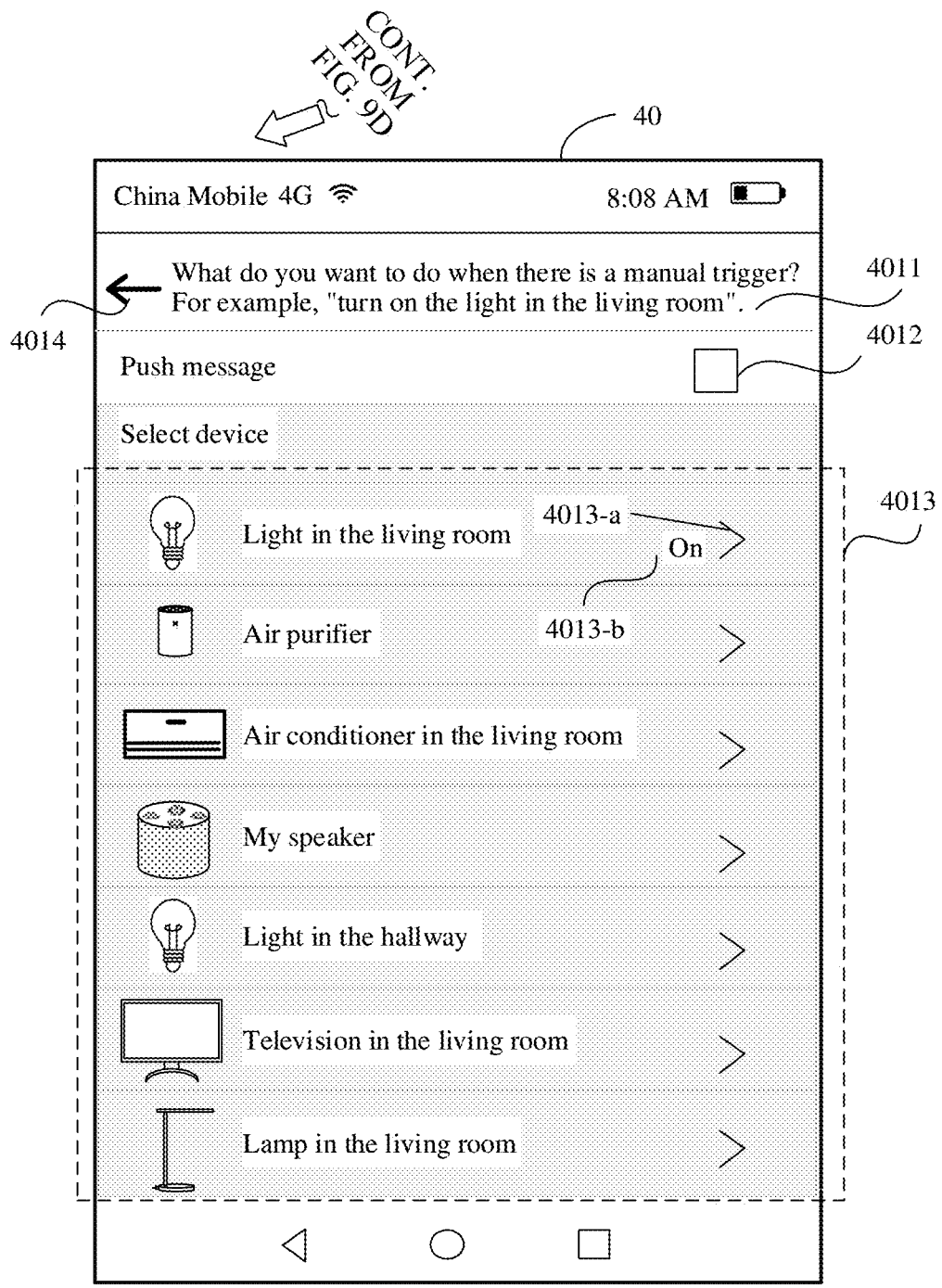

In addition, as shown in FIG. 9E, in response to the tap operation performed by the user on the on option 501, the electronic device displays the task setting interface 40. In the task setting interface 40, the task setting entrance for the light in the living room in the device setting list 4013 further includes a prompt 4013-b: on.

Figure 10A:
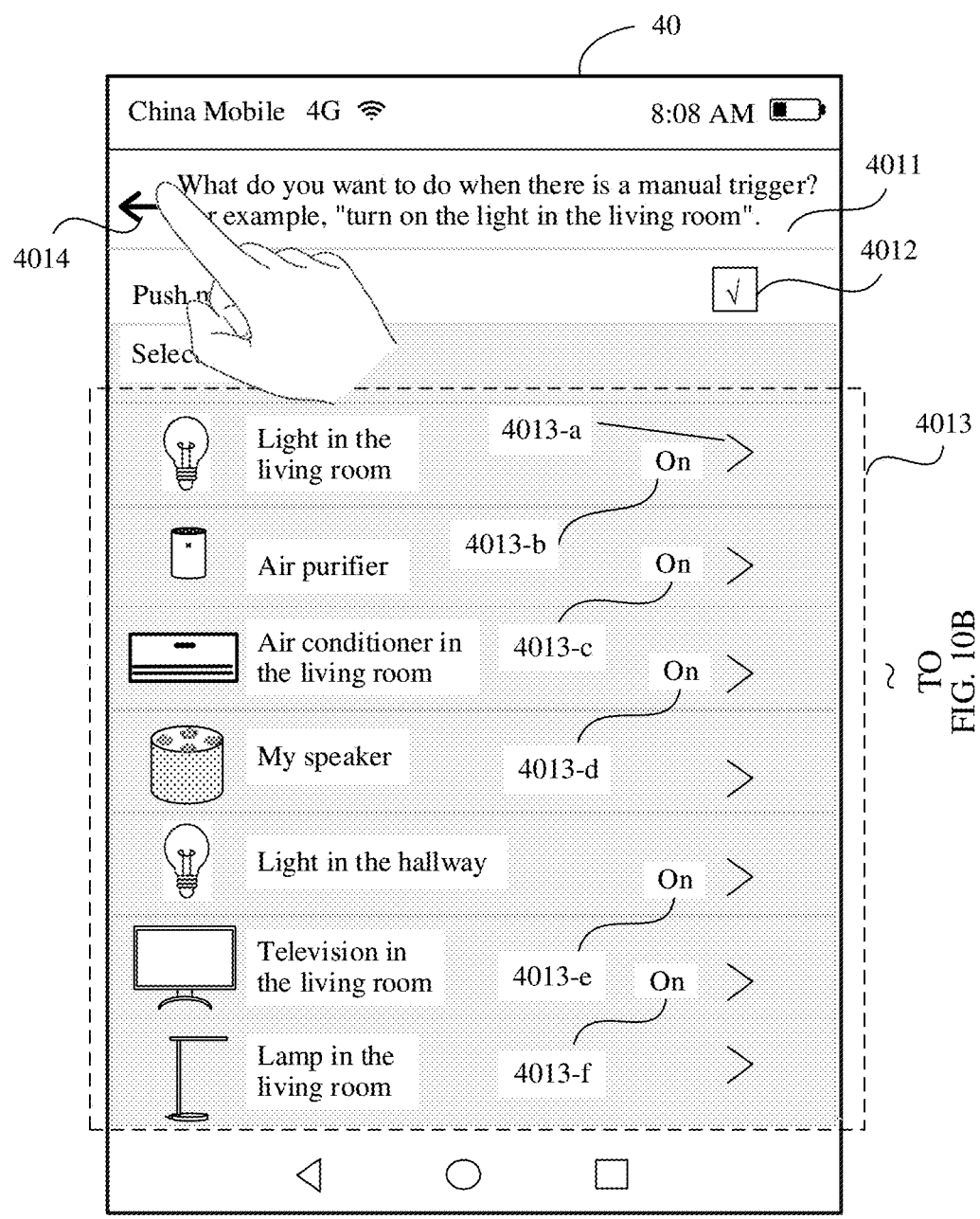

Like steps S104 to S108, in response to an operation of the user, the electronic device may specify that tasks corresponding to the "go home" rule further include: turning on the air purifier, turning on the air conditioner in the living room, turning on the light in the hallway, and turning on the television in the living room. FIG. 10A to FIG. 10F are a schematic diagram of a human-computer interaction interface according to an embodiment of this application. As shown in FIG. 10A, in the task setting interface 40, the device setting list 4013 further includes a prompt 4013-c of turning on the air purifier, a prompt 4013-d of turning on the air conditioner in the living room, a prompt 4013-e of turning on the light in the hallway, and a prompt 4013-f of turning on the television in the living room.

In response to a tap operation performed by the user on a selection box of the message selection control 4012, the electronic device displays, in the task setting interface 40, the selection box of the message selection control 4012 that is selected. When the prompt message selection control 4012 is selected, the electronic device may display a push message when executing the "go home" rule.

After setting the tasks corresponding to the rule, the user may tap the back control 4014 in the task setting interface 40 to return to the scenario setting interface 30.

S109: The electronic device receives a tap operation performed by the user on the back control 4014.

S110: The electronic device displays the scenario setting interface 30.

Figure 10B:
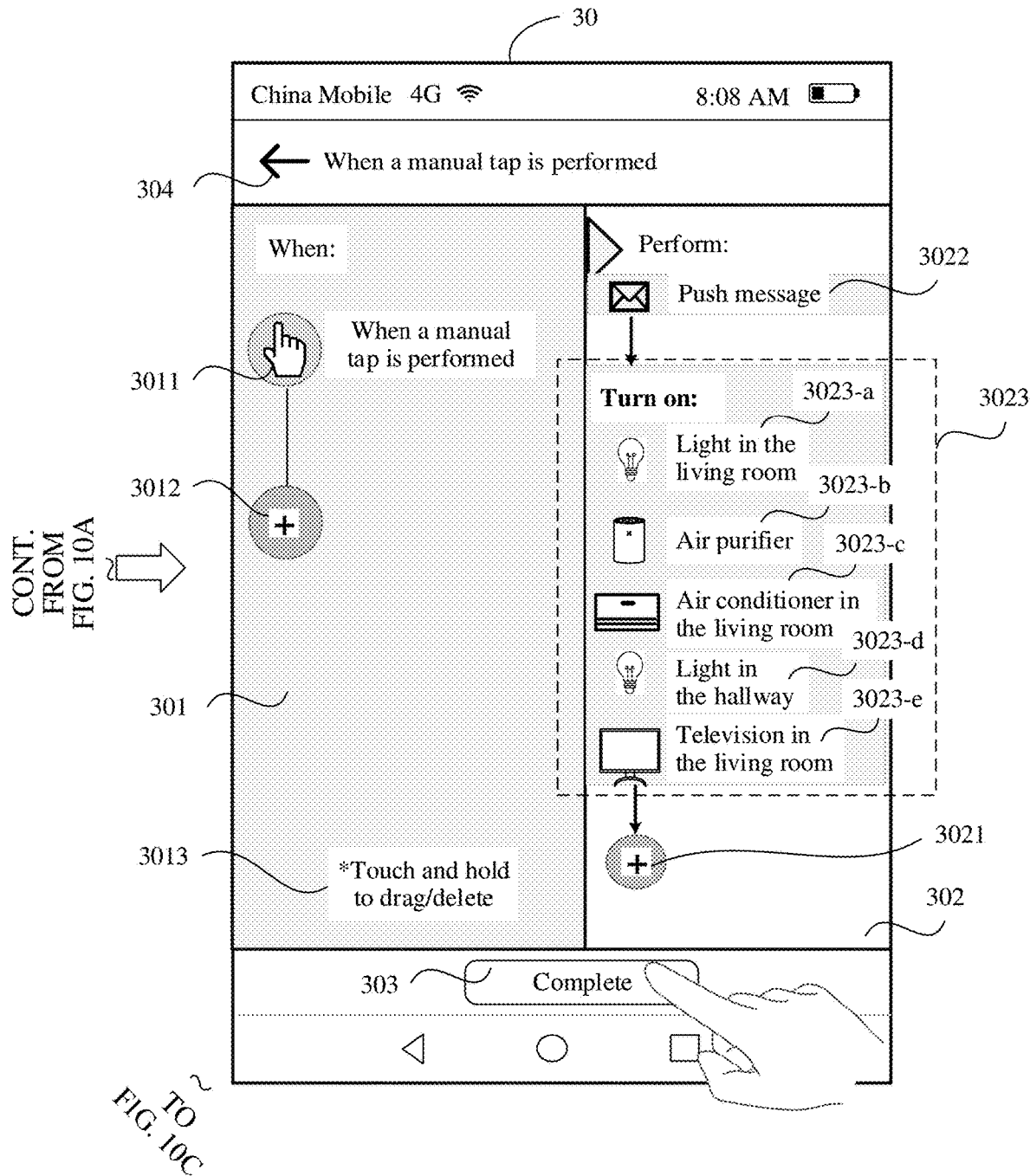

As shown in FIG. 10B, in response to the tap operation performed by the user on the back control 4014 in the task setting interface 40, the electronic device displays the scenario setting interface 30. As shown in FIG. 10B, in the scenario setting interface 30, the task setting area 302 includes one or more device task identifiers.

Optionally, the device task identifiers (a plurality of device task identifiers 3023 shown in FIG. 10B) in the task setting area 302 may alternatively be displayed by the electronic device by default.

For example, the task setting area 302 includes device task identifiers set in steps S104 to S109: a push message identifier 3022 and the plurality of device task identifiers 3023. The plurality of device task identifiers 3023 include an identifier 3023-a of turning on the light in the living room, an identifier 3023-b of turning on the air purifier, an identifier 3023-c of turning on the air conditioner in the living room, an identifier 3023-d of turning on the light in the hallway, and an identifier 3023-e of turning on the television in the living room.

The plurality of device task identifiers 3023 represent that the rule includes a plurality of device task identifiers, and each device task identifier indicates one smart home device task. This embodiment of this application is described by using an example in which all the device task identifiers are used to identify enabled tasks. It may be understood that the plurality of device task identifiers are not limited to identifying the enabled tasks, and may be further used to identify the following smart home device tasks: a task of closing a smart home device (for example, closing a smart refrigerator), a task of changing an operating parameter of a smart home device (increasing an operating temperature of a smart refrigerator by 2 degrees Celsius), and a task of switching a smart home device to a sleep mode.

S111: The electronic device receives a tap operation performed by the user on the complete control 303.

S112: The electronic device obtains a surge current of a device corresponding to each of the plurality of device task identifiers 3023.

S113: The electronic device detects whether a superposition of surge currents of devices corresponding to the plurality of device identifiers is greater than or equal to a specified threshold.

If the superposition of the surge currents of the devices corresponding to the plurality of device identifiers is greater than or equal to the specified threshold, step S114 is performed. If the superposition of the surge currents of the devices corresponding to the plurality of device identifiers is less than the specified threshold, step S115 is performed.

In this embodiment of this application, the specified surge current threshold may be determined based on maximum power or a rated current that can be supported by a drop cable (namely, an input of the live wire in the example shown in FIG. 2). A home cable of 6 square millimeters is used as an example. Maximum power of the drop cable is 6 kW per single phase, and a rated current of the drop cable is 27 A. In this case, the specified threshold may be 27 A. The specified threshold may be stored on a smart meter or a server. The electronic device obtains the specified threshold from the smart meter or the server.

In some embodiments of this application, the specified surge current threshold may alternatively be set by the user on the electronic device. For example, the user sets the specified threshold to 50 A on the electronic device. In some other embodiments of this application, if the server, a router, or the electronic device detects that a surge current in a smart home system exceeds a current value (for example, 25 A or a smaller value), power supply to the smart home system is disconnected, in other words, a circuit breaker trips. In this case, it may be determined that the specified threshold of the surge current is 25 A.

In this embodiment of this application, a surge current of each device may be locally stored on the electronic device, or may be obtained by the electronic device from another device such as the server, the router, or the smart home device.

In this embodiment of this application, the surge current of each smart home device may be a preset value, and the preset value may be an empirical value or a measurement value. Descriptions are separately provided in the following:
(1) The Surge Current of Each Smart Home Device is an Empirical Value.

Each smart home device may correspond to an empirical value of a surge current.

For example, upon delivery, an air purifier of a model A stores an empirical value, that is, 6 A, of a surge current of the air purifier, a smart air conditioner of a model B stores an empirical value, that is, 10 A, of a surge current of the smart air conditioner, and a smart television of a model C stores an empirical value, that is, 4 A, of a surge current of the smart television.

In some embodiments of this application, the empirical value of the surge current corresponding to each smart home device may alternatively be stored on the server. For example, the server may store smart home devices of various models and surge current values corresponding to the smart home devices.

The electronic device may obtain the empirical value of the surge current of each smart home device in the smart home system in advance. For example, after the smart home system shown in FIG. 1 is established, the electronic device may obtain and store empirical values of surge currents of the smart light 400, the smart television 401, and the smart air conditioner 402, and use the empirical values as the surge currents of the smart light 400, the smart television 401, and the smart air conditioner 402. Then, when performing step S112, the electronic device may directly locally obtain the surge current of the device corresponding to each of the plurality of device task identifiers 3023.

In another possible embodiment, when receiving the tap operation performed by the user on the complete control 303, the electronic device may obtain the empirical value of the surge current of the device corresponding to each of the plurality of device task identifiers 3023 from the device corresponding to each of the plurality of device task identifiers 3023, and use the empirical value of the surge current as the surge current of the device. For example, when receiving the tap operation performed by the user on the complete control 303 shown in FIG. 10B, the electronic device may perform the following operations: Obtain an empirical value of a surge current of the light in the living room from the light in the living room, and use the empirical value as the surge current of the light in the living room; obtain an empirical value of a surge current of the air purifier from the air purifier, use the empirical value as the surge current of the air purifier; obtain an empirical value of a surge current of the air conditioner in the living room from the air conditioner in the living room, and use the empirical value as the surge current of the air conditioner in the living room; obtain an empirical value of a surge current of the light in the hallway from the light in the hallway, and use the empirical value as the surge current of the lights in the hallway; and obtain an empirical value of a surge current of the television in the living room from the television in the living room, and use the empirical value as the surge current of the television in the living room.

(2) The Surge Current of Each Smart Home Device is a Measurement Value.

Each smart home device has a surge current value when the smart home device is turned on, and the smart meter may obtain the surge current value. The surge current of each smart home device may be a surge current or surge currents that is/are collected by the smart meter when the smart home device is started for one or more times. Then, the smart meter or a device (the electronic device, the server, the router, or the smart home device) determines the surge current of the smart home device based on the surge current or surge currents that is/are obtained when the smart home device is started for one or more times. The smart meter may alternatively send, to another device such as the server, the router, or a smart home device other than the smart meter, a surge current generated each time a device performs an action (for example, the device is started or closed, or a parameter is changed).

For example, the smart meter collects surge currents of the smart air conditioner in the smart home system when the smart air conditioner is turned on for several latest times (for example, 100 times). Then, the electronic device obtains the surge currents that are obtained when the smart air conditioner is turned on for the latest 100 times, calculates an average value of the surge currents that are collected when the smart air conditioner is turned on for the latest 100 times, and uses the average value as a surge current of the smart air conditioner. A surge current of another smart home device may be obtained in a similar way.

For another example, the smart meter collects surge currents of the smart television in the smart home system when the smart television is turned on for latest 50 times, then calculates an average value of the surge currents collected when the smart television is turned on for the latest 50 times, and uses the average value as a surge current of the smart television. Then, the smart meter sends the surge current of the smart television to the electronic device for storage. The smart meter may send an updated surge current of the smart television to the electronic device at a specific time interval (for example, 48 hours) or at a specific frequency (every 50 times of turn-on of the smart television).

S114: The electronic device displays a risk prompt interface 60.

Figure 10C:
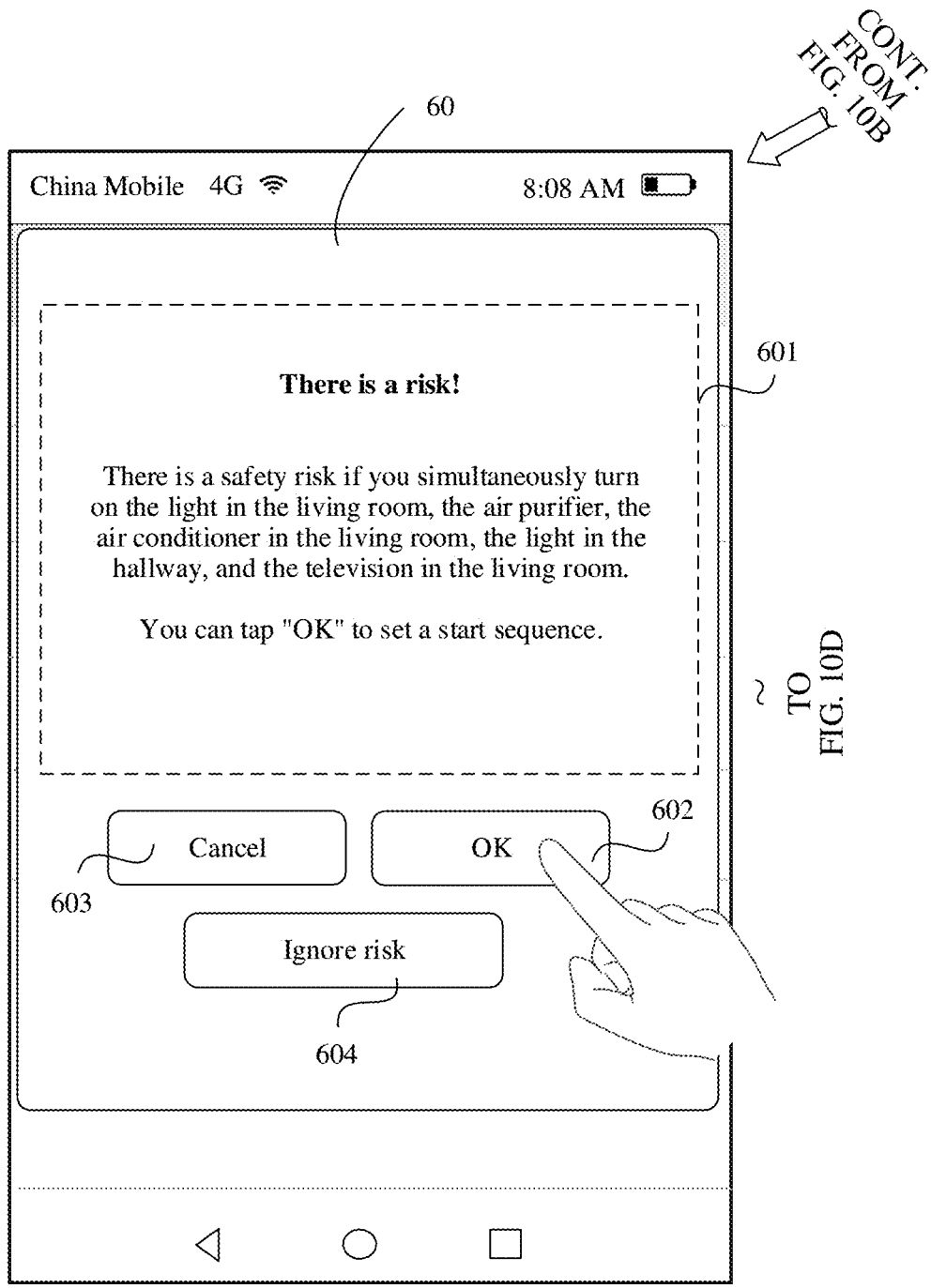

As shown in FIG. 10C, the risk prompt interface 60 includes a risk prompt 601, an OK control 602, a cancel control 603, and an ignore risk control 604.

The risk prompt 601 may include: There is a safety risk if you simultaneously turn on the light in the living room, the air purifier, the air conditioner in the living room, the light in the hallway, and the television in the living room. You can tap "OK" to set a start sequence.

The cancel control 603 is used to return to the scenario setting interface 30. In response to a tap operation performed by the user on the cancel control 603, the electronic device displays the scenario setting interface 30.

The ignore risk control 604 is used to skip setting start of devices in a staggered manner. In response to a tap operation performed by the user on the ignore risk control 604, the electronic device displays an interface 90 of determining to ignore a risk. For details, refer to an example described in FIG. 13.

If the user wants to turn on the light in the living room, the air purifier, the air conditioner in the living room, the light in the hallway, and the television in the living room in a staggered manner, the user may tap the OK control in the risk prompt interface 60.

S115: The electronic device displays a scenario name setting interface 80.

Because the superposition of the surge currents of the devices corresponding to the plurality of device identifiers is less than the specified threshold (for example, 27 A), the electronic device does not need to start the plurality of smart home devices in a staggered manner, but simultaneously start the plurality of smart home devices. In other words, the electronic device stores the "go home" rule in which tasks are simultaneously starting the plurality of smart home devices. For example, as shown in FIG. 10B, tasks corresponding to the "go home" rule are simultaneously turning on the light in the living room, the air purifier, the air conditioner in the living room, the light in the hallway, and the television in the living room.

Figure 12A:
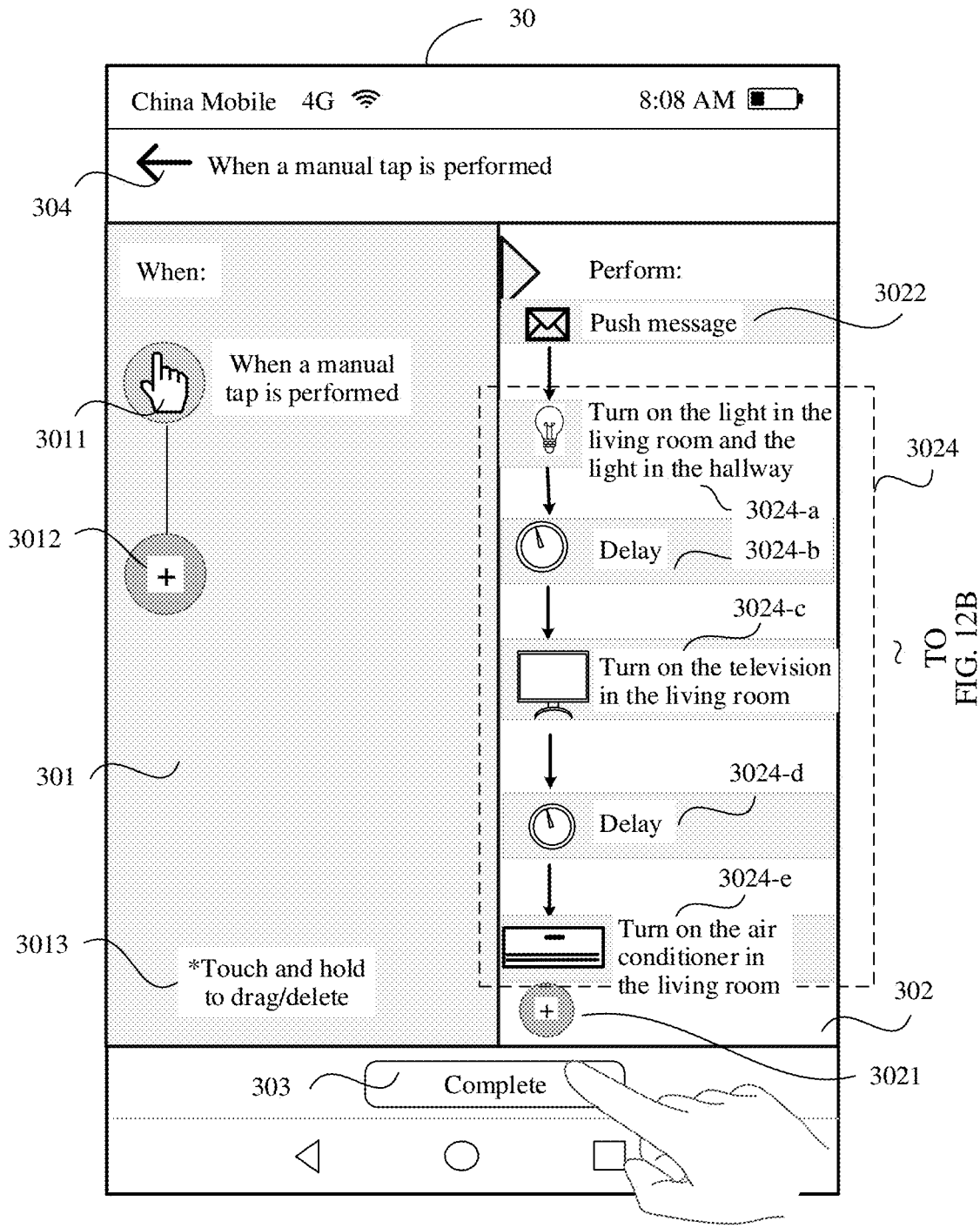
Figure 12B:
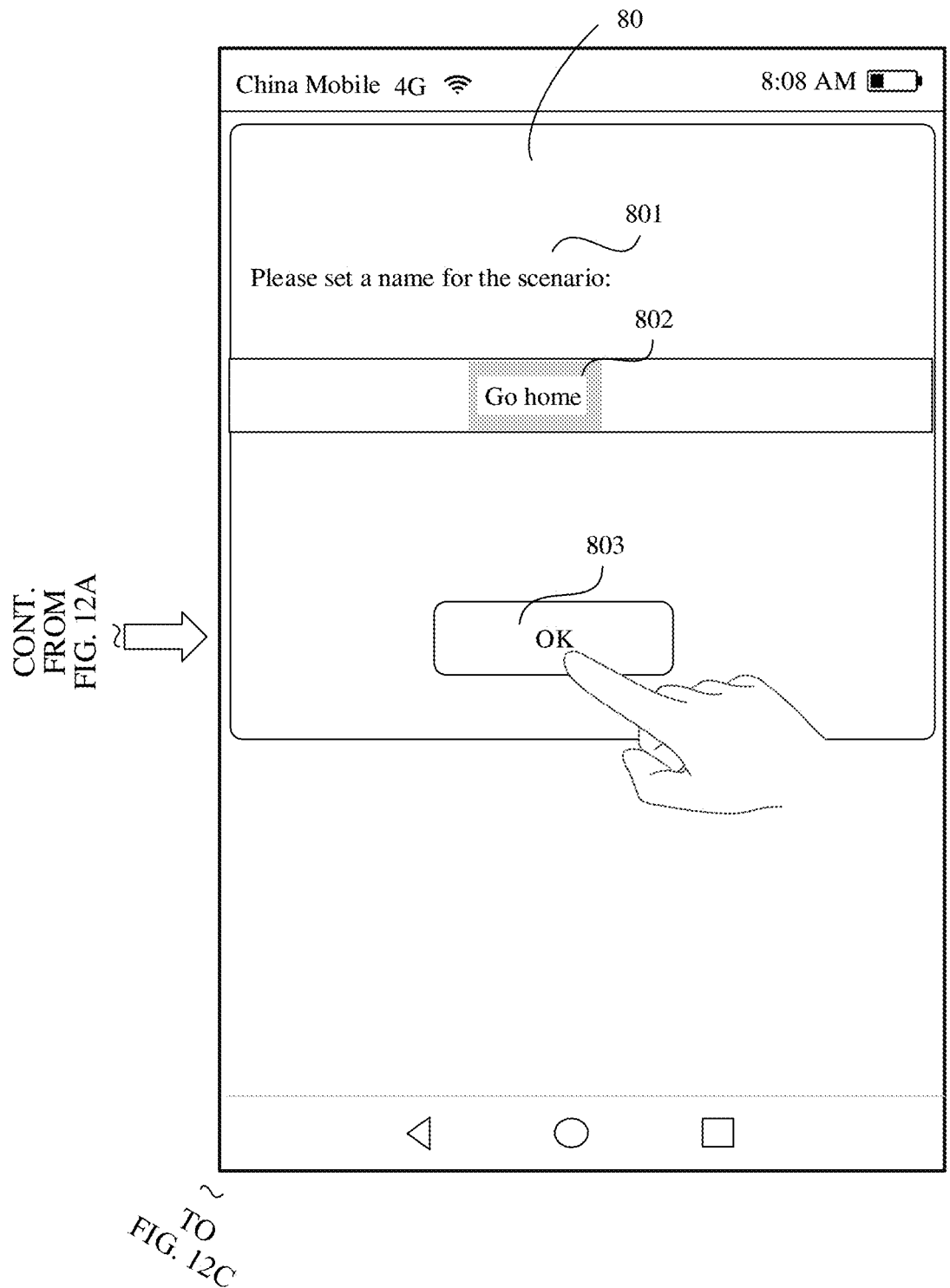

The scenario name setting interface is shown in FIG. 12B. After step S115 is performed, steps S123 and S124 may be performed.

S116: The electronic device receives a tap operation performed by the user on the OK control 602.

S117: The electronic device displays a start sequence setting interface 70.

Figure 10D:
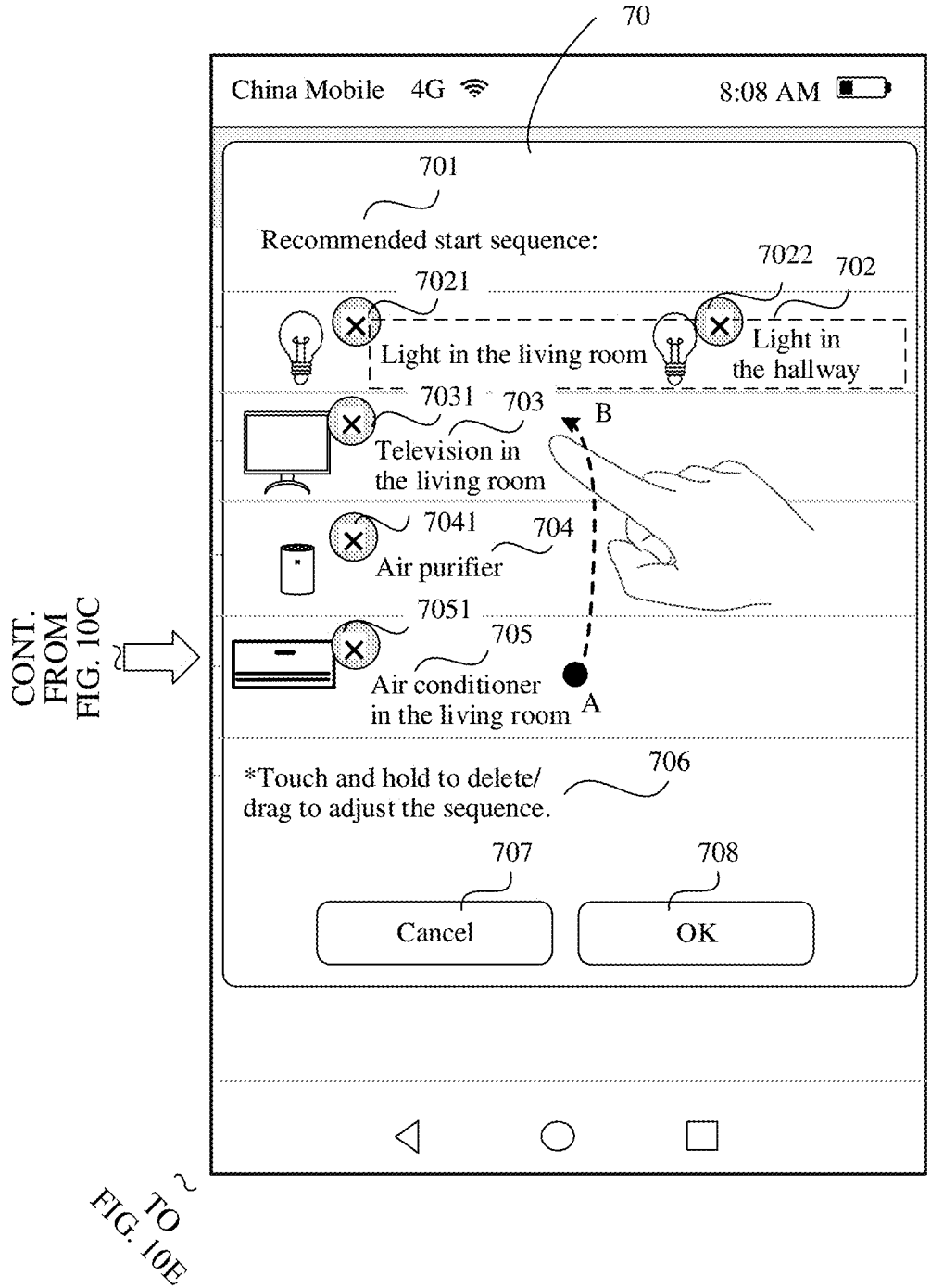

As shown in FIG. 10C and FIG. 10D, in response to the tap operation performed by the user on the OK control 602, the electronic device displays the start sequence setting interface 70. The start sequence setting interface 70 includes a prompt 701, a prompt 706, a cancel control 707, an OK control 708, and a plurality of sequentially displayed device identifiers, that is, an identifier 702 of the light in the living room, an identifier 702 of the light in the hallway, an identifier 703 of the television in the living room, an identifier 704 of the air purifier, and an identifier 705 of the air conditioner in the living room.

The prompt 701 includes "recommended staggered start sequence".

In the plurality of sequentially displayed device identifiers, a sequence of displaying the device identifiers indicates a sequence of executing tasks by smart home devices corresponding to the "go home" rule. In this embodiment of this application, the electronic device may determine, based on smart home devices corresponding to the plurality of device identifiers, a recommended sequence of displaying the device identifiers.

The following describes how the electronic device determines the recommended sequence of displaying the device identifiers. The recommended sequence of displaying the device identifiers may be determined based on a sequence preset by the electronic device. For example, the electronic device may store home device task categories and a task priority corresponding to each home device task category. Table 1 shows an example of home device task categories and a task priority corresponding to each home device task category that are provided in this embodiment of this application.

TABLE 1

Example of home device task categories and a task priority corresponding to each home device task category

| Home device task category | Task priority |
|---|---|
| Turn on a smart light | 1 |
| Turn on a smart television | 2 |
| Open a smart curtain | 3 |
| Turn on a smart air conditioner | 4 |
| Turn on a smart fan | 5 |
| Turn on a smart speaker | 6 |
| Turn on an air purifier | 7 |
| Start a computer | 8 |
| Start a smart refrigerator | 9 |
| Start a smart washing machine | 10 |
| Start a smart water heater | 11 |
| Start an intelligent sweeping robot | 12 |

As shown in Table 1, the electronic device may store common home device task categories and a task priority corresponding to each home device task category. The task priority includes levels 1 to 12. A higher task priority indicates a higher rank in a task sequence set by the electronic device. For example, as shown in FIG. 10A, when the electronic device detects that according to the "go home" rule, devices, the light in the living room, the air purifier, the air conditioner in the living room, the light in the hallway, and the television in the living room, need to be turned on simultaneously, the electronic device determines a task sequence based on a task priority corresponding to each home device task. The task priorities corresponding to the home device task categories, that is, turning on the light in the living room, turning on the air purifier, turning on the air conditioner in the living room, turning on the light in the hallway, and turning on the television in the living room, are 1, 7, 4, 1, and 2 respectively. In this case, the electronic device sets a task sequence as: turning on the light in the living room and the light in the hallway, turning on the television in the living room, turning on the air purifier, and turning on the air conditioner in the living room. In the start sequence setting interface 70 shown in FIG. 10D, the plurality of sequentially displayed device identifiers are the identifier 702 of the light in the living room and the identifier 702 of the light in the hallway, the identifier 703 of the television in the living room, the identifier 704 of the air purifier, and the identifier 705 of the air conditioner in the living room.

It may be understood that the example shown in Table 1 is merely used to explain this embodiment of this application, and should not constitute a limitation. Table 1 may further include another device task and a corresponding task priority. For example, Table 1 further includes device tasks such as turning off the smart light, turning off the smart television, and turning on the smart air conditioner, and respective task priorities corresponding to the device tasks.

In some other embodiments of this application, the recommended sequence of displaying the device identifiers may alternatively be determined by the electronic device based on a user habit, for example, determined by the electronic device by collecting statistics about historical device start sequences set by the user.

In some other embodiments of this application, the recommended sequence of displaying the device identifiers may be determined by the electronic device based on surge parameters (such as duration of a surge and impact duration of the surge) of all devices. Specifically, a rule for determining, by the electronic device, the recommended sequence of displaying the device identifiers may be as follows: Shorter duration of a surge indicates a higher rank in a specified task sequence. Shorter impact duration of the surge indicates a higher rank in the specified task sequence.

Impact duration of a surge is duration for which a surge generated by a device affects an operating state of another device. The impact duration of the surge is determined based on mutual inductance that exists between smart home devices. For example, a surge is generated when the smart air conditioner is turned on, and the surge causes brightness of the smart light in the smart home system to become dim. Duration for which the surge causes brightness of the smart light to become dim may be referred to as impact duration of the surge of the smart air conditioner.

For example, Table 2 is an example of duration of a surge of a smart home device, impact duration of the surge, and a corresponding task priority that are provided in this embodiment of this application.

TABLE 2

Example of duration of a surge of a smart home device, impact duration of the surge, and a corresponding task priority

| Home device task | Duration of a surge | Impact duration of the surge | Task priority |
|---|---|---|---|
| Turn on a smart light | <5 ms | <5 ms | 1 |
| Turn on a smart speaker | <5 ms | <5 ms | 1 |
| Open a smart curtain | <10 ms | <10 ms | 2 |
| Start a smart microwave oven | 20 ms | 50 ms | 3 |
| Turn on a smart fan | 30 ms | 50 ms | 4 |
| Turn on an air purifier | 30 ms | 50 ms | 4 |
| Turn on a smart television | 30 ms | 80 ms | 5 |
| Turn on a wall-mounted air conditioner | 40 ms | 100 ms | 6 |
| Start a computer | 50 ms | 100 ms | 7 |
| Start a smart washing machine | 50 ms | 130 ms | 8 |
| Start a smart refrigerator | 70 ms | 200 ms | 9 |
| Turn on a central air conditioner | 80 ms | 300 ms | 10 |

As shown in Table 1, the electronic device may store duration of a surge corresponding to each device task and impact duration of the surge, and then determine a task priority of the device task based on the duration of the surge and/or the impact duration of the surge. Duration of a surge corresponding to a home device task is within 5 ms to 80 ms, and impact duration of the surge is within 5 ms to 300 ms. Shorter duration of a surge indicates a smaller task priority value and a higher rank in a specified task sequence. Shorter impact duration of the surge indicates a smaller task priority value and a higher rank in the specified task sequence.

In some embodiments of this application, as shown in FIG. 10A, the electronic device detects that according to the "go home" rule, home device tasks include: turning on the light in the living room, turning on the air purifier, turning on the air conditioner in the living room, turning on the light in the hallway, and turning on the television in the living room. The electronic device determines a task sequence based on a task priority corresponding to each home device task. The task priorities of the home device tasks, turning on the light in the living room, turning on the air purifier, turning on the air conditioner (a wall-mounted air conditioner) in the living room, turning on the light in the hallway, and turning on the television in the living room are 1, 4, 6, 1, and 5 respectively. A smaller task priority value indicates a higher rank in a specified task sequence. In this case, the electronic device sets a task sequence as: turning on the light in the living room and the light in the hallway, turning on the air purifier, turning on the television in the living room, and turning on the air conditioner in the living room. In a start sequence setting interface, the plurality of sequentially displayed device identifiers may alternatively be: the identifier of the light in the living room and the identifier of the light in the hallway, the identifier of the air purifier, the identifier of the television in the living room, and the identifier of the air conditioner in the living room. The start sequence setting interface is similar to the start sequence setting interface 70 shown in FIG. 10D, and the device identifiers may be displayed in the foregoing display sequence.

In some embodiments of this application, the recommended sequence of displaying the device identifiers may alternatively be determined by the electronic device based on surge currents of all devices. For example, a higher surge current indicates a larger task priority value of a smart home device and a lower rank in a task sequence set by the electronic device for the smart home device.

In some embodiments of this application, when determining a task sequence, the electronic device may alternatively specify that a plurality of device tasks are simultaneously started. To be specific, home device task groups corresponding to the "go home" rule are started in sequence, and each group may include a plurality of home device tasks. For example, as shown in FIG. 10D, two tasks of turning on the light in the living room and turning on the light in the hallway are considered as one group. A surge current generated when the plurality of home device tasks are simultaneously executed is lower than a specified threshold (for example, 27 A). The specified threshold may be determined by the smart meter based on the rated current of the drop cable, may be set by the user on the electronic device side, or may be determined by the server, the router, or the electronic device based on a rated current upon tripping of a circuit breaker in the smart home system.

A rule for grouping home device tasks is not limited in this embodiment of this application. In some embodiments of this application, the rule for grouping home device tasks may be determined based on a user habit of historically setting a group. For example, if it is obtained, through statistics collection, that the user sets, for a plurality of times, two tasks of turning on the light in the living room and turning on the air conditioner in the living room as one group, when determining a task sequence, the electronic device sets the two tasks of turning on the light in the living room and turning on the air conditioner in the living room as one group. The electronic device may further respond to a user operation (for example, a touch and hold to drag operation) to delete a task from a group or add a task to a group, add a different group, or the like.

In some other embodiments of this application, the rule for grouping home device tasks may alternatively be determined based on one or more of a surge current, duration of a surge, and impact duration of the surge. For example, a plurality of tasks for which a sum of surge currents is in a specified range (for example, 20 A to 27 A) are set as one group. For example, if a sum of surge currents generated upon turning on the light in the living room, turning on the air conditioner in the living room, and turning on the television in the living room is 25 A, these tasks are set as one group.

For example, as shown in FIG. 10D, the electronic device determines, based on smart home devices corresponding to the plurality of device identifiers, a recommended sequence of displaying the device identifiers: the identifier 702 of the light in the living room and the identifier 702 of the light in the hallway, the identifier 703 of the television in the living room, the identifier 704 of the air purifier, and the identifier 705 of the air conditioner in the living room. In this case, it indicates that based on the display sequence, when the electronic device executes the "go home" rule, a device start sequence is: the light in the living room and the light in the hallway, the television in the living room, the air purifier, and the air conditioner in the living room. A smart home device corresponding to the identifier of the light in the living room is the light in the living room, and a smart home device corresponding to the identifier of the light in the hallway is the light in the hallway. A smart home device corresponding to the identifier 703 of the television in the living room is the television in the living room. A smart home device corresponding to the identifier 704 of the air purifier is the air purifier. A smart home device corresponding to the identifier 705 of the air conditioner in the living room is the air conditioner in the living room.

S118: In response to a user operation, adjust a display sequence of the plurality of sequentially displayed device identifiers or delete a device identifier.

In this embodiment of this application, for each of the plurality of sequentially displayed device identifiers, a sequence of the device identifiers may be changed in response to a touch and hold to drag operation of the user. Each of the plurality of sequentially displayed device identifiers may be deleted from the plurality of device identifiers in response to a user operation.

For example, as shown in FIG. 10D, in response to a touch and hold operation performed by the user on the identifier 705 of the air conditioner in the living room, a sequence of all device identifiers may be edited, a location of each device identifier may be changed in response to a drag operation of the user, and each device identifier includes a delete identifier. Specifically, the identifier of the light in the living room includes a delete identifier 7021, and the identifier of the light in the hallway includes a delete identifier 7022. The identifier 703 of the television in the living room includes a delete identifier 7031. The identifier 704 of the air purifier includes a delete identifier 7041. The identifier 705 of the air conditioner in the living room includes a delete identifier 7051.

Figure 10E:
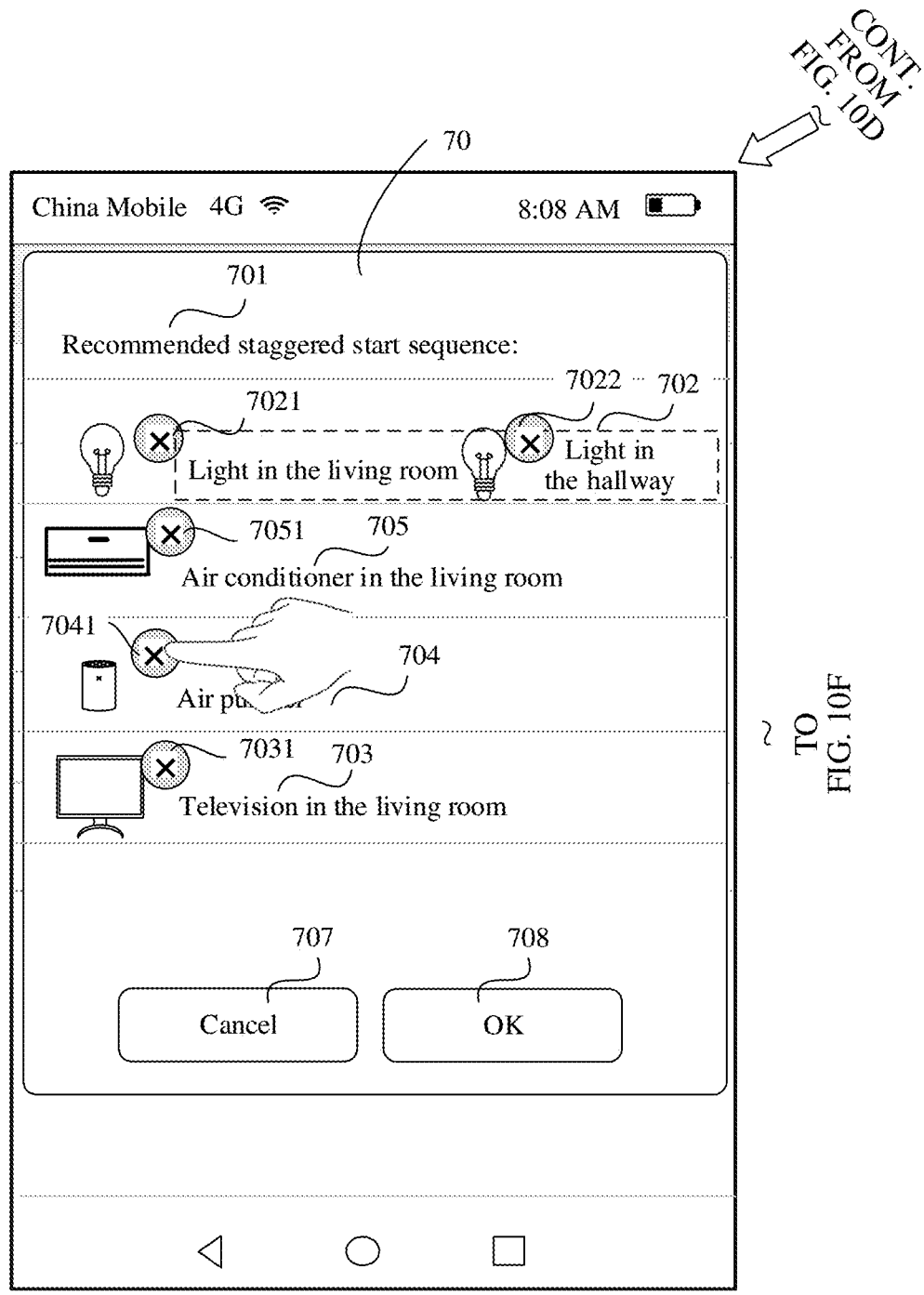

For example, as shown in FIG. 10D, the user may drag the identifier 705 of the air conditioner in the living room to change a location of the identifier 705 of the air conditioner in the living room. As shown in FIG. 10E, in response to a slide operation that is performed by the user on the identifier 705 of the air conditioner in the living room and that starts at a point A and ends at a point B, the electronic device 100 moves the identifier 705 of the air conditioner in the living room in front of the identifier 703 of the television in the living room for display.

For example, as shown in FIG. 10E, in response to a tap operation performed by the user on the delete identifier 7041 for the identifier 704 of the air purifier, the electronic device 100 deletes the identifier 704 of the air purifier from the plurality of device identifiers.

After editing a smart home device start sequence in the start sequence setting interface 70, the user may tap the OK control 708 to complete the setting.

In some embodiments of this application, when step S117 is performed, after the electronic device 100 deletes the identifier 704 of the air purifier from the plurality of device identifiers, the electronic device 100 may detect whether a superposition of surge currents of a plurality of devices corresponding to the plurality of device identifiers is greater than a specified threshold (for example, 27 A). If the electronic device detects that the superposition of the surge currents of the plurality of devices corresponding to the plurality of device identifiers is less than or equal to the specified threshold, the electronic device may display a prompt in the start sequence setting interface 70, to notify the user that the user may not need to set staggered start of the smart home devices.

Figure 11:
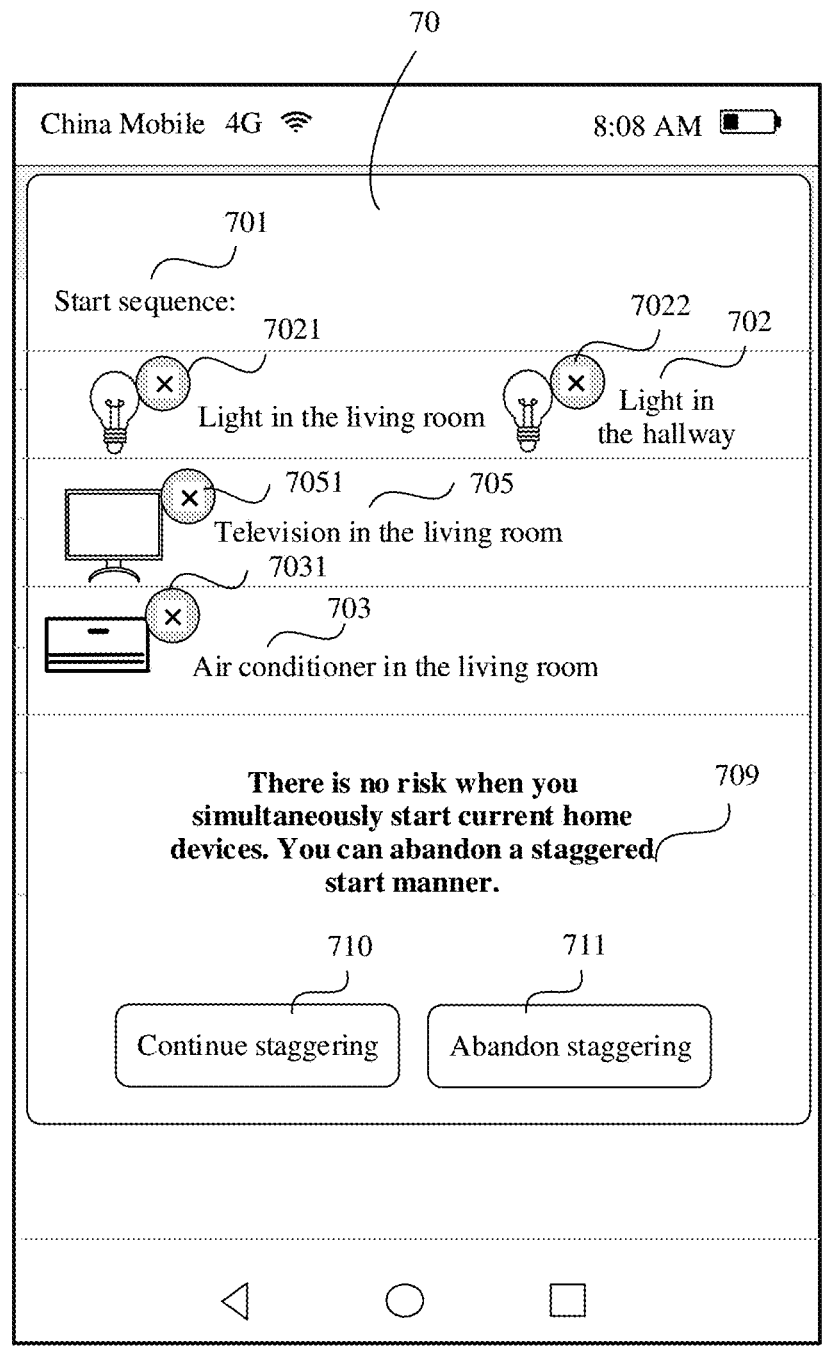

For example, FIG. 11 is a schematic diagram of a human-computer interaction interface according to an embodiment of this application. As shown in FIG. 11, the start sequence setting interface 70 may further include a prompt 709, a continue staggering control 710, and an abandon staggering control 711.

The prompt 709 includes "There is no risk when you simultaneously start current home devices. You can abandon a staggered start manner".

The continue staggering control 710 is used to indicate that the smart home devices are still started in staggered manner in a sequence of the plurality of sequentially displayed device identifiers in the start sequence setting interface 70. In response to a tap operation performed by the user on the continue staggering control 710, the electronic device displays the scenario setting interface 30 shown in FIG. 12A.

The abandon staggering control 711 is used to specify that staggering is not performed. When the tasks are executed, the smart home devices corresponding to the plurality of device identifiers are simultaneously started. In response to a tap operation performed by the user on the abandon staggering control 711, the electronic device displays the scenario setting interface 30 shown in FIG. 10B, and only the identifier 3023-*b* of the air purifier is deleted.

S119: The electronic device receives a tap operation performed by the user on the OK control 708.

S120: The electronic device displays the scenario setting interface 30.

Figure 10F:
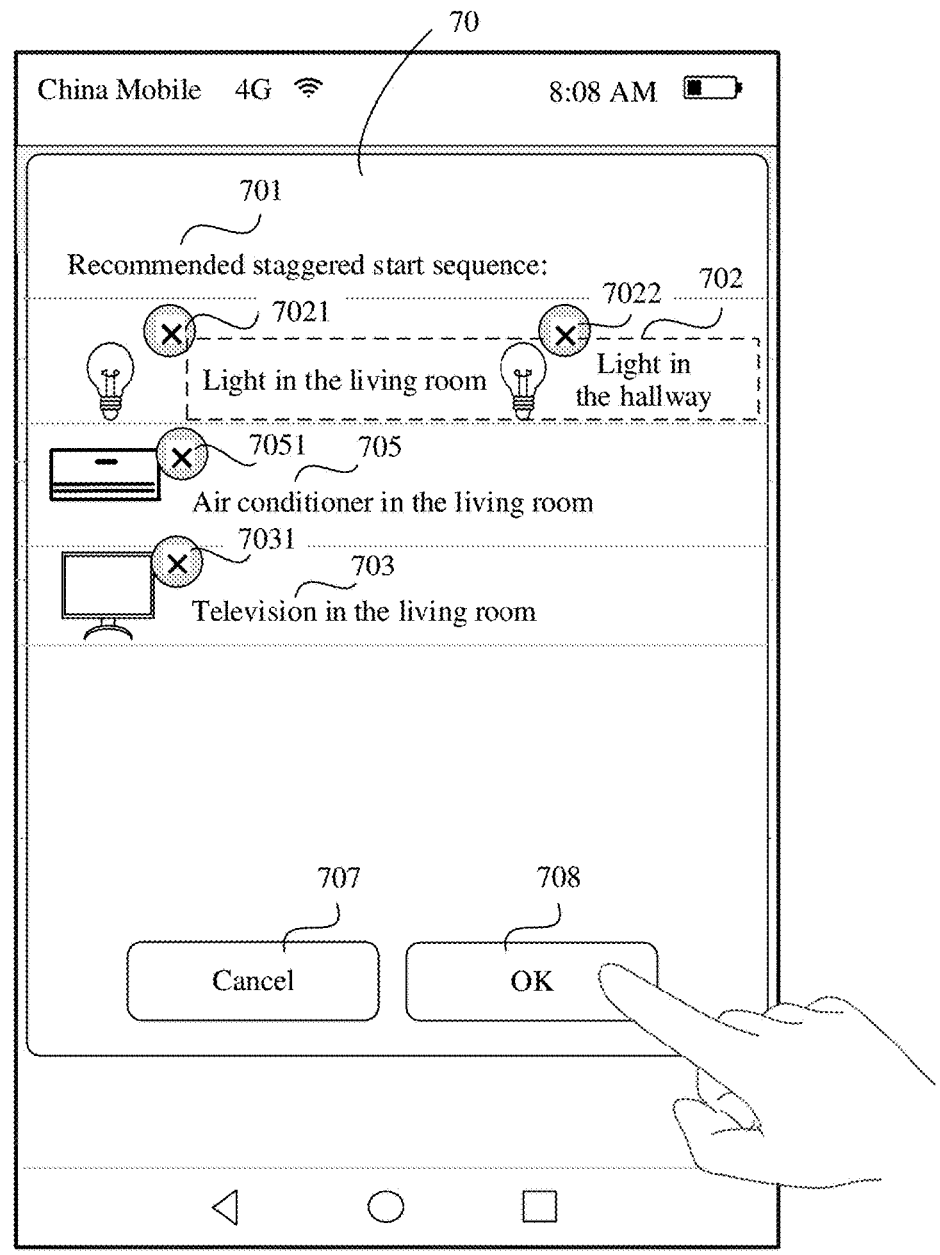
Figure 12C:
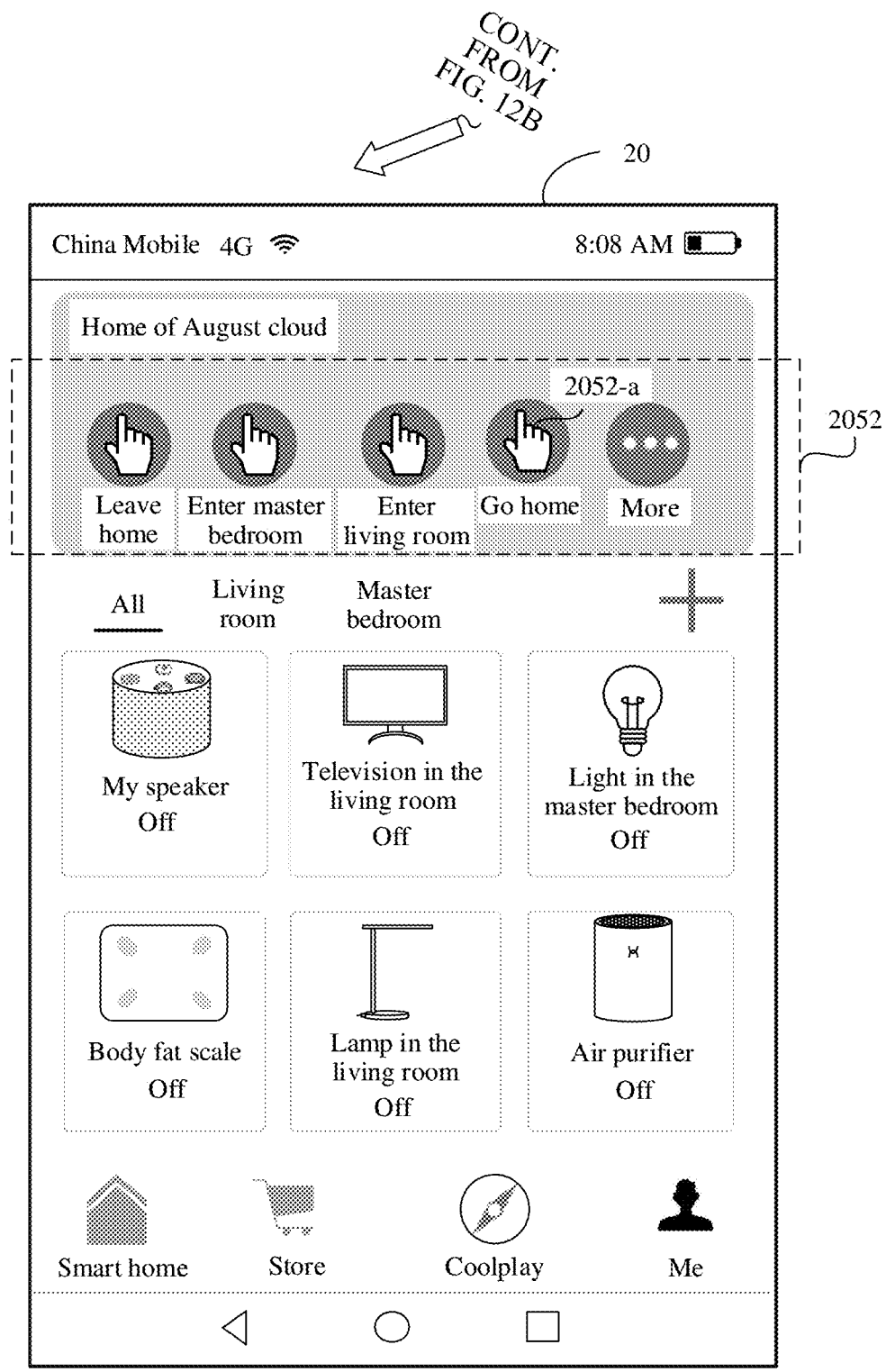

FIG. 12A to FIG. 12C are a schematic diagram of a human-computer interaction interface according to an embodiment of this application. As shown in FIG. 10F and in FIG. 12A, in response to a tap operation performed by the user on the OK control 708, the electronic device displays the scenario setting interface 30. As shown in FIG. 12A, the scenario setting interface 30 further includes a device start procedure prompt 3024. The device start procedure prompt 3024 includes a prompt 3024-*a* of turning on the light in the living room and the light in the hallway, a delay prompt 3024-*b*, a prompt 3024*c* of turning on the television in the living room, a delay prompt 3024-*d*, and a prompt 3024-*e* of turning on the air conditioner in the living room.

Optionally, the device start procedure prompt 3024 is not limited to being displayed in the scenario setting interface 30, and may alternatively be displayed in another interface. This is not limited in this embodiment of this application.

When the device start procedure prompt 3024 is used to notify the user that when the electronic device executes the "go home" rule, a start procedure is: first turning on the light in the living room and the light in the hallway, then turning on the television in the living room after a delay of a time period (for example, 5 milliseconds), and finally turning on the air conditioner in the living room after a delay of a time period (for example, 30 milliseconds).

Start wait duration of the television in the living room is 5 milliseconds, and start wait duration of the air conditioner in the living room is 30 milliseconds. Start wait duration may be determined based on duration of a surge of each device, may be determined based on impact duration of the surge of each device, or may be set to fixed duration. This is not limited in this embodiment of this application. For details, refer to descriptions in step S206 in an example described in FIG. 17A and FIG. 17B. Details are not described herein.

Optionally, when a smart home device is set to execute another task, for example, a task such as being closed or changing an operating parameter, start wait duration is execution wait duration of the smart home device.

S121: The electronic device receives a tap operation performed by the user on the complete control 303.

S122: The electronic device displays the scenario name setting interface 80.

After the electronic device receives the tap operation performed by the user on the complete control 303, the electronic device stores the "go home" rule, and stores a trigger condition for the rule and a task to be executed. For example, the trigger condition for the stored rule in the example shown in FIG. 12A to FIG. 12C is: When a tap operation performed by a user on a "go home" control 2052-*a* is detected. Tasks to be executed according to the rule are sequentially turning on the light in the living room and the light in the hallway, the television in the living room, and the air conditioner in the living room in a staggered manner.

As shown in FIG. 12B, the scenario setting interface 80 includes a prompt 801, an edit box 802, and an OK control 803.

The prompt 801 includes "please set a name for the scenario".

The edit box 802 is used to receive a setting of a user and display a specified name. For example, as shown in FIG. 12B, the edit box 802 includes a specified name: go home.

S123: The electronic device receives a tap operation performed by the user on the OK control 803.

S124: The electronic device displays the smart home application interface 20.

As shown in FIG. 12C, the scenario list in the smart home application interface 20 may include the "go home" control 2052-*a*. The user may tap the "go home" control 2052-*a* to trigger the condition for the "go home" rule, to execute the tasks: Sequentially turn on the light in the living room and the light in the hallway, the television in the living room, and the air conditioner in the living room in a staggered manner.

Optionally, the "go home" control 2052-*a* may be displayed on the top of the scenario list 2052.

Figure 13:
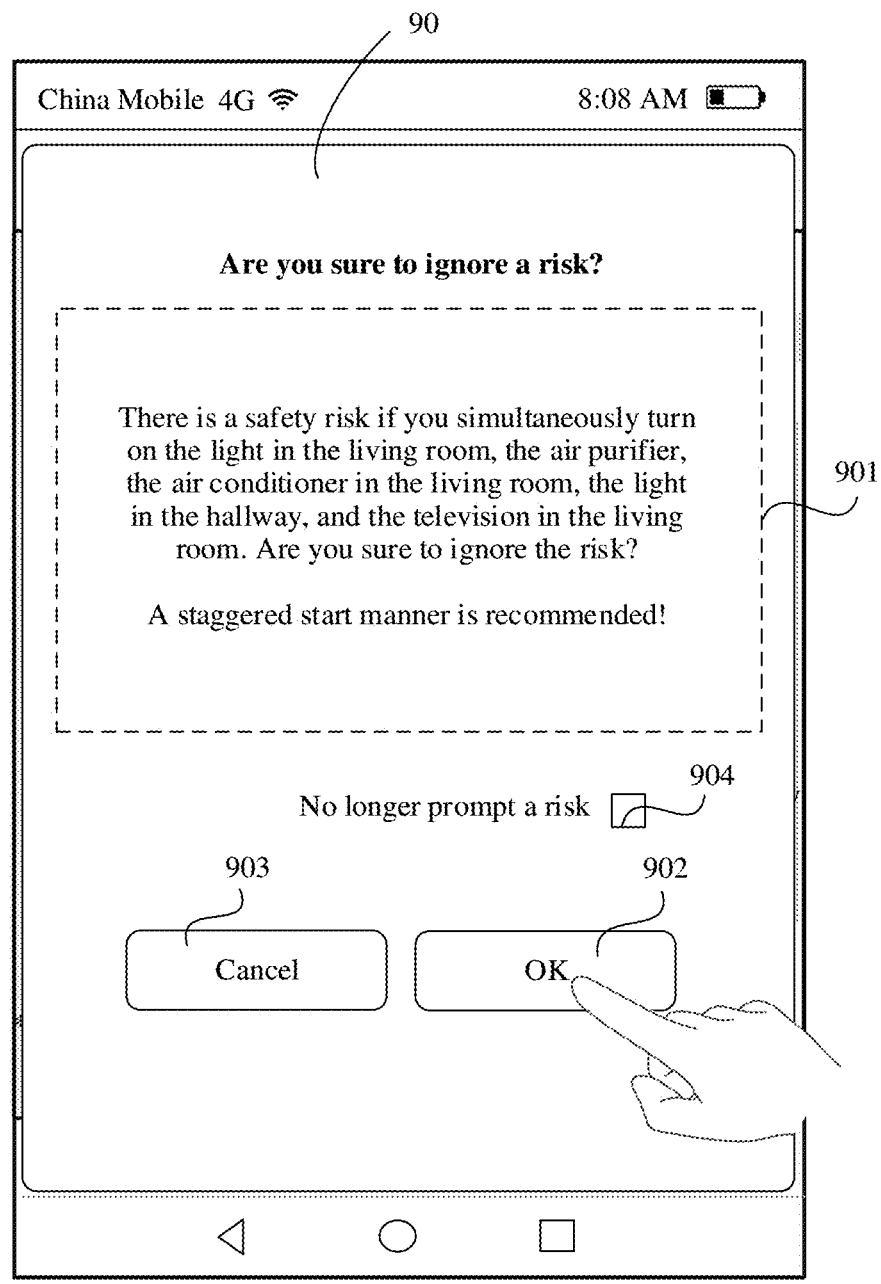

In some embodiments of this application, after step S113 is performed, if the user taps the ignore risk control 604 in the risk prompt interface 60, in response to a tap operation performed by the user on the ignore risk control 604, the electronic device displays the interface 90 of determining to ignore a risk. FIG. 13 is a schematic diagram of a human-computer interaction interface according to an embodiment of this application. As shown in FIG. 13, the risk ignorance interface 90 includes a prompt 901, an OK control 902, a cancel control 903, and a "no longer prompt a risk" option 904.

The prompt 901 includes: "There is a safety risk if you simultaneously turn on the light in the living room, the air purifier, the air conditioner in the living room, the light in the hallway, and the television in the living room. Are you sure to ignore the risk? A sequential start manner is recommended!"

The cancel control 903 is used to return to the scenario setting interface 30. In response to a tap operation performed by the user on the cancel control 903, the electronic device displays the scenario setting interface 30.

The "no longer prompt a risk" option 904 is used to specify that the risk ignorance interface 90 is no longer displayed. In response to a tap operation performed by the user on the "no longer prompt a risk" option 904, the electronic device displays the "no longer prompt a risk" option 904 in a selected state. In addition, in response to a tap operation performed by the user on the OK control 902, the electronic device no longer displays the risk ignorance interface 90.

The OK control 902 is used to indicate to ignore a risk and simultaneously start a plurality of smart home devices. Specifically, in response to a tap operation performed by the user on the OK control 902, the electronic device displays the scenario name setting interface 80. However, according to the "go home" rule corresponding to the scenario, a plurality of smart home devices are simultaneously started. For example, as shown in FIG. 10B, according to the "go home" rule, the tasks to be executed include simultaneously turning on the light in the living room, the air purifier, the air conditioner in the living room, the light in the hallway, and the television in the living room.

Figure 14:
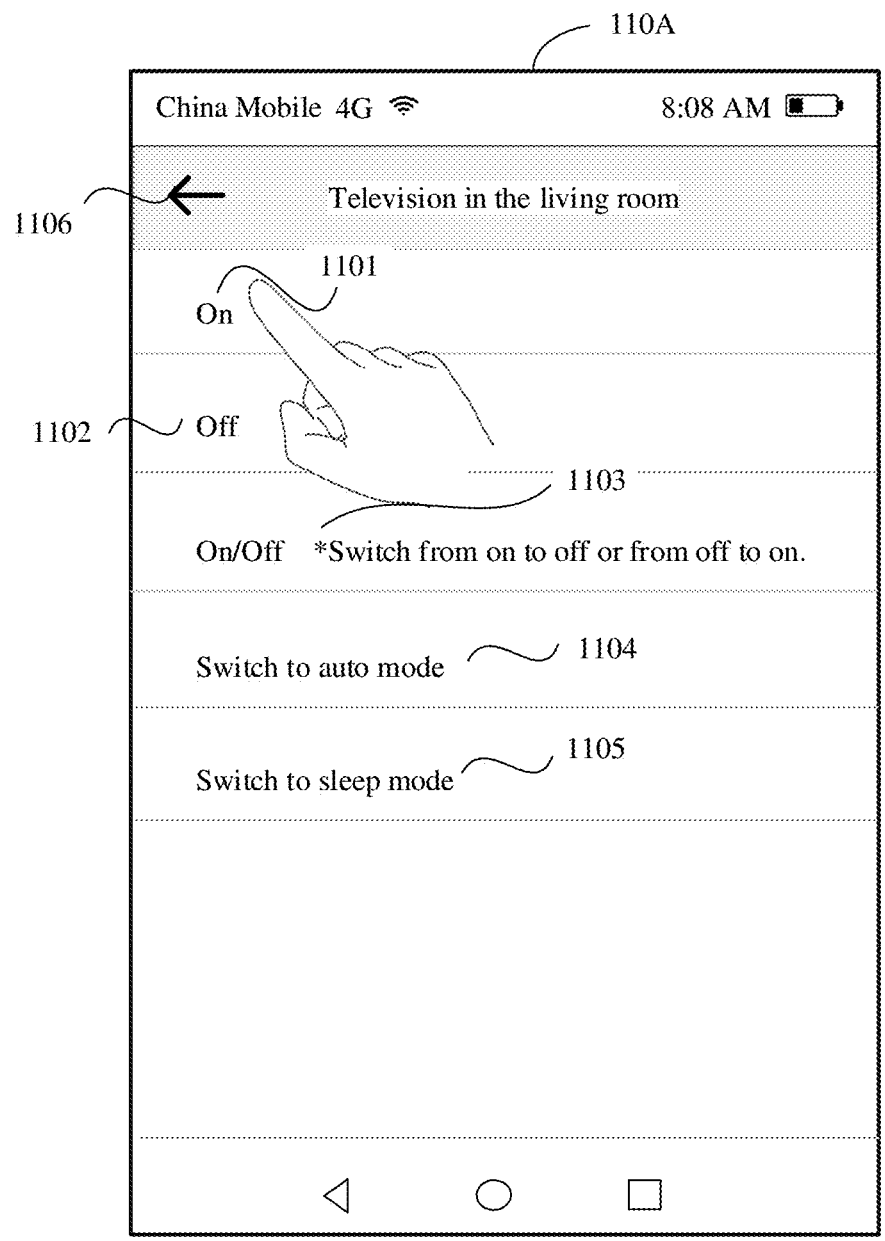

FIG. 14 is a schematic diagram of a human-computer interaction interface according to an embodiment of this application. In some embodiments of this application, as shown in FIG. 14, in a task setting interface 110A for the television in the living room, the electronic device may further perform step S112 in response to a tap operation performed by the user on an on option 1101. Then, the electronic device performs steps S113 to S122. For example, similar to the task setting interface 40 shown in FIG. 10A, the electronic device has specified that according to the "go home" rule, device tasks are: turning on the light in the living room, turning on the air purifier, turning on the air conditioner in the living room, and turning on the light in the hallway. To be specific, the task setting interface 40 includes the prompt 4013-b of turning on the light in the living room, the prompt 4013-c of turning on the air purifier, the prompt 4013-d of turning on the air conditioner in the living room, and the prompt 4013-e of turning on the light in the hallway.

As shown in FIG. 14, the task setting interface 110A for the television in the living room includes an on option 1101, an off option 1102, an on/off option 1103, a switch to auto mode option 1104, a switch to sleep mode option 1105, and a back control 1106.

For functions of the on option 1101, the off option 1102, the on/off option 1103, the switch to auto mode option 1104, and the back control 1106, refer to specific descriptions of the task setting interface 50 for the light in the living room shown in FIG. 9D. Details are not described herein again.

In response to a tap operation performed by the user on the switch to sleep mode option 1105, when the "go home" rule is executed, the electronic device switches the television in the living room to a sleep mode. In the sleep mode, the display and the speaker of the television in the living room are in an off state, and may be turned on in response to a start instruction (for example, a start instruction sent by the electronic device).

In some embodiments of this application, in the example shown in FIG. 14, the electronic device may alternatively perform step S112 in response to a tap operation performed by the user on the on option 1101. If the electronic device subsequently performs step S113, and detects that a superposition of surge currents of devices (the light in the living room, the air purifier, the air conditioner in the living room, the light in the hallway, and the television in the living room) corresponding to a plurality of device identifiers is greater than or equal to a specified threshold, the electronic device may set turn-on of the light in the living room, the air purifier, the air conditioner in the living room, and the light in the hallway as one group in S117. When the group of devices are turned on, a delay does not need to be set between the devices. After the group of devices are turned on, the television in the living room is turned on after a delay.

For example, when the electronic device detects that a sum of surge currents does not exceed the specified threshold after the light in the living room, the air purifier, the air conditioner in the living room, and the light in the hallway are turned on, turn-on of the television in the living room is added. Then, the electronic device may detect that a sum of surge currents exceeds the specified threshold after the light in the living room, the air purifier, the air conditioner in the living room, the light in the hallway, and the television in the living room are turned on. In this case, the electronic device may set turn-on of the light in the living room, the air purifier, the air conditioner in the living room, and the light in the hallway as one group. A timer-based delay does not need to be set between the group of devices (for example, between turn-on of the light in the living room and turn-on of the air purifier). After the group of devices are turned on, turn-on of the television in the living room is set as one group after the timer-based delay.

Figure 15A:
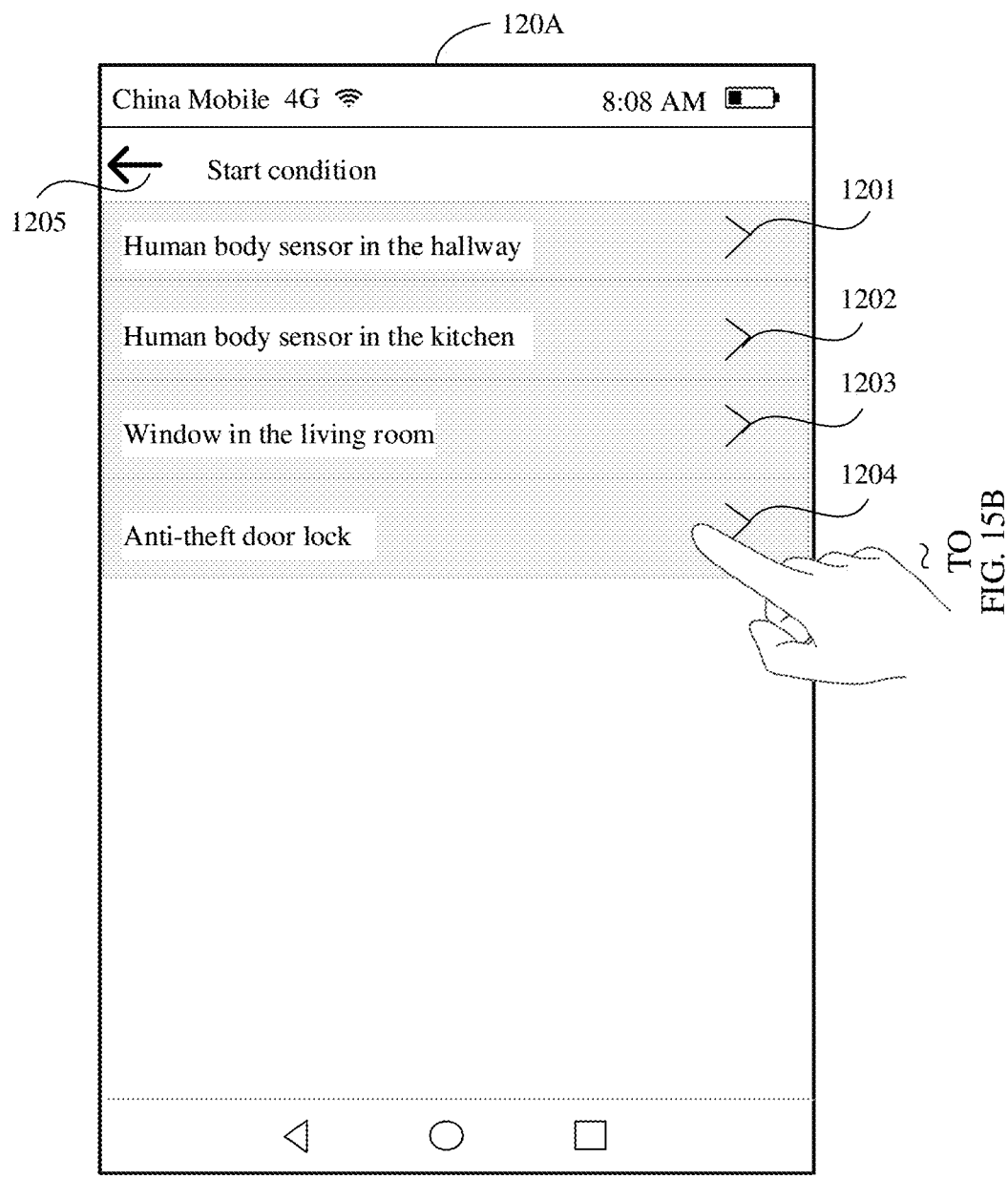

In some embodiments of this application, after step S120, the user may tap the add condition control 3012 in the scenario setting interface 30 shown in FIG. 12A to modify a trigger condition for the "go home" rule. For example, FIG. 15A to FIG. 15D are a schematic diagram of a human-computer interaction interface according to an embodiment of this application. As shown in FIG. 15A, in response to a tap operation performed by the user on the add condition control 3012, the electronic device 100 displays a start condition setting interface 120A. The start condition setting interface 120A includes a condition setting entrance 1201 for a human body sensor in the hallway, a condition setting entrance 1202 for a human body sensor in a kitchen, a condition setting entrance 1203 for a window in the living room, a condition setting entrance 1204 for an anti-theft door lock, and a back control 1205.

If a human body sensor is disposed in the smart home system, and the user puts the human body sensor in the hallway, the start condition setting interface 120A includes the condition setting entrance 1201 for the human body sensor in the hallway. Similarly, if another human body sensor is disposed in the smart home system, and the user puts the human body sensor in the kitchen, the start condition setting interface 120A includes the condition setting entrance 1202 for the human body sensor in the kitchen. If a smart window is disposed in the smart home system, and the user places the smart window in the living room, the start condition setting interface 120A includes the condition setting entrance 1203 for the window in the living room. If an anti-theft door lock is disposed in the smart home system, the start condition setting interface 120A includes the condition setting entrance 1204 for the anti-theft door lock.

Figure 15B:
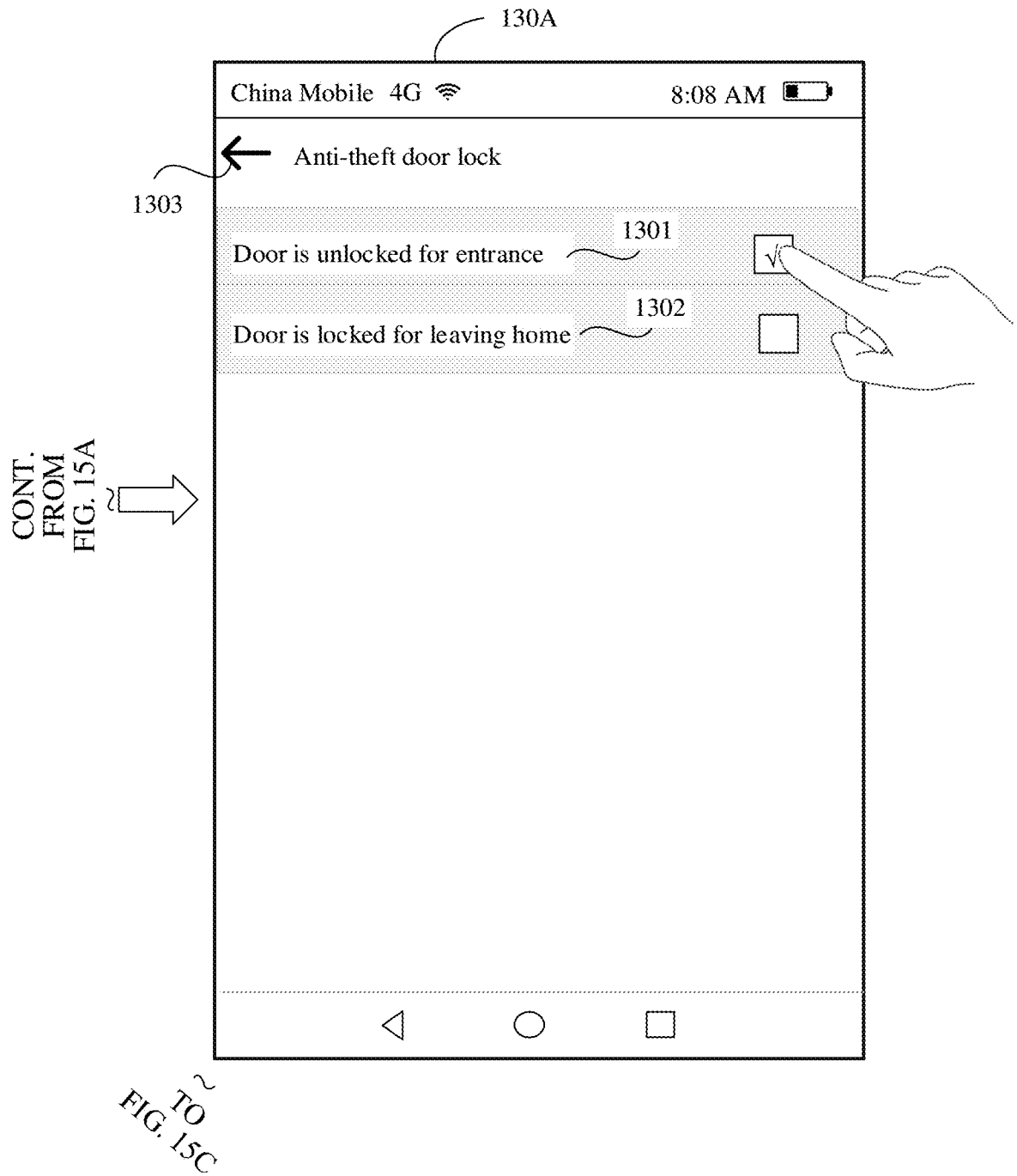

For example, as shown in FIG. 15B, in response to a tap operation performed by the user on the condition setting entrance 1204 for the anti-theft door lock, the electronic device displays a condition setting interface 130A for the anti-theft door lock. The condition setting interface 130A for the anti-theft door lock includes a "door is unlocked for entrance" option 1301, a "door is locked for leaving home" option 1302, and a back control 1303.

Figure 15C:
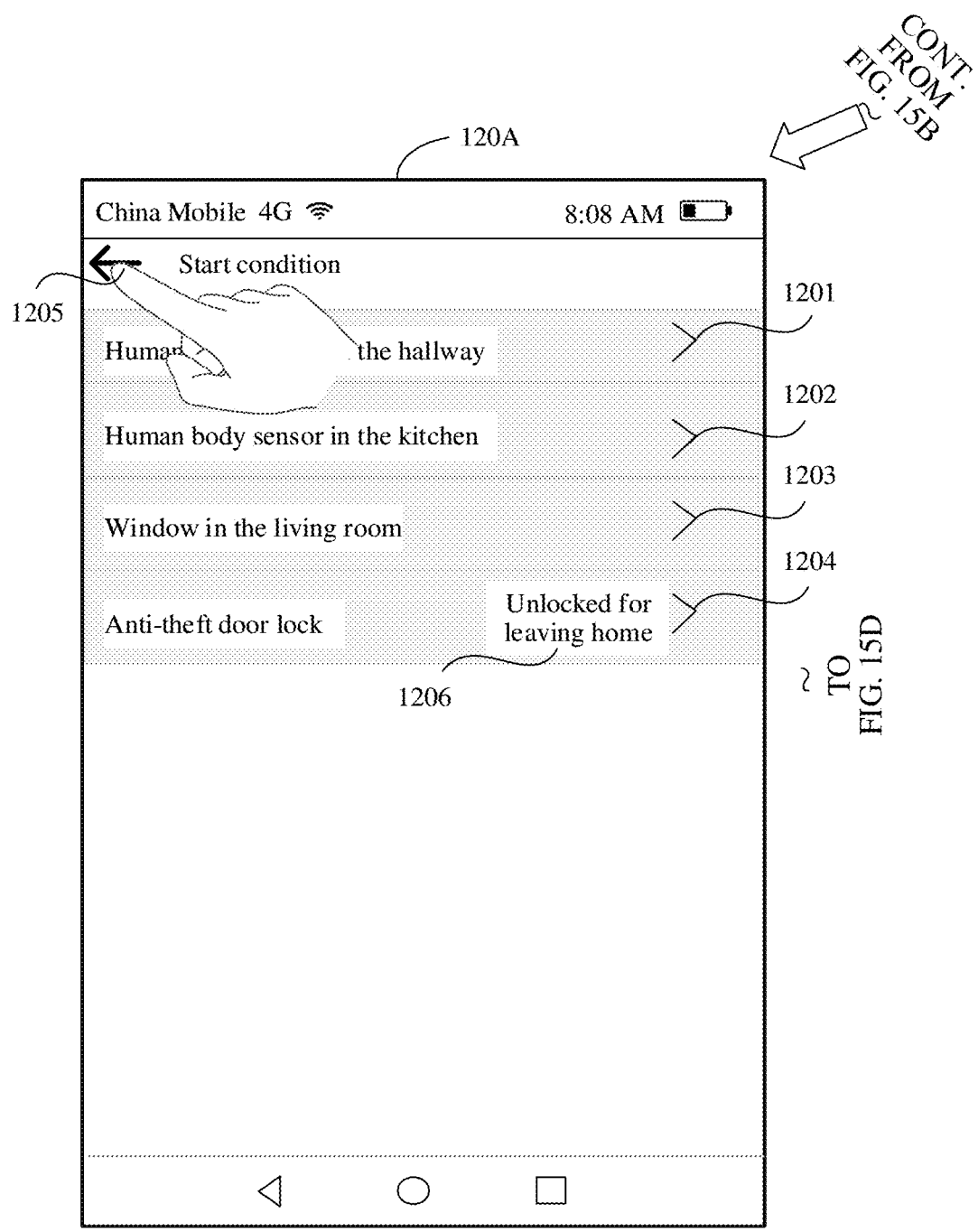

When the "door is unlocked for entrance" option 1301 in an unselected state is displayed, in response to a tap operation performed by the user on the "door is unlocked for entrance" option 1301, the "door is unlocked for entrance" option 1301 in the selected state is displayed. As shown in FIG. 15C, the start condition setting interface 120A further includes an "anti-theft door is unlocked for entrance" prompt 1206.

If the user completes start condition setting in the start condition setting interface 120A, the user may tap the back control 1205 to return to the scenario setting interface 30. Optionally, the user may set a plurality of start conditions in the start condition setting interface 120A.

Figure 15D:
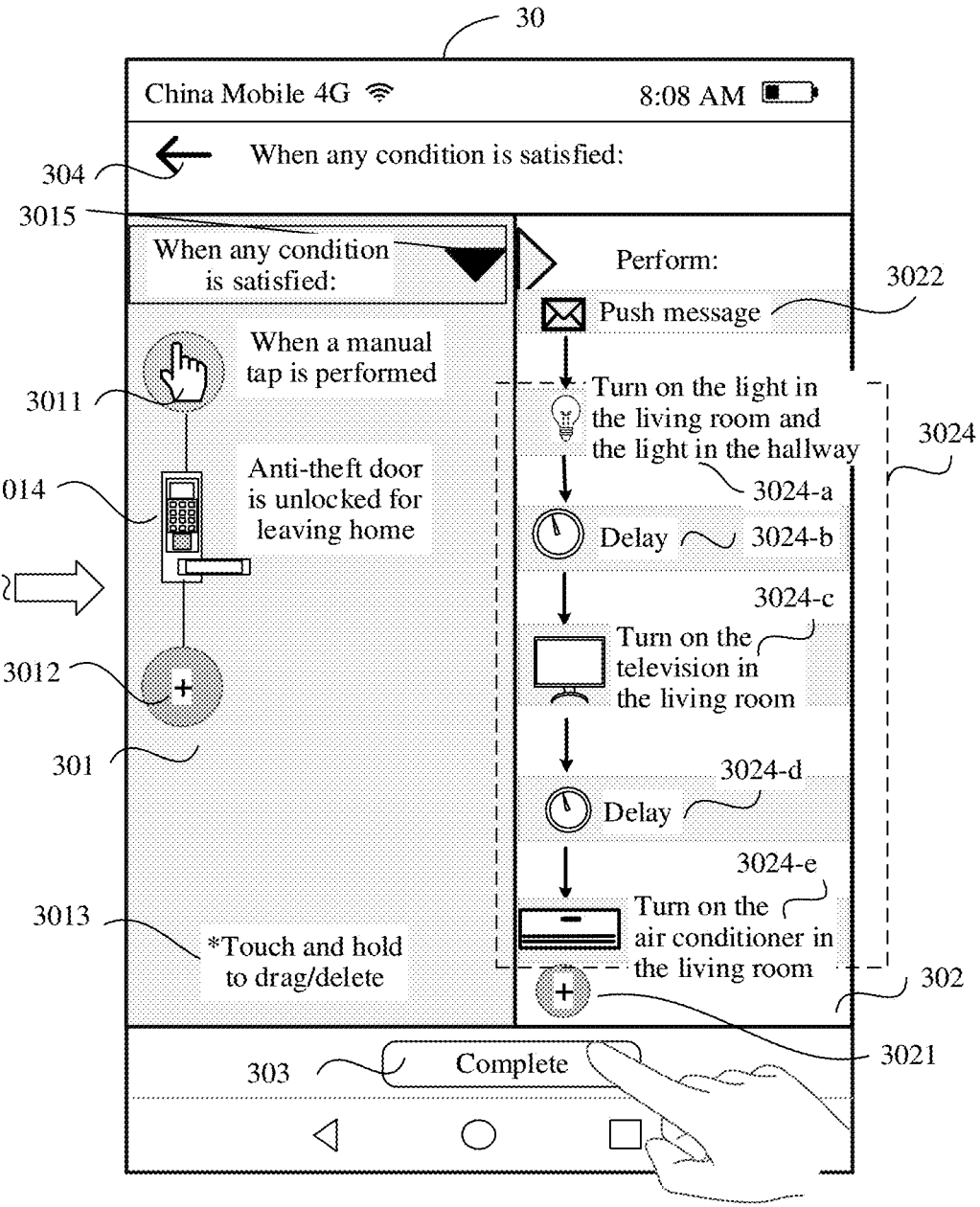

In response to a tap operation performed by the user on the back control 1205, the electronic device displays the scenario setting interface 30. As shown in FIG. 15D, the condition setting area 301 in the scenario setting interface 30 further includes a "when an anti-theft door is unlocked for entrance" control 3014.

Optionally, the plurality of start conditions in the condition setting interface 120A shown in FIG. 15C are not limited to those shown in the example, and may further include other conditions, for example, when an indoor temperature is lower than 20 degrees Celsius, when an indoor temperature is higher than 25 degrees Celsius, and when it is 8 o'clock. Conditions corresponding to the foregoing tasks are not limited in this embodiment of this application.

As shown in FIG. 15D, the condition setting area 301 includes conditions "when a manual tap is performed" 3013 and "when an anti-theft door is unlocked for entrance" 3014. Because more than one condition is included, the condition setting area 301 may further include a condition option 3015. In response to a tap operation performed on the condition option 3015, the condition setting area 301 includes a condition option list: when any condition is satisfied, and when all conditions are satisfied. The user may select any one of the condition options to set a condition for the "go home" rule. For example, as shown in FIG. 15D, in response to a tap operation performed by the user on "when any condition is satisfied", the electronic device displays the condition option "when any condition is satisfied".

As shown in FIG. 15D, in response to a tap operation performed by the user on the complete control 303 in the scenario setting interface 30, the electronic device stores the "go home" rule, and stores a trigger condition for the rule and a task to be executed. For example, the trigger condition for the stored rule in the example shown in FIG. 15D is: When a tap operation performed by a user on a "go home" control 2052-*a* is detected or when an anti-theft door is unlocked for entrance. Tasks to be executed according to the rule are sequentially turning on the light in the living room and the light in the hallway, the television in the living room, and the air conditioner in the living room in a staggered manner.

Figure 16A:
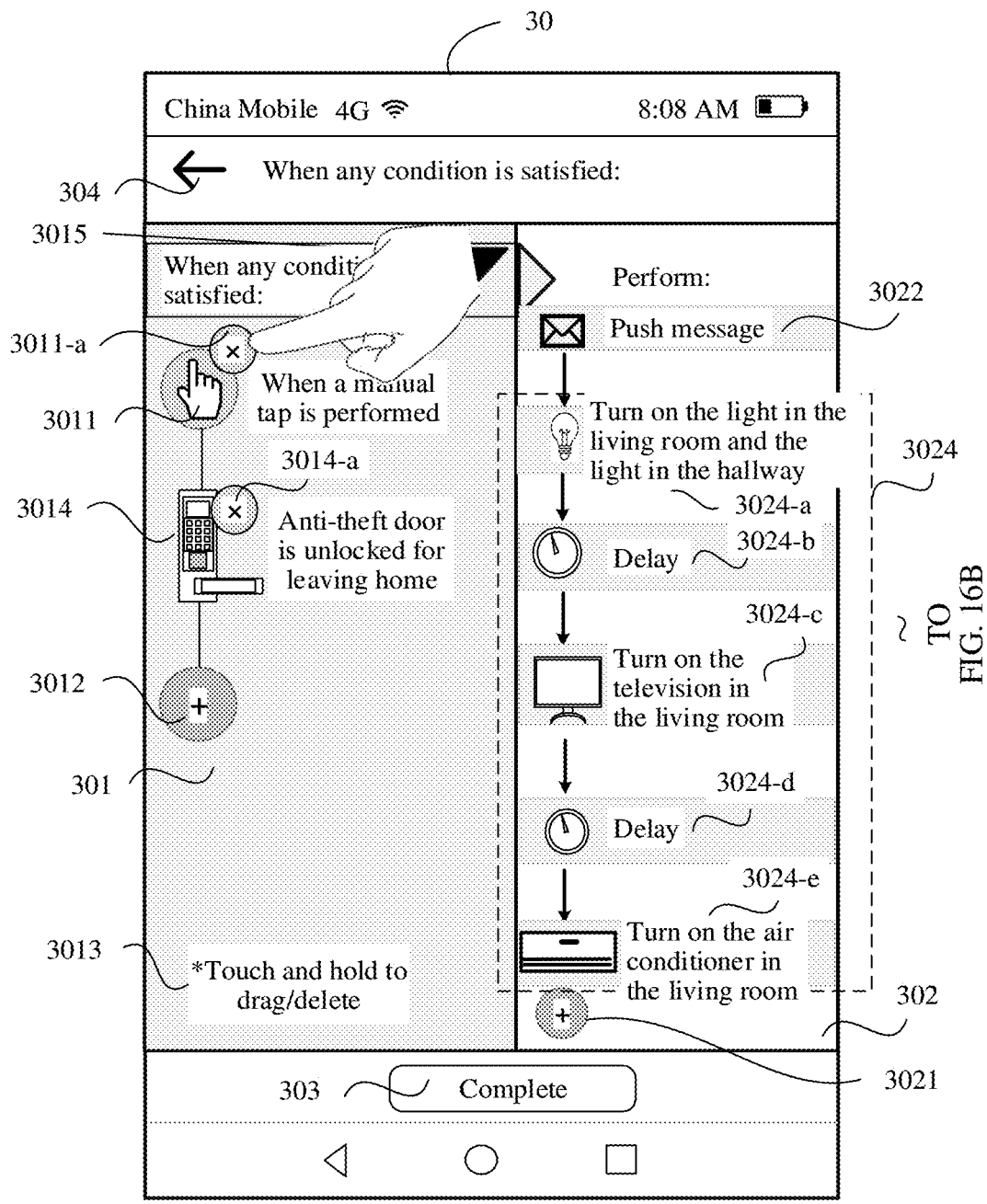
Figure 16B:
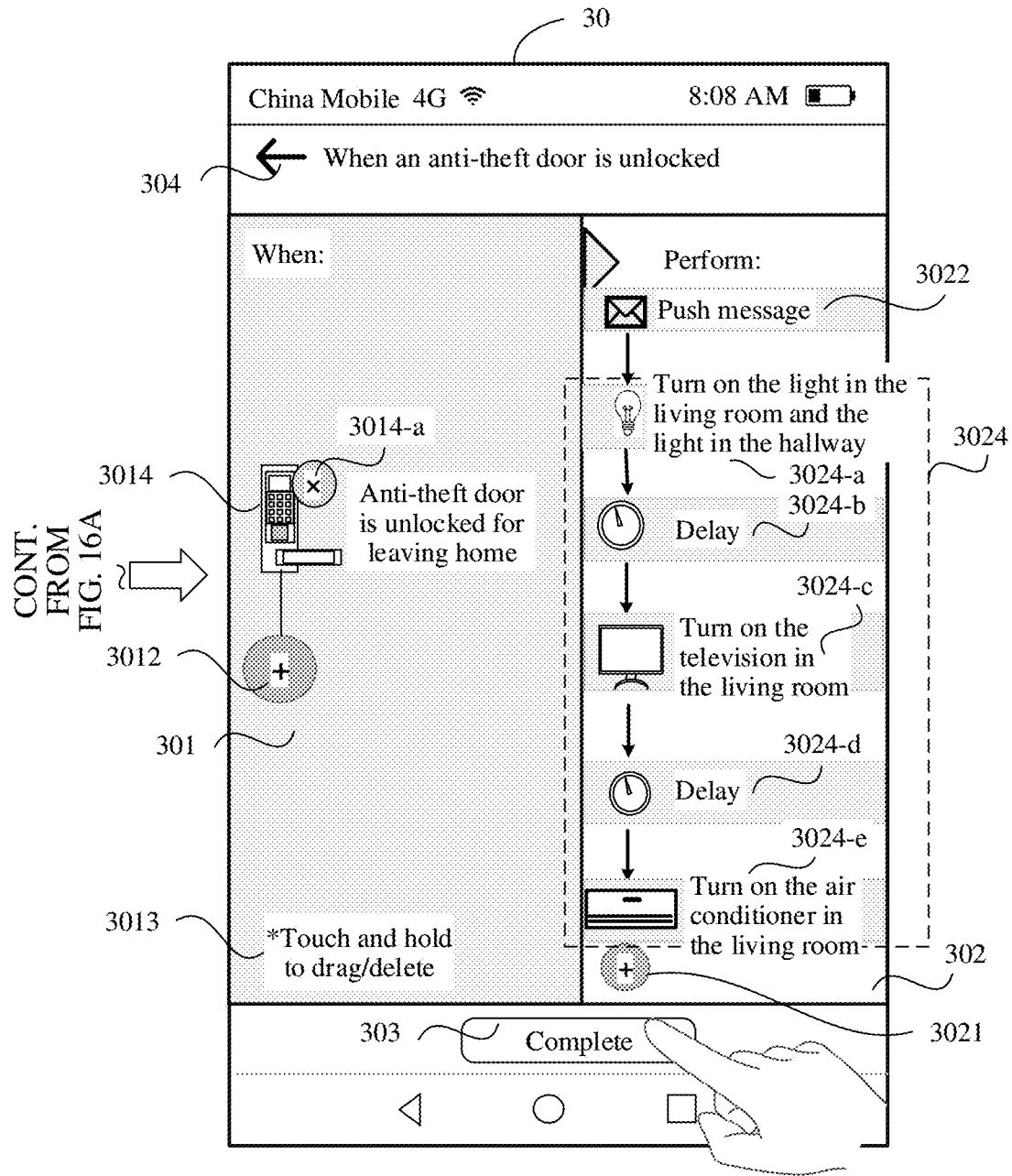

In some embodiments of this application, the user may delete or move a condition and a task that are set in the scenario setting interface 30. For example, FIG. 16A and FIG. 16B are a schematic diagram of a human-computer interaction interface according to an embodiment of this application. As shown in FIG. 16A, in response to a touch and hold operation performed by the user on the "when a manual tap is performed" control 3011, the "when a manual tap is performed" control 3011 includes a delete identifier 3011-*a*, and the "when an anti-theft door is unlocked for entrance" control 3014 includes a delete identifier 3014-*a*. As shown in FIG. 16B, in response to a tap operation performed by the user on the delete identifier 3011-*a*, the "when a manual tap is performed" control 3011 is deleted and is no longer displayed. In response to a tap operation performed by the user on the complete control 303 in the scenario setting interface 30, the electronic device stores the "go home" rule. For example, a trigger condition for the stored rule in the example shown in FIG. 16A and FIG. 16B is: When it is detected that an anti-theft door is unlocked for entrance. Tasks to be executed according to the rule are sequentially turning on the light in the living room and the light in the hallway, the television in the living room, and the air conditioner in the living room in a staggered manner.

Optionally, in the example shown in FIG. 16A and FIG. 16B, in response to a touch and hold operation performed by the user on a device task identifier in the task list, the electronic device may adjust a sequence of tasks, or delete a task. For details, refer to descriptions in FIG. 10D and FIG. 10E. Details are not described herein again.

In this embodiment of this application, after the electronic device performs step S121, the electronic device may send the "go home" rule to a device in the smart home system, for example, the server, the router, or the smart home device. Examples of three cases in which a "go home" rule is stored on a server, a router, and a smart home device are used below to describe a procedure of collaboratively completing tasks by a smart home system according to the "go home" rule. In addition, an electronic device may alternatively not need to send the "go home" rule, and the "go home" rule is stored only on the electronic device.

1. The "go Home" Rule is Stored on the Server.

In the smart home system, a smart home device may passively receive a task message from the server or the router (a push type), or may actively obtain a task message from the server or the router (a pull type). Details are separately described below.

Figure 17A:
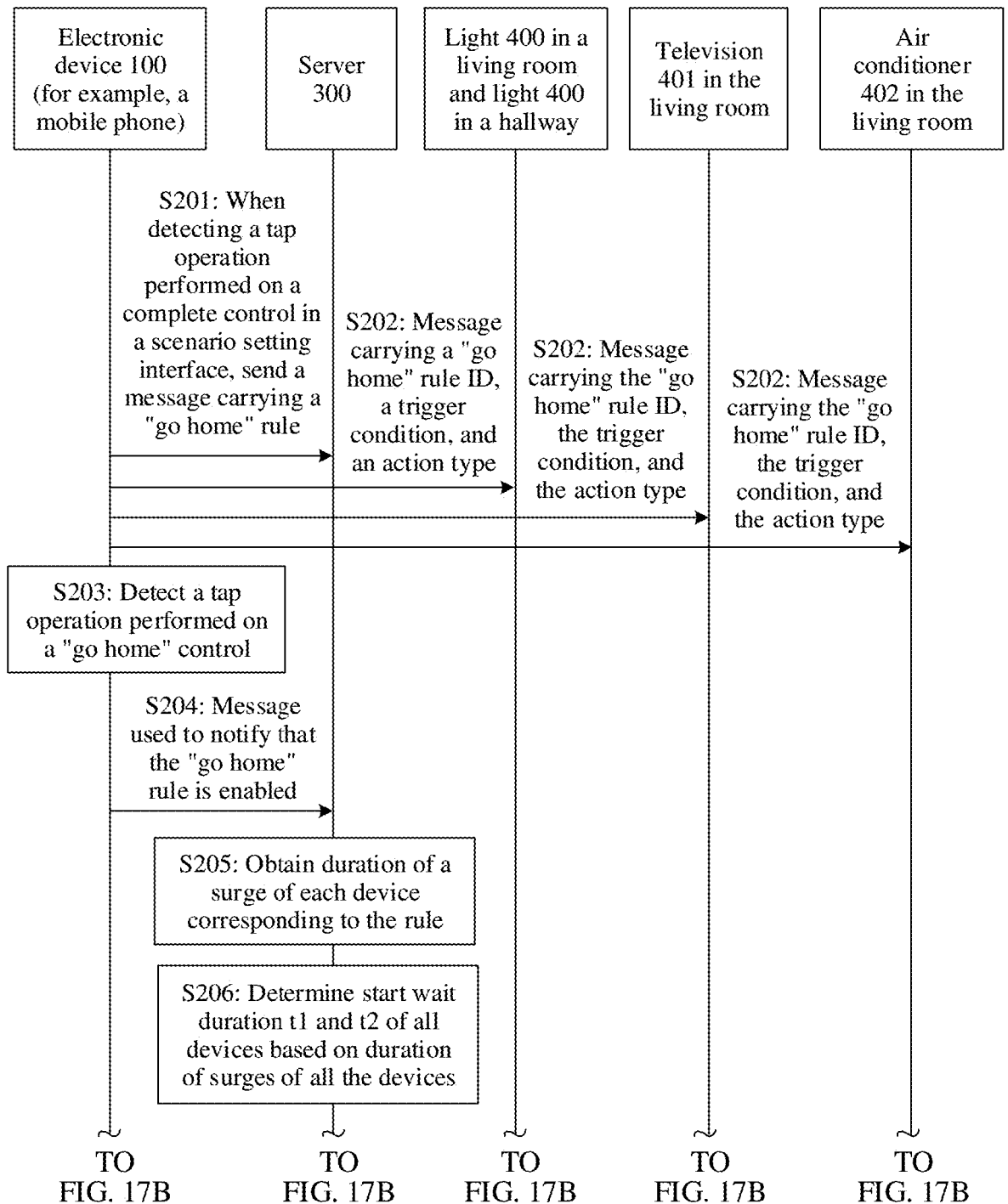
FIG. 17A and FIG. 17B are a schematic flowchart of a device control method according to an embodiment of this application.
Figure 17B:
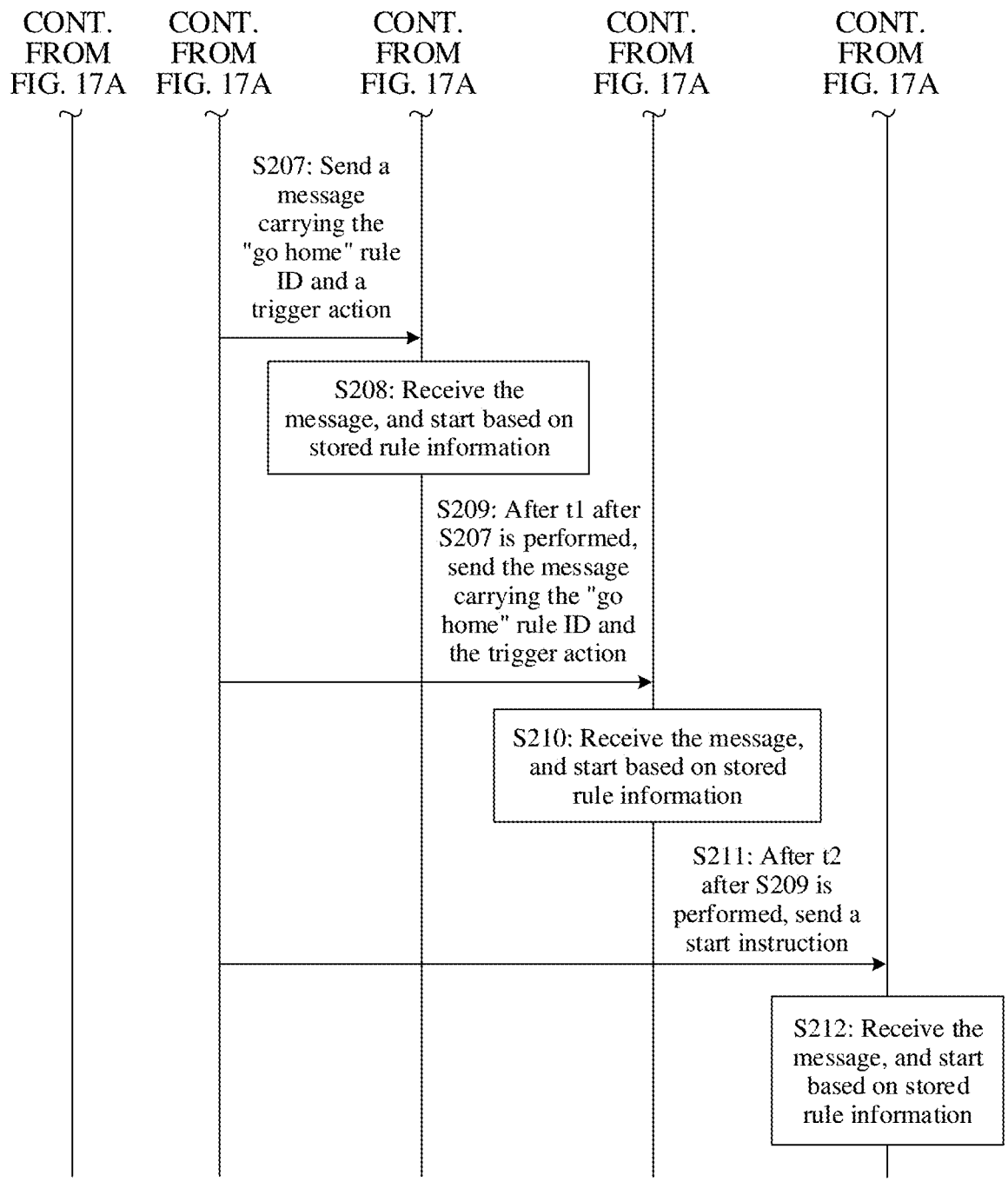

(1) The Push Type is as Follows:

FIG. 17A and FIG. 17B are a schematic flowchart of a device control method according to an embodiment of this application. As shown in FIG. 17A and FIG. 17B, the device control method includes steps S201 to S212.

S201: When detecting a tap operation performed on a complete control 303 in a scenario setting interface, an electronic device sends, to a server, a message carrying a "go home" rule.

For example, the "go home" rule corresponds to the stored rule for cooperatively completing tasks in the example shown in FIG. 12A to FIG. 12C. A trigger condition for the rule is: When a tap operation performed by a user on a "go home" control 2052-*a* is detected. Tasks to be executed according to the rule are sequentially turning on a light in a living room and a light in a hallway, a television in the living room, and an air conditioner in the living room in a staggered manner.

Optionally, in response to a request of the server, the electronic device may further send, to the server, the message carrying the "go home" rule.

The message carrying the "go home" rule may further include a rule identifier (identification, ID).

S202: The electronic device 100 sends, to each smart home device, a message carrying the "go home" rule ID, the trigger condition, and an action type of each smart home device.

The action type is "on". In some embodiments of this application, the action type may further include: off, on/off, switching to an automatic mode, switching to a sleep mode, changing an operating parameter, or the like.

After steps S201 and S202 are performed, the user may tap the "go home" control 2052-*a* in a smart home application interface 20 on the electronic device to execute the "go home" rule. The "go home" rule can be repeatedly executed.

S203: The electronic device 100 detects the tap operation performed on the "go home" control 2052-*a*.

S204: The electronic device 100 sends, to the server 300, a message used to notify to that the "go home" rule is enabled.

S205: The server 300 obtains duration of a surge of each device corresponding to the rule.

In some embodiments of this application, duration of a surge of each smart home device may be a measurement value or an empirical value. For details, refer to the descriptions of the surge current in step S113. The server may obtain duration of a surge of each smart home device from a smart meter, may locally store duration of a surge of each device, or may obtain duration of a surge of each device from another device (the electronic device, a router, or the smart home devices).

S206: The server 300 determines start wait duration t1 and t2 of all devices based on duration of surges of all the devices.

For example, if duration of surges of the light in the living room and the light in the hallway is 5 ms, duration of a surge of the television in the living room is 30 ms, and duration of a surge of the air conditioner in the living room is 40 ms, the server may determine that the start wait duration t1 of the television in the living room is 5 ms, and the start wait duration t2 of the air conditioner in the living room is 30 ms.

When the television in the living room is turned on after 5 ms, impact of surge currents generated by the light in the living room and the light in the hallway is reduced. The air conditioner in the living room is turned on after the television in the living room is turned on for 30 ms. In this case, impact of a surge current generated by the television in the living room and the surge currents generated by the light in the living room and the light in the hallway is reduced. Therefore, a superposition of a surge current generated by the air conditioner in the living room and the surge currents generated by the television in the living room, the light in the living room, and the light in the hallway is reduced, harm caused by the surge currents to smart home devices and cables is reduced, and safety of a smart home system is improved.

In some embodiments of this application, the server may alternatively obtain only the duration of the surge of the television in the living room and the duration of the surges of the light in the living room and the light in the hallway, to determine the start wait duration of the devices.

In some embodiments of this application, the server may further obtain impact duration of the surges of all the devices, and then determine the start wait duration t1 and t2 of the devices based on the impact duration of the surges of all the devices. For example, if impact duration of the surges of the light in the living room and the light in the hallway is 5 ms, impact duration of the surge of the television in the living room is 75 ms, and impact duration of the surge of the air conditioner in the living room is 95 ms, the server may determine that the start wait duration t1 of the television in the living room is 5 ms, and the start wait duration t2 of the air conditioner in the living room is 75 ms.

When the television in the living room is turned on after 5 ms, impact of the surge currents generated by the light in the living room and the light in the hallway is further reduced. The air conditioner in the living room is turned on after the television in the living room is turned on for 75 ms. In this case, impact of the surge current generated by the television in the living room and the surge currents generated by the light in the living room and the light in the hallway is reduced. Therefore, a superposition of the surge current generated by the air conditioner in the living room and the surge currents generated by the television in the living room, the light in the living room, and the light in the hallway is reduced, harm caused by the surge currents to smart home devices and cables is reduced, and safety of the smart home system is improved.

In some embodiments of this application, the start wait duration t1 and t2 of the devices may alternatively be fixed duration set by the server. Usually, after a smart home device is started for the fixed duration, impact of a surge of the smart home device is reduced. For example, both t1 and t2 are 100 ms.

In some embodiments of this application, the "go home" rule includes a task execution sequence: Turn on the light in the living room and the light in the hallway, the television in the living room, and the air conditioner in the living room. The rule further includes execution wait duration of all the devices: Both t1 and t2 are 100 ms. In some embodiments of this application, the "go home" rule includes only the execution wait duration of all the devices, and both execution wait duration of the light in the living room and execution wait duration of the light in the hallway are 0. Execution wait duration of the television in the living room is 100 ms. In other words, after step S204 is performed, the server sends, to the television in the living room after 100 ms, a message used to notify that the television is turned on. Execution wait duration of the air conditioner in the living room is 200 ms. In other words, after step S204 is performed, the server sends, to the air conditioner in the living room after 200 ms, a message used to notify that the air conditioner is turned on.

In some other embodiments of this application, the start wait duration t1 and t2 of the devices may alternatively be determined by the electronic device in step S113. Then, the electronic device uses the "go home" rule to carry the start wait duration t1 and t2, and sends the "go home" rule to the server. The server directly obtains, from the "go home" rule, the start wait duration t1 and t2. In this case, the start wait duration t1 and t2 determined by the electronic device may be fixed values, may be determined based on the duration of the surges, or may be determined based on the impact duration of the surges.

S207: The server 300 sends, to the light in the living room and the light in the hallway, a message carrying the "go home" rule ID and a trigger action.

After receiving the message that is sent by the electronic device 100 and that is used to notify that the "go home" rule is enabled, the server performs step S207.

S208: The light in the living room and the light in the hallway receive the message, and are turned on based on stored rule information.

In some embodiments of this application, the light in the living room and the light in the hallway each store the rule information, that is, the "go home" rule ID and the trigger action, in step S202. After receiving the message in step S207, the light in the living room may find a stored trigger action based on the rule ID, and compare the stored trigger action with the trigger action in the received message. If both the trigger actions are the same, the light in the living room is turned on. Similar comparison may be performed by the light in the hallway. If a comparison result is that both trigger actions are the same, the light in the hallway is turned on.

S209: After t1 after S207 is performed, the server 300 sends, to the television 401 in the living room, the message carrying the "go home" rule ID and the trigger action.

S210: The television 401 in the living room receives the message, and is turned on based on stored rule information.

S211: After t2 after S209 is performed, the server 300 sends a start instruction to the air conditioner 402 in the living room.

S212: The air conditioner 402 in the living room receives the message, and is turned on based on stored rule information.

In some embodiments of this application, a comparison operation similar to that performed on the light in the living room is performed on the television in the living room or the air conditioner in the living room. If a comparison result is that both trigger actions are the same, the television in the living room or the air conditioner in the living room is turned on.

In some embodiments of this application, the electronic device may alternatively send a message carrying a rule to only the server. In this case, after determining the start wait duration t1 and t2 of the devices in step S206, the server performs the following steps:

s1: The server sends, to the light in the living room and the light in the hallway, a message carrying a start instruction.

s2: After receiving the message carrying the start instruction, the light in the living room is turned on.

s3: After s1 is performed, the server sends, to the television 401 in the living room after t1, the message carrying the start instruction.

s4: After receiving the message carrying the start instruction, the television in the living room is turned on.

s5: After s3 is performed, the server sends, to the air conditioner in the living room after t2, the message carrying the start instruction.

s6: After receiving the message carrying the start instruction, the air conditioner in the living room is turned on.

In this embodiment of this application, the server may send the message to each smart home device through the router. In some embodiments of this application, the router forwards only a message sent by the server. After step S206, the server may send, to the router, the message carrying the "go home" rule ID and the trigger action or the message carrying the start instruction, to indicate the router to send the message to the light in the living room and the light in the hallway. After receiving the message, the router forwards the message to the light in the living room and the light in the hallway. Then, the server sends, to the router after t1, the message carrying the "go home" rule ID and the trigger action or the message carrying the start instruction, to indicate the router to send the message to the television in the living room. After receiving the message, the router forwards the message to the television in the living room. Then, the server sends, to the router after t2, the message carrying the "go home" rule ID and the trigger action or the message carrying the start instruction, to indicate the router to send the message to the air conditioner in the living room. After receiving the message, the router forwards the message to the air conditioner in the living room.

In some other embodiments of this application, the router may be responsible for sending, to the smart home device after a delay, a message sent by the server. Specifically, after step S206, the server may send, to the router, the message carrying the "go home" rule ID and the trigger action or the message carrying the start instruction, where the message further carries the start wait duration t1 of the television in the living room and the start wait duration t2 of the air conditioner in the living room. After receiving the message, the router sends, to the light in the living room and the light in the hallway, the message carrying the "go home" rule ID and the trigger action or the message carrying the start instruction. Then, the router sends, to the television in the living room after t1, the message carrying the "go home" rule ID and the trigger action or the message carrying the start instruction. Then, the router sends, to the air conditioner in the living room after t2, the message carrying the "go home" rule ID and the trigger action or the message carrying the start instruction.

In some embodiments of this application, after each smart home device is started, the smart home device may further feed back, to the server, a message indicating that the smart home device is started. Then, the server determines, based on whether feedback messages respectively indicating that the light in the hallway and the light in the living room are turned on are received, a time point at which the message carrying the "go home" rule ID and the trigger action is sent to the television in the living room. For details, refer to descriptions in step S409 in an example described in FIG. 19A to FIG. 19C. The server determines, based on whether a feedback message indicating that the television in the living room is turned on is received, a time point at which the message carrying the "go home" rule ID and the trigger action is sent to the air conditioner in the living room. For details, refer to descriptions in steps S410 to S414 in the example described in FIG. 19A to FIG. 19C. However, it is the server that each smart home device interacts with.

In some embodiments of this application, the server, the router, and each smart home device may not need to receive the "go home" rule ID from the electronic device, and the server may notify, based on a trigger condition for the "go home" rule, each smart home device that the smart home device is to be started. For example, the server stores a rule. A trigger condition for the rule is a tap operation performed by the user on the "go home" control 2052-*a*, and tasks corresponding to the condition are sequentially turning on the light in the living room and the light in the hallway, the television in the living room, and the air conditioner in the living room in a staggered manner. After the server receives a message that is sent by the electronic device and that is used to notify a tap operation performed by the user on the "go home" control 2052-*a*, the server executes corresponding tasks: Sequentially turn on the light in the living room and the light in the hallway, the television in the living room, and the air conditioner in the living room in a staggered manner.

In a case in which the "go home" rule is stored in the router, the smart home device, and the electronic device, the "go home" rule ID may similarly not need to be stored, and a process of executing the rule is similar to the process of executing the rule by the server.

Figure 18A:
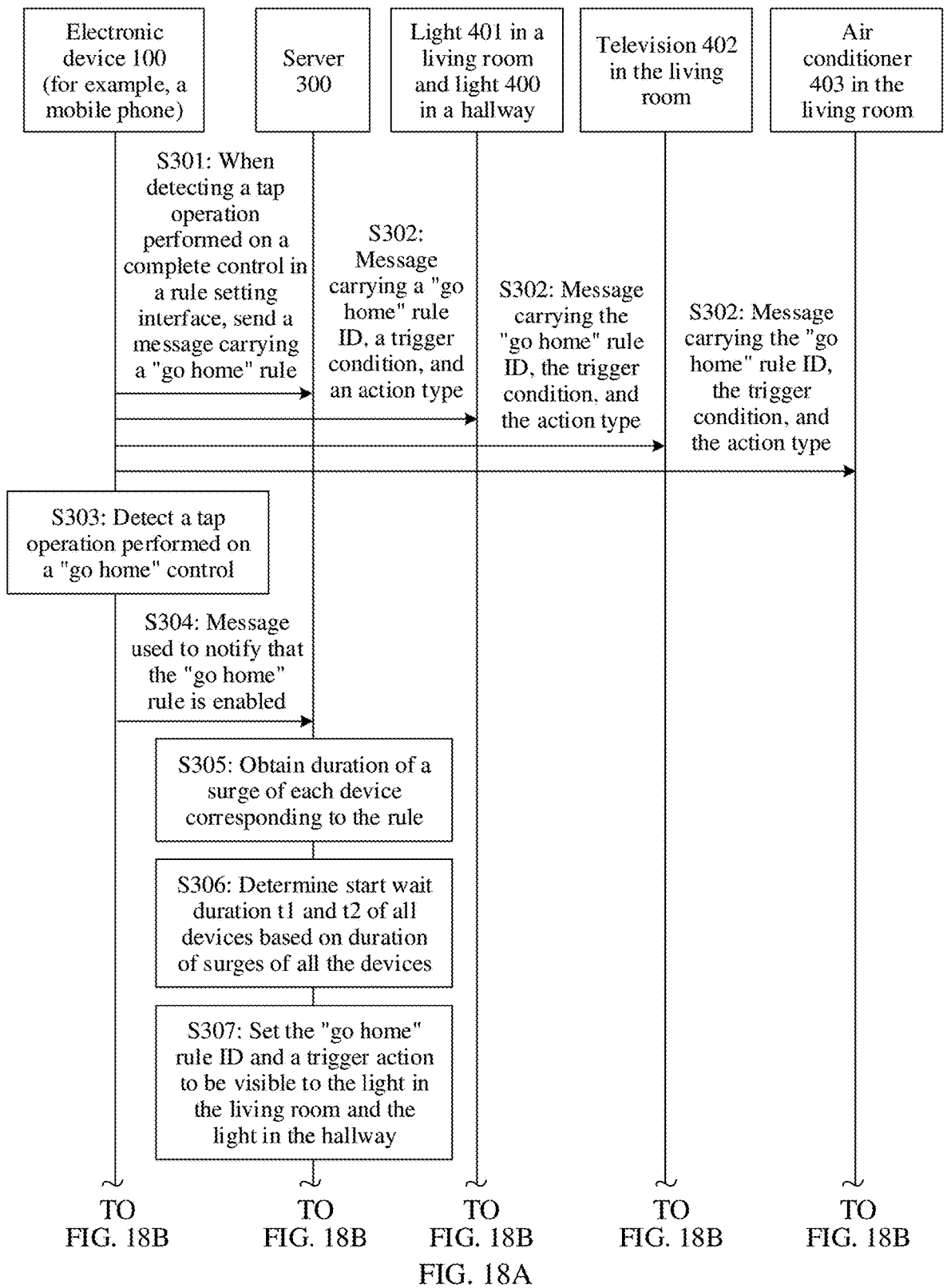
FIG. 18A to FIG. 18C are a schematic flowchart of a device control method according to an embodiment of this application.
Figure 18B:
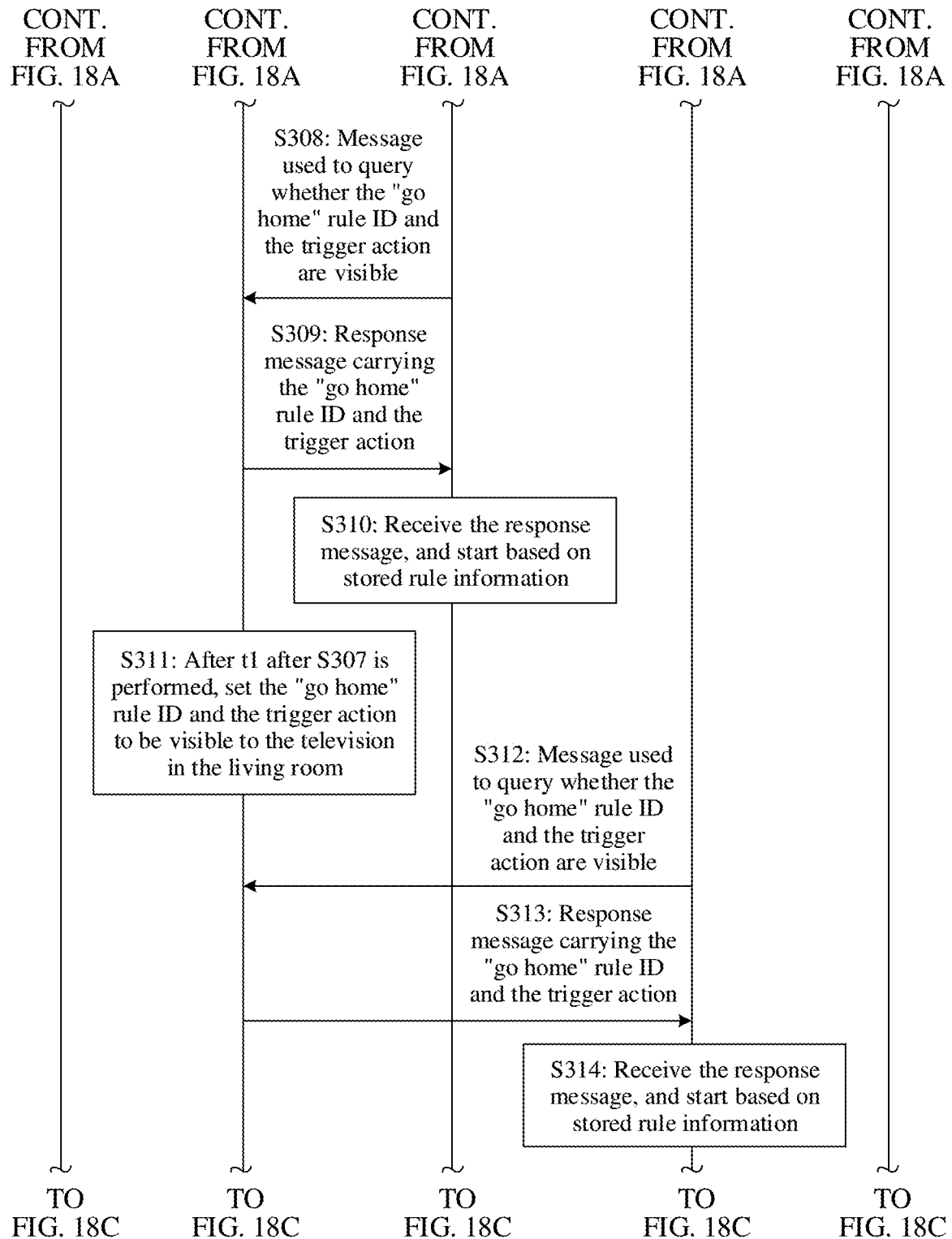
Figure 18C:
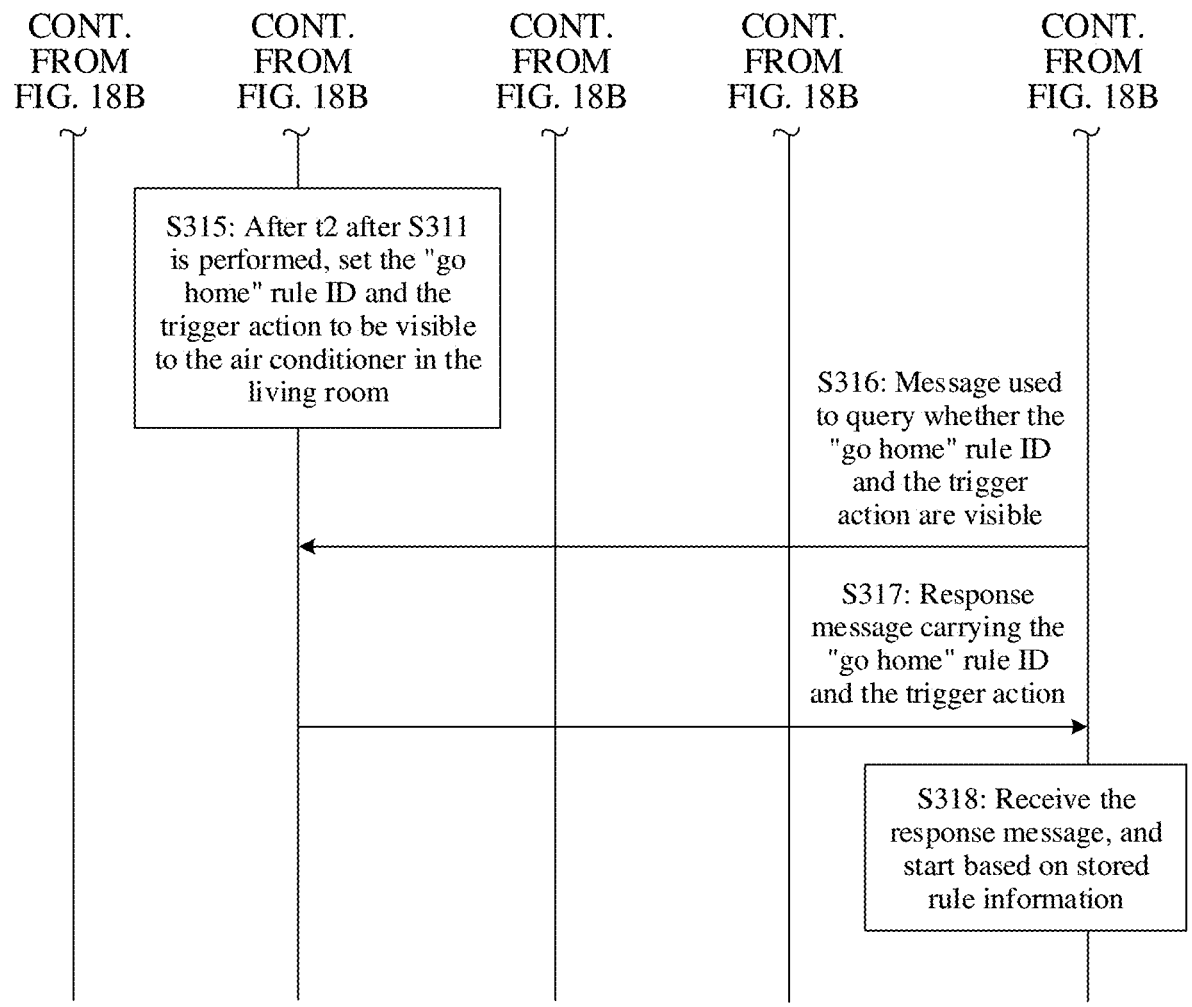

(2) The Pull Type is as Follows:

FIG. 18A to FIG. 18C are a schematic flowchart of a device control method according to an embodiment of this application. As shown in FIG. 18A to FIG. 18C, the device control method includes steps S301 to S312.

For descriptions in steps S301 to S306 in FIG. 18A to FIG. 18C, refer to specific descriptions in steps S201 to S206 in the example shown in FIG. 17A and FIG. 17B. Details are not described herein again.

S307: The server sets the "go home" rule ID and a trigger action to be visible to the light in the living room and the light in the hallway.

After the "go home" rule ID and the trigger action are set to be visible to the light in the living room, the server may respond to a query message of the light in the living room, and send, to the light in the living room, a response message carrying the "go home" rule ID and the trigger action.

S308: The light in the living room and the light in the hallway each send, to the server, a message used to query whether the "go home" rule ID and the trigger action are visible.

In this embodiment of this application, a smart home device may send a query message to the server at a specific frequency. If the server does not set the "go home" rule ID and the trigger action to be visible to the light in the living room, when the light in the living room sends the query message to the server, the server does not send the response message to the light in the living room.

S309: The server separately sends a response message to the light in the living room and the light in the hallway, where the response message carries the "go home" rule ID and the trigger action.

For descriptions in steps S310, S314, and S318, respectively refer to specific descriptions in steps S208, S210, and S212 in the example shown in FIG. 17A and FIG. 17B. Details are not described herein again.

S311: After S307 is performed, the server sets, after t1, the "go home" rule ID and the trigger action to be visible to the television in the living room.

S312: The television in the living room sends, to the server, a message used to query whether the "go home" rule ID and the trigger action are visible.

S313: The server sends a response message to the television in the living room, where the response message carries the "go home" rule ID and the trigger action.

S315: After S311 is performed, the server sets, after t2, the "go home" rule ID and the trigger action to be visible to the air conditioner in the living room.

S316: The air conditioner in the living room sends, to the server, a message used to query whether the "go home" rule ID and the trigger action are visible.

S317: The server sends a response message to the air conditioner in the living room, where the response message carries the "go home" rule ID and the trigger action.

In some embodiments of this application, the router forwards only a query message sent by a smart home device, and the server sets a time point at which the "go home" rule ID and the trigger action are visible to each smart home device.

In some other embodiments of this application, the router may be responsible for sending, to the server after a delay, the query message sent by the smart home device. In an implementation, after step S306, the server sends, to the router, a message carrying the "go home" rule ID and the trigger action or a message carrying a start instruction, where the message further carries the start wait duration t1 of the television in the living room and the start wait duration t2 of the air conditioner in the living room. The router sets a time point at which the "go home" rule ID and the trigger action are visible to each smart home device. After receiving the message, the router sets the "go home" rule ID and the trigger action to be visible to the light in the living room and the light in the hallway. Then, the router sets, after t1, the "go home" rule ID and the trigger action to be visible to the television in the living room. Then, the router sets, after t2, the "go home" rule ID and the trigger action to be visible to the air conditioner in the living room.

In another implementation, after step S306, the server sends the "go home" rule, t1, and t2 to the router, and then the server sets the "go home" rule ID and the trigger action to be queried by the light in the living room, the light in the hallway, the television in the living room, and the air conditioner in the living room. However, after step S306 is performed, when receiving a query message from the light in the living room and the light in the hallway, the router forwards the query message to the server. After step S306 is performed, the router forwards, after t1, a query message received from the television in the living room to the server. After step S306 is performed, the router forwards, after t1+t2, a query message of the air conditioner in the living room to the server.

In some embodiments of this application, after each smart home device is started, the smart home device may further feed back, to the server, a message indicating that the smart home device is started. Then, the server determines, based on whether feedback messages respectively indicating that the light in the hallway and the light in the living room are turned on are received, a time point at which the "go home" rule ID and the trigger action are visible to the television in the living room. For details, refer to descriptions in step S511 in an example described in FIG. 20A to FIG. 20C. The server determines, based on whether a feedback message indicating that the television in the living room is turned on is received, a time point at which the "go home" rule ID and the trigger action are visible to the air conditioner in the living room. For details, refer to descriptions in step S516 in the example described in FIG. 20A to FIG. 20C. However, it is the server that each smart home device interacts with.

2. The "go home" rule is stored on the router.

When the "go home" rule is stored on the router, there are a push type and a pull type that are classified based on whether a smart home device passively or actively obtains a task message from the router. The following separately describes the push type and the pull type.

Figure 19A:
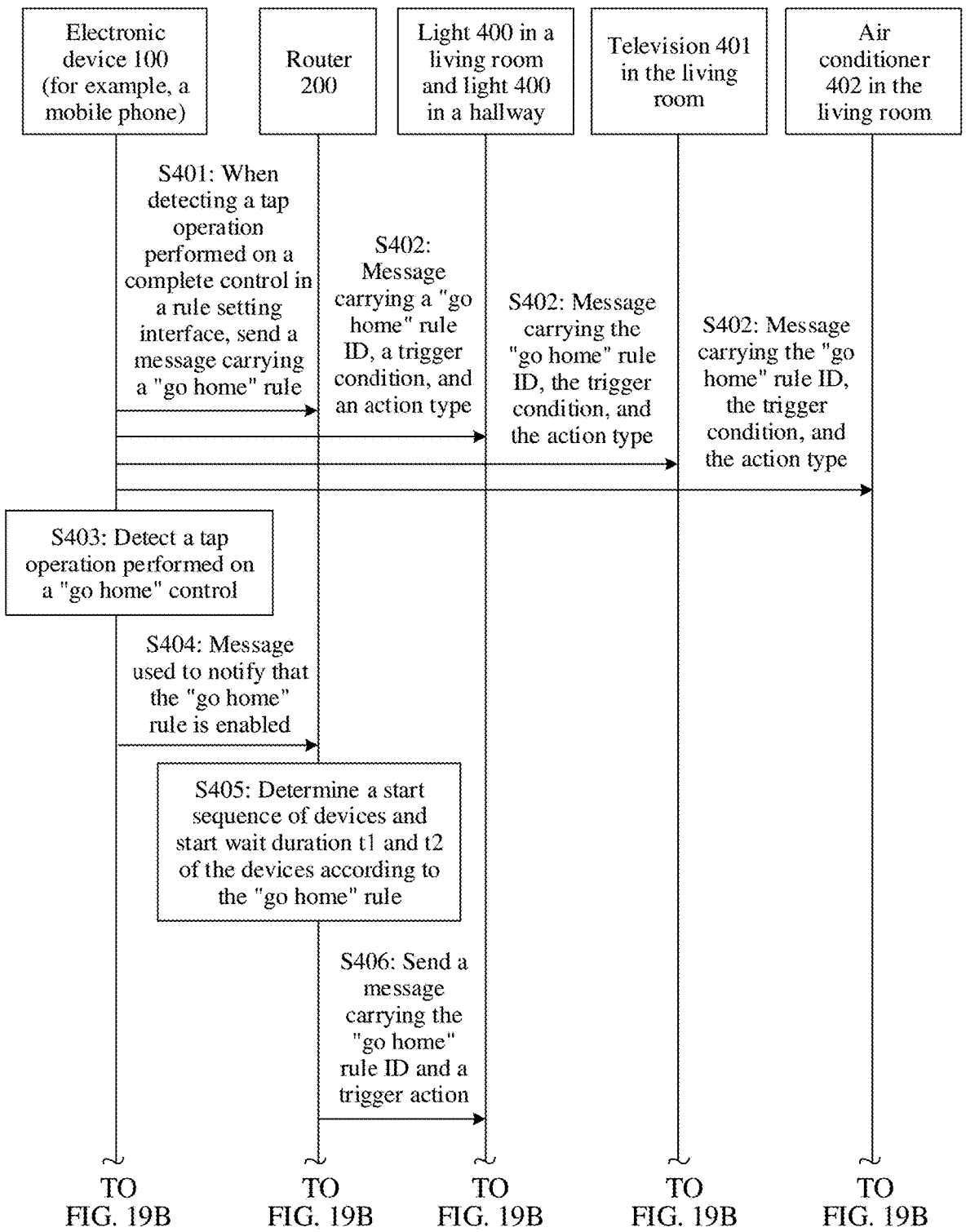
FIG. 19A to FIG. 19C are a schematic flowchart of a device control method according to an embodiment of this application.
Figure 19B:
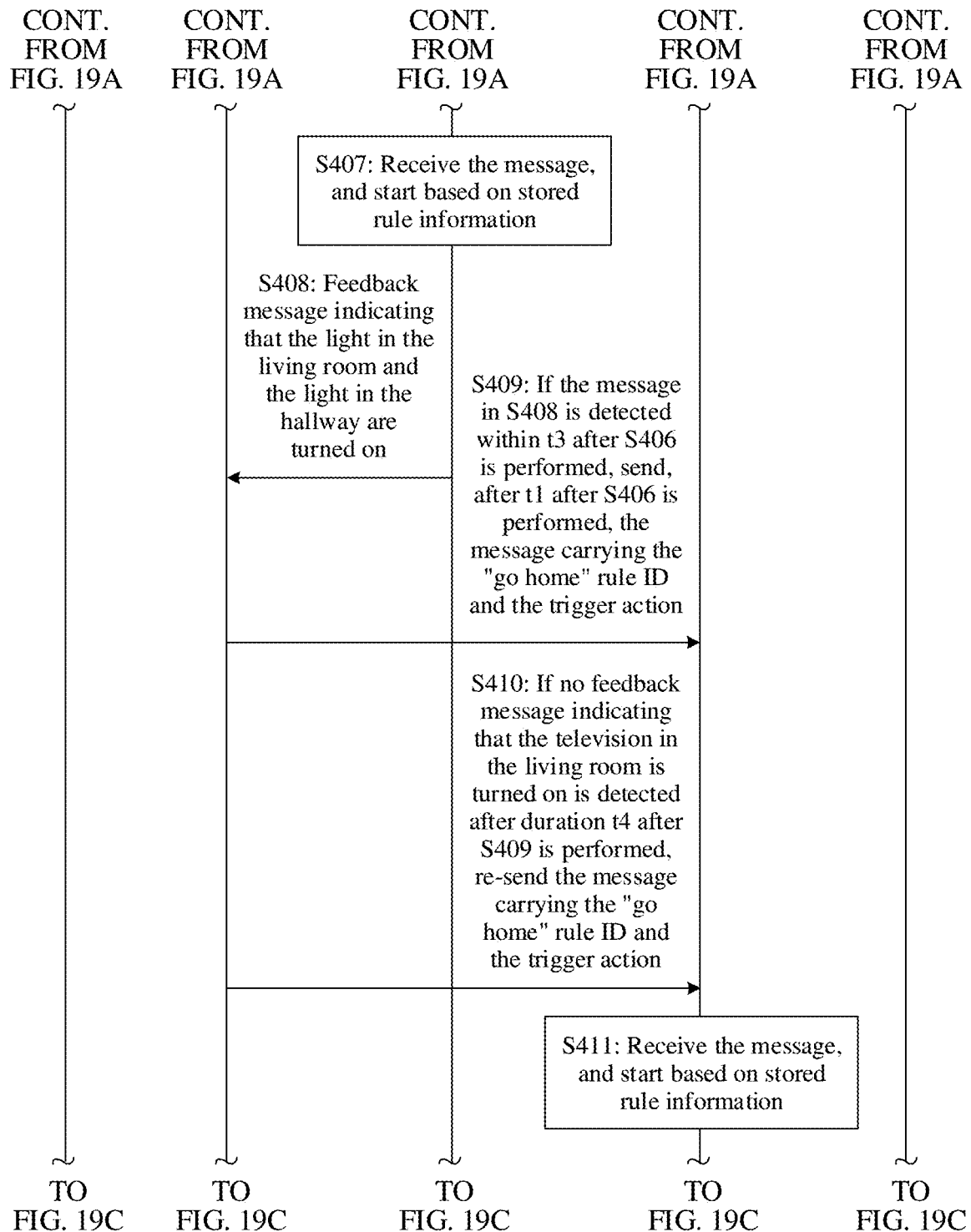
Figure 19C:
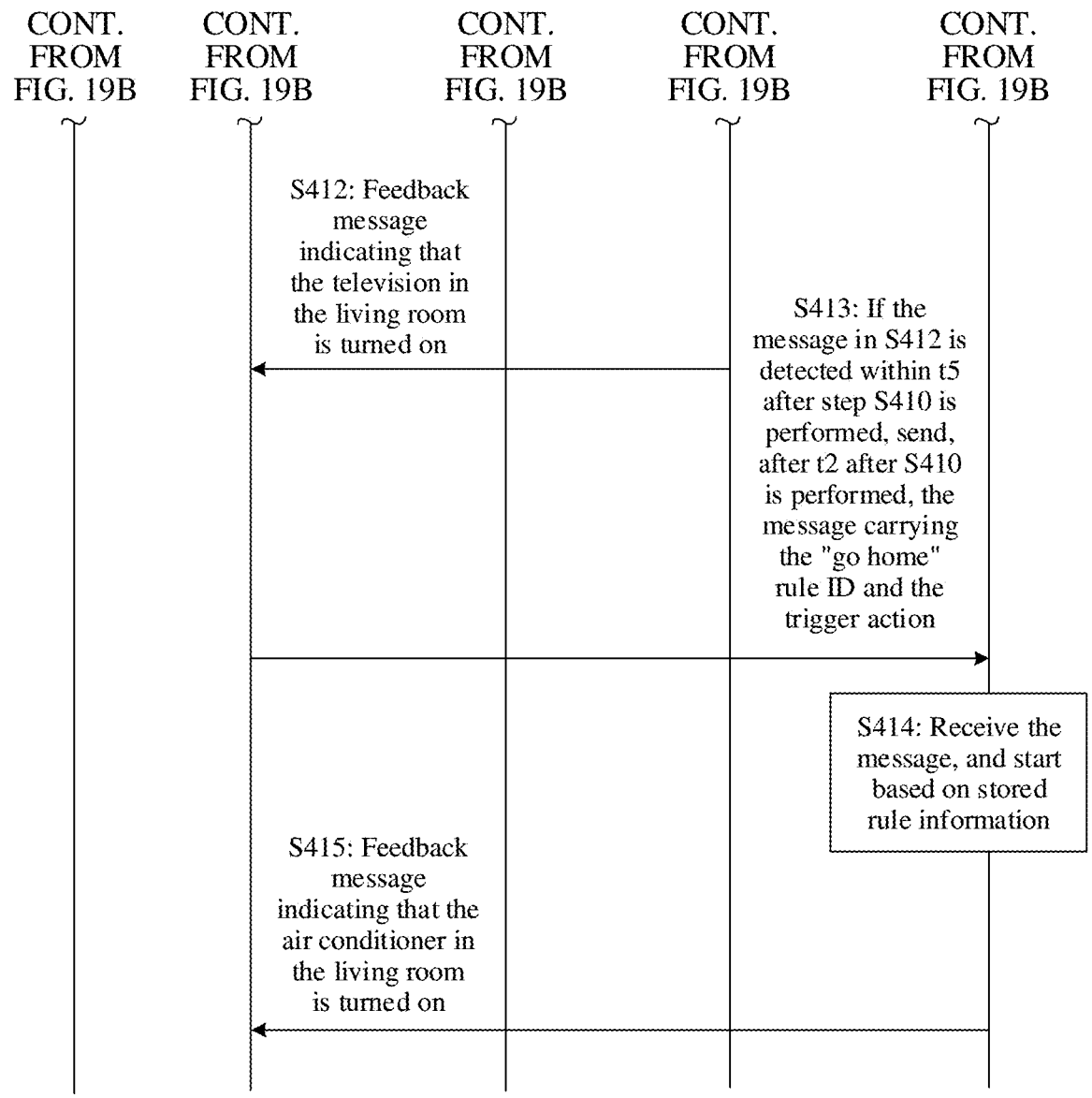

(1) The Push Type is as Follows:

FIG. 19A to FIG. 19C are a schematic flowchart of a device control method according to an embodiment of this application. As shown in FIG. 19A to FIG. 19C, the device control method includes steps S401 to S415.

Descriptions in steps S401 to S404 may be similar to descriptions in steps S201 to S204. A "go home" rule is sent by an electronic device to a router for storage.

The electronic device and the router may be connected through a server, or the electronic device and the router may be directly connected.

S405: The router determines a start sequence of devices and start wait duration t1 and t2 of the devices according to the "go home" rule.

The "go home" rule includes the start sequence of the devices and the start wait duration t1 and t2 of the devices. The start wait duration t1 and t2 of the devices are determined by the electronic device in step S113. Then, the electronic device uses the "go home" rule to carry the start wait duration t1 and t2, and sends the "go home" rule to the router. The router directly obtains, from the "go home" rule, the start wait duration t1 and t2. In this case, the start wait duration t1 and t2 determined by the electronic device may be fixed values, may be determined based on duration of surges, or may be determined based on impact duration of the surges.

In some embodiments of this application, the start wait duration t1 and t2 may alternatively be determined by the router. The start wait duration t1 and t2 may be fixed values, may be determined based on duration of surges, or may be determined based on impact duration of the surges. For a specific process of determining the start wait duration t1 and t2, refer to descriptions in steps S206 and S207 in the embodiment described in FIG. 17A and FIG. 17B.

Descriptions in steps S406 and S407 may be similar to descriptions in steps S207 and S208. The message carrying the home rule ID and the trigger action is separately sent by the router to the light in the living room and the light in the hallway.

S408: After the light in the living room is turned on, the light in the living room sends, to the router, a feedback message indicating that the light in the living room is turned on. After the light in the hallway is turned on, the light in the hallway sends, to the router, a feedback message indicating that the light in the hallway is turned on.

S409: If the router detects the message in S408 within t3 after step S406 is performed, the router sends, to the television in the living room after t1 after S406 is performed, the message carrying the "go home" rule ID and the trigger action.

For example, t3 is 1 second, and t1 is 500 milliseconds. After the router separately sends the message carrying the "go home" rule ID and the trigger action to the light in the living room and the light in the hallway, if the router receives, after 100 milliseconds after the message is sent, the feedback message indicating that the light in the living room is turned on, and receives, after 150 milliseconds after the message is sent, the feedback message indicating that the light in the hallway is turned on, the router sends, to the television in the living room after 500 milliseconds after the router separately sends, to the light in the living room and the light in the hallway, the message carrying the "go home" rule ID and the trigger action, the message carrying the "go home" rule ID and the trigger action.

If the router still does not receive, after t3 (for example, 1 second) after step S406 is performed, the feedback message indicating that the light in the living room is turned on, the router re-sends, to the light in the living room, the message carrying the "go home" rule ID and the trigger action, and detects whether the feedback message indicating that the light in the living room is turned on is received within 1 second after the message is re-sent. If the feedback message indicating that the light in the living room is turned on is received, for example, after 150 milliseconds after the message is re-sent, the router sends, to the television in the living room after t1 (for example, 500 milliseconds) after the message is re-sent, the message carrying the "go home" rule ID and the trigger action.

In some embodiments of this application, only after t1 after the feedback message indicating that the light in the living room is turned on and the feedback message indicating that the light in the hallway is turned on are received, the router may send, to the television in the living room, the message carrying the "go home" rule ID and the trigger action. In the example in which t3 is 1 second and t1 is 500 milliseconds, if the router receives, within 100 ms after the message is sent, the feedback message indicating that the light in the living room is turned on, and receives, within 150 ms after the message is sent, the feedback message indicating that the light in the hallway is turned on, the router sends, to the television in the living room after 500 milliseconds after the feedback message indicating that the light in the hallway is turned on is received, the message carrying the "go home" rule ID and the trigger action.

S410: If the router does not detect, after t4 after S409 is performed, a feedback message indicating that the television in the living room is turned on, the router re-sends, to the television in the living room, the message carrying the "go home" rule ID and the trigger action.

S411: The television in the living room receives the message, and is turned on based on stored rule information.

S412: The television in the living room sends, to the router, the feedback message indicating that the television in the living room is turned on.

S413: If the router detects the message in S412 within t5 after step S410 is performed, the router sends, to the air conditioner in the living room after t2 after S410 is performed, the message carrying the "go home" rule ID and the trigger action.

t4 and t5 may be equal to t3, for example, 1 second, or may be unequal to t3.

S414: The air conditioner in the living room receives the message, and is turned on based on stored rule information.

S415: The air conditioner in the living room sends, to the router, a feedback message indicating that the air conditioner is turned on.

In some embodiments of this application, the electronic device may alternatively send, only to the router, a message carrying a rule. In this case, after determining the start wait duration t1 and t2 of the devices in step S405, the router sends, to all the smart home devices in sequence, a message carrying a start instruction. Like the descriptions in steps S1 to S6 in the example in FIG. 17A and FIG. 17B, the router exchanges a message with each smart home device.

Figure 20A:
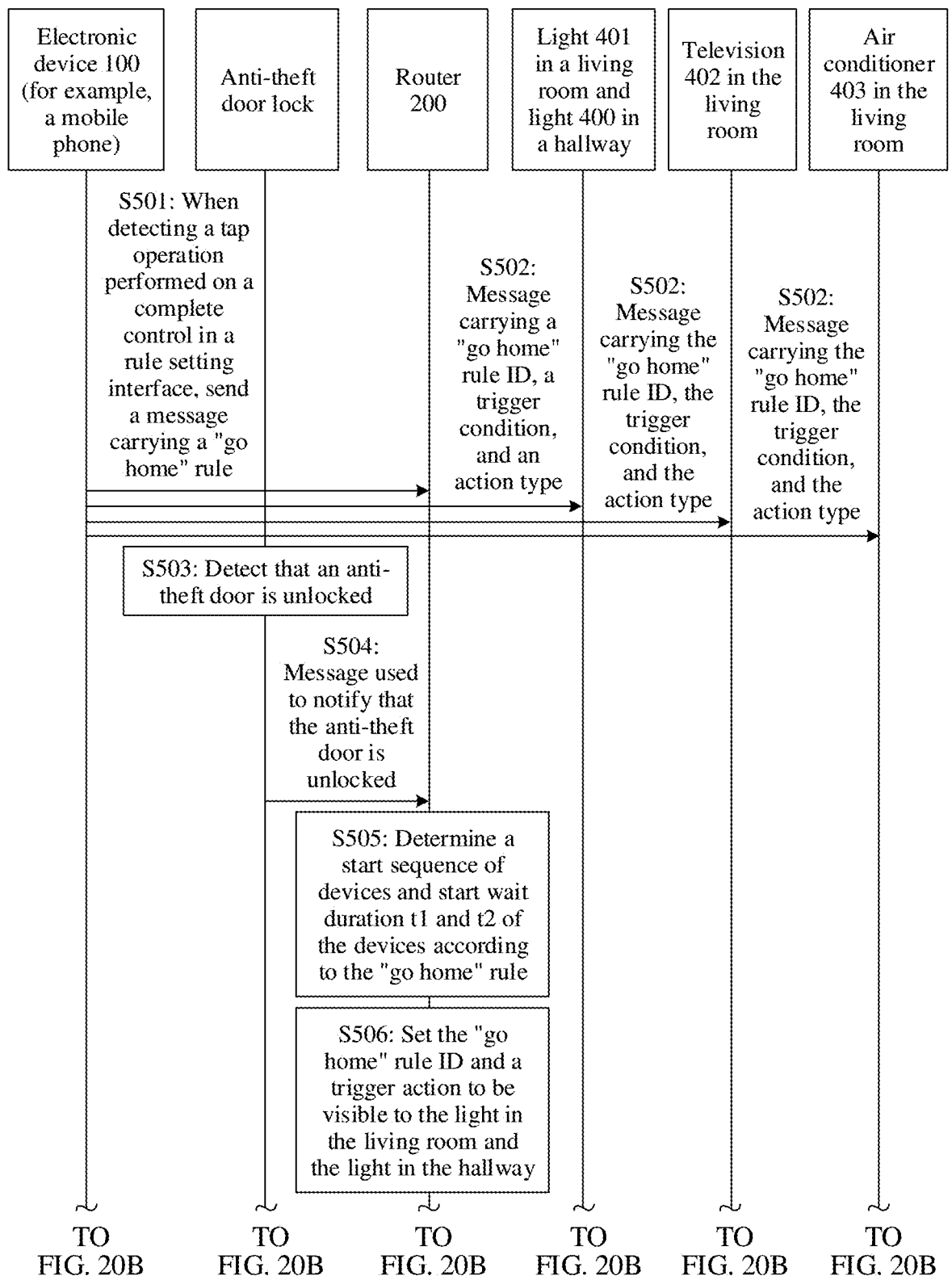
FIG. 20A to FIG. 20C are a schematic flowchart of a device control method according to an embodiment of this application.
Figure 20B:
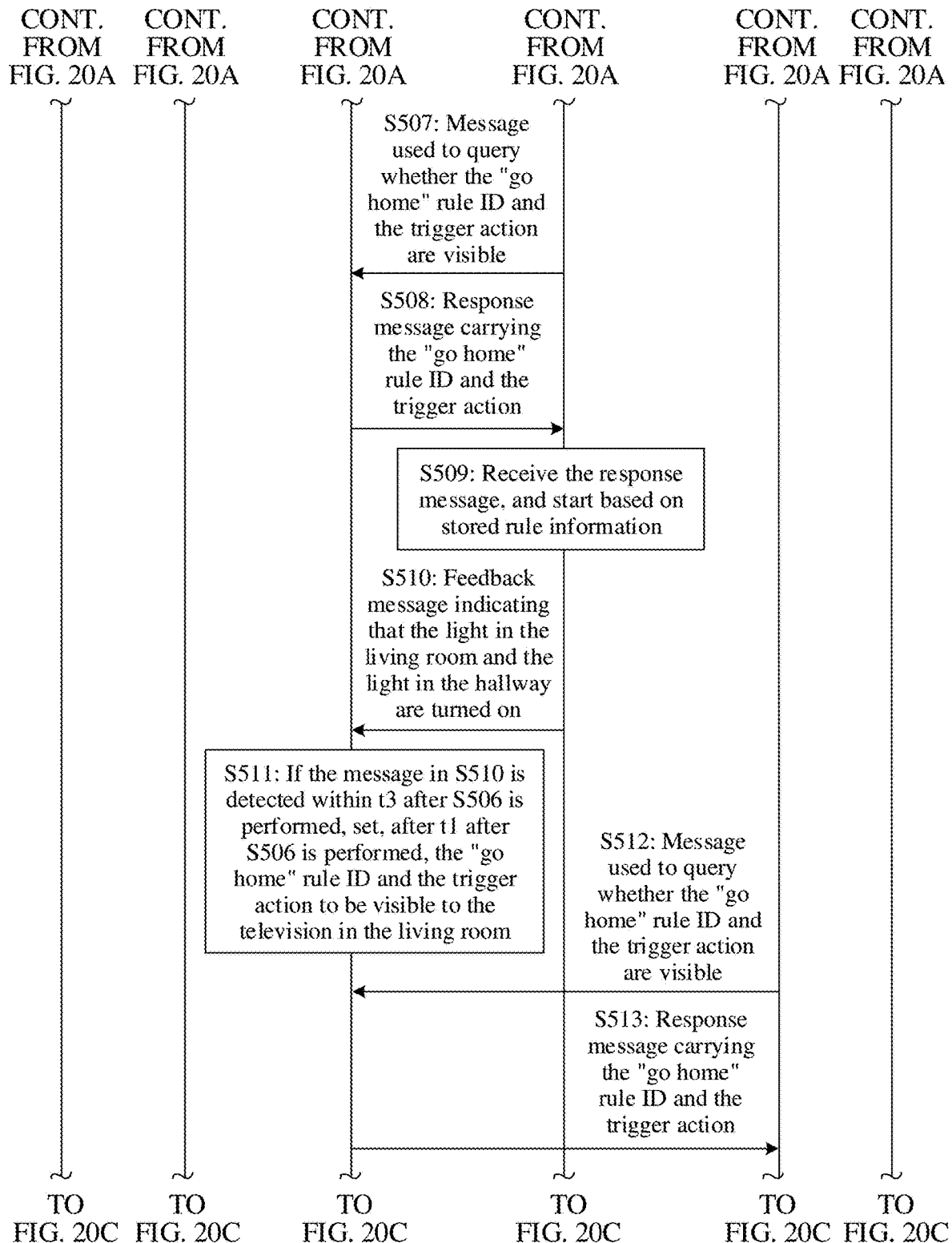
Figure 20C:
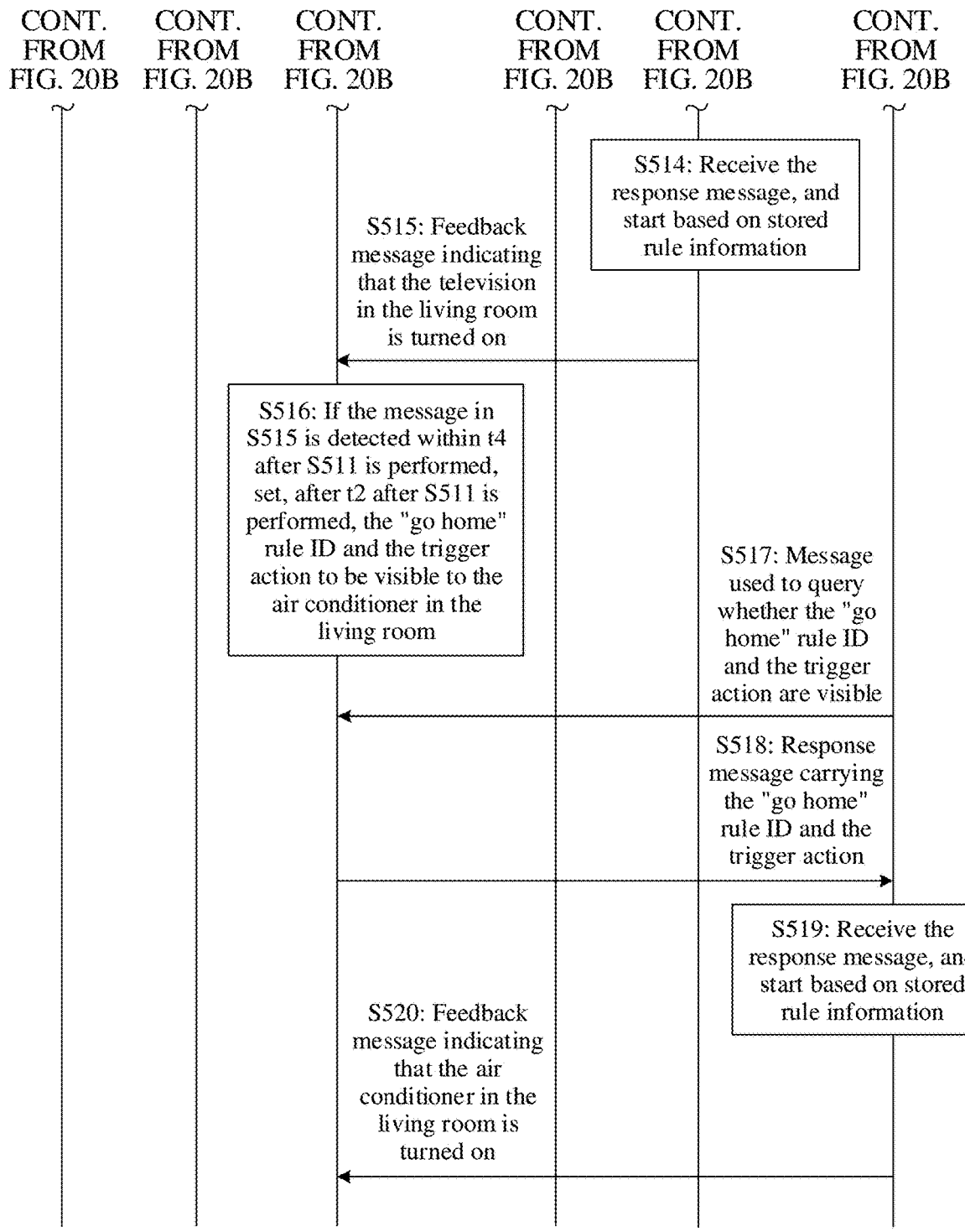

(2) The Pull Type is as Follows:

FIG. 20A to FIG. 20C are a schematic flowchart of a device control method according to an embodiment of this application. As shown in FIG. 20A to FIG. 20C, the device control method includes steps S501 to S520.

For descriptions in steps S501 to S502 in FIG. 20A to FIG. 20C, refer to specific descriptions in steps S201 to S202 in the example shown in FIG. 17A and FIG. 17B. Details are not described herein again. The "go home" rule is sent by the electronic device to the router for storage, and a trigger condition for the "go home" rule is: When an anti-theft door is unlocked for entrance. Tasks to be executed according to the rule are sequentially turning on a light in a living room and a light in a hallway, a television in the living room, and an air conditioner in the living room in a staggered manner.

S503: An anti-theft door lock detects that the anti-theft door is unlocked.

S504: The anti-theft door lock sends, to the router, a message used to notify that the anti-theft door is unlocked.

For descriptions in steps S505 in FIG. 20A to FIG. 20C, refer to specific descriptions in steps S405 in the example shown in FIG. 19A to FIG. 19C. Details are not described herein again.

For descriptions in steps S506 to S509 in FIG. 20A to FIG. 20C, refer to specific descriptions in steps S307 to S310 in the example shown in FIG. 18A to FIG. 18C. Details are not described herein again. A difference is that it is the router that the light in the living room (the light in the hallway) exchanges a message with.

S510: The light in the living room sends, to the router, a feedback message indicating that the light in the living room is turned on. The light in the hallway sends, to the router, a feedback message indicating that the light in the hallway is turned on.

S511: If the message in S510 is detected within t3 after S506 is performed, set, after t1 after S506 is performed, the "go home" rule ID and the trigger action to be visible to the television in the living room.

For example, t3 is 1 second, and t1 is 500 milliseconds. After the router separately sets the "go home" rule to be visible to the light in the living room and the light in the hallway, if the router receives, within 100 ms after the "go home" rule is set to be visible, the feedback message indicating that the light in the living room is turned on, and receives, within 150 ms after the "go home" rule is set to be visible, the feedback message indicating that the light in the hallway is turned on, the router sets, after 500 milliseconds after the "go home" rule ID and the trigger action are set to be visible to the light in the living room and the light in the hallway, the "go home" rule ID and the trigger action to be visible to the television in the living room.

If the router still does not receive, after t3 (for example, 1 second) after step S506 is performed, the feedback message indicating that the light in the living room is turned on, the router waits for t5. If the router receives, in a waiting process, the feedback message indicating that the light in the living room is turned on, the router sets, after t1 (for example, 500 milliseconds) after the feedback message indicating that the light in the living room is turned on is received, the "go home" rule ID and the trigger action to be visible to the television in the living room. If the router still does not receive, after t5, the feedback message indicating that the light in the living room is turned on, the router may immediately set the "go home" rule ID and the trigger action to be visible to the television in the living room. In addition, the router may send, to the electronic device, a message prompting "Turn-on of the light in the living room is abnormal". After receiving the message, the electronic device displays a prompt message: Turn-on of the light in the living room is abnormal, please check.

Steps S512 to S520, namely, processes of turning on the television in the living room and the air conditioner in the living room may be similar to processes of turning on the light in the living room and the light in the hallway. Details are not described herein again.

3. The "go Home" Rule is Decomposed and Deployed on Each Smart Home Device.

Figure 21A:
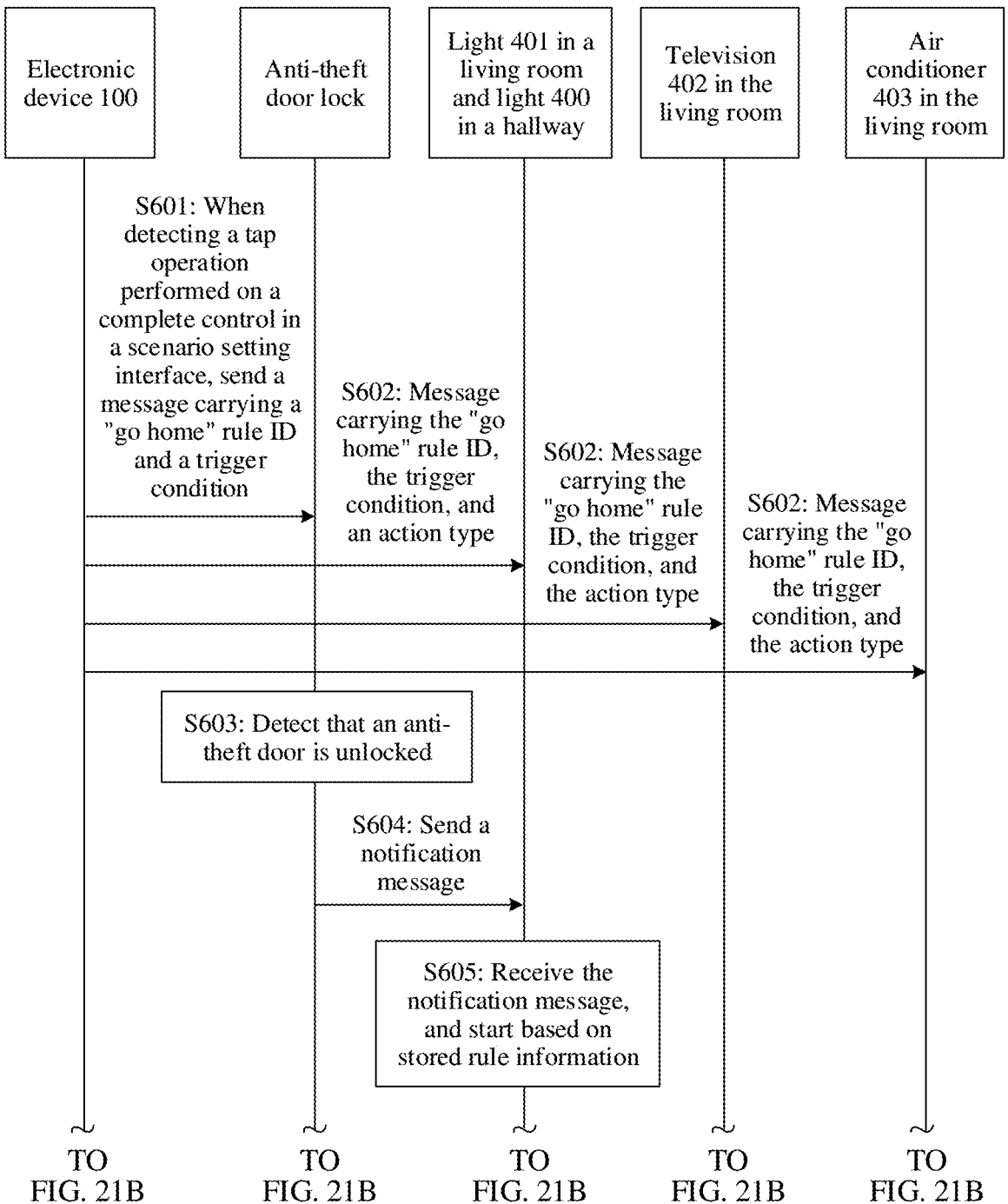
FIG. 21A and FIG. 21B are a schematic flowchart of a device control method according to an embodiment of this application.
Figure 21B:
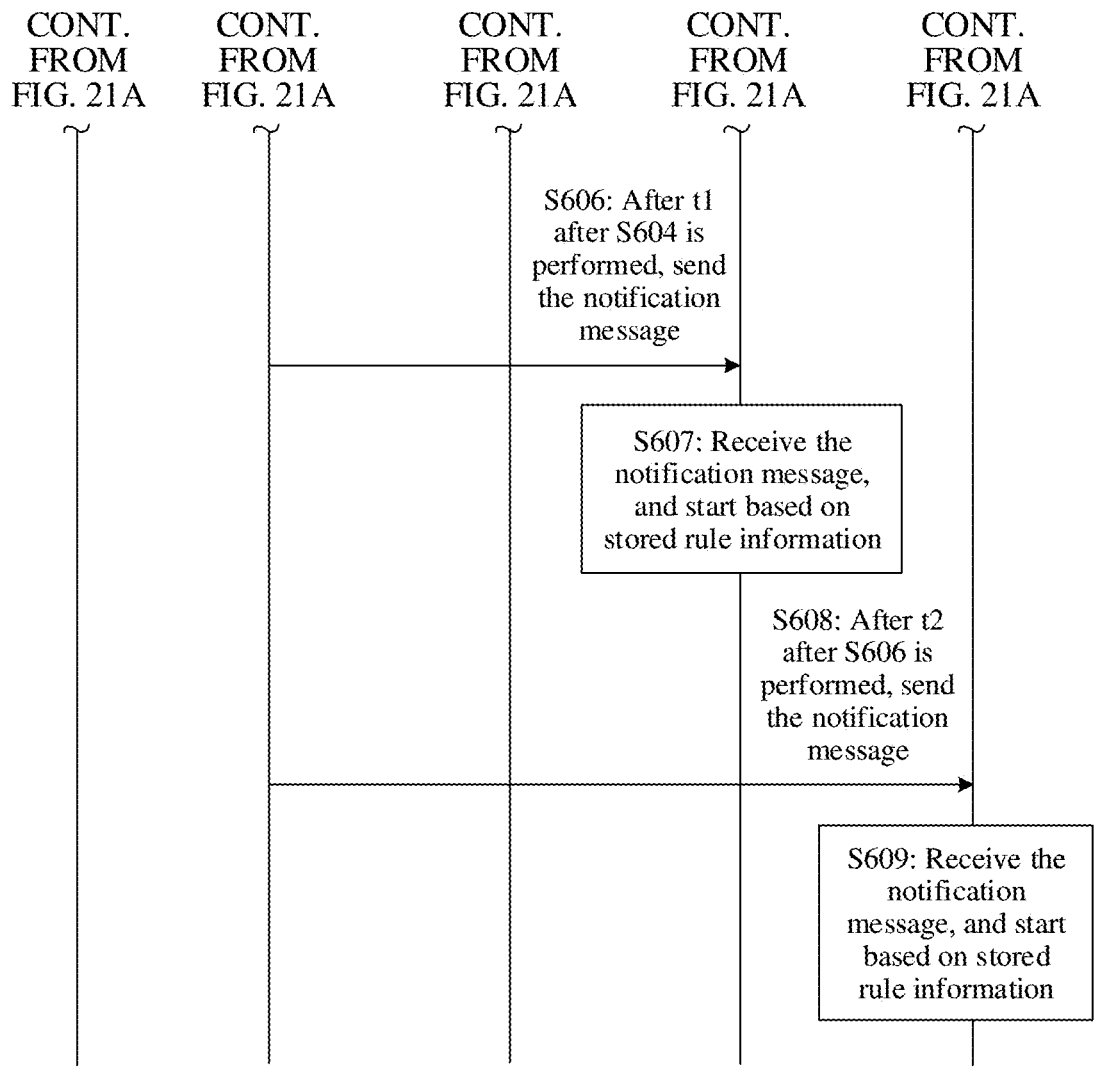

FIG. 21A and FIG. 21B are a schematic flowchart of a device control method according to an embodiment of this application. As shown in FIG. 21A and FIG. 21B, the device control method includes steps S601 to S609.

In this embodiment of this application, an electronic device may send a message to each smart home device through a router. In some other embodiments of this application, the electronic device may send a message to each smart home device through a server and a router. A trigger condition for a "go home" rule is: When an anti-theft door is unlocked for entrance. Tasks to be executed according to the rule are sequentially turning on a light in a living room and a light in a hallway, a television in the living room, and an air conditioner in the living room in a staggered manner.

S601: When detecting a tap operation performed on a complete control in a scenario setting interface, the electronic device sends, to an anti-theft door lock, a message carrying a "go home" rule ID and a trigger condition.

S602: The electronic device sends, to each smart home device, a message carrying the "go home" rule ID, the trigger condition, and an action type.

S603: The anti-theft door lock detects that an anti-theft door is unlocked.

S604: The anti-theft door lock separately sends a notification message to the light in the living room and the light in the hallway.

The notification message may carry a prompt that the anti-theft door is unlocked, and the notification message further carries the "go home" rule ID and a trigger action.

The notification message sent by the anti-theft door lock to the light in the living room may be sent in a broadcast form, and the notification message sent to the light in the living room carries a device ID of the light in the living room. A device that receives the broadcast message needs to check whether the device ID is correct and then performs a start operation based on stored rule information.

In some other embodiments, the notification message sent by the anti-theft door lock to the light in the living room may alternatively be sent to only the light in the living room in a point-to-point form.

Similarly, the notification message sent by the anti-theft door lock to the light in the hallway and the following notification messages sent by the anti-theft door lock to the television in the living room and the air conditioner in the living room may also be sent in a broadcast form or in a point-to-point form. This is not limited in this embodiment of this application.

S605: The light in the living room receives the notification message, and is turned on based on stored rule information. The light in the hallway receives the notification message, and is turned on based on stored rule information.

Optionally, after receiving the notification message, the light in the living room may find a trigger action in the stored rule information based on the rule ID, and compare the stored trigger action with the trigger action in the notification message. If both the trigger actions are the same, the light in the living room is turned on. Similar comparison may be performed by the light in the hallway. If a comparison result is that both trigger actions are the same, the light in the hallway is turned on.

S606: After t1 after S604 is performed, the anti-theft door lock sends the notification message to the television in the living room.

The notification message may carry the prompt that the anti-theft door is unlocked, and the notification message further carries the "go home" rule ID and the trigger action.

S607: The television in the living room receives the notification message, and is turned on based on stored rule information.

S608: After t2 after S606 is performed, the anti-theft door lock sends the notification message to the air conditioner in the living room.

The notification message may carry the prompt that the anti-theft door is unlocked, and the notification message further carries the "go home" rule ID and the trigger action.

S609: The air conditioner in the living room receives the notification message, and is turned on based on stored rule information.

In some embodiments of this application, the start delay duration t1 and t2 may be determined by the electronic device and carried in the "go home" rule. The electronic device may use the message in step S601 to carry t1 and t2, and send the message to the anti-theft door lock. The anti-theft door lock performs steps S606 and S608 based on t1 and t2.

In some other embodiments of this application, in S602, the electronic device may alternatively use a message to carry the start delay duration t1 and send the message to the television in the living room, and use a message to carry t1 and t2 and send the message to the air conditioner in the living room. Then, when detecting that the anti-theft door is unlocked, the anti-theft door lock simultaneously sends the notification messages to the light in the living room, the light in the hallway, the television in the living room, and the air conditioner in the living room. After each receiving the notification message, the light in the living room and the light in the hallway are turned on immediately. Alternatively, the light in the living room and the light in the hallway each immediately compare the rule ID and the trigger action in the notification message; and if a comparison succeeds, the light in the living room and the light in the hallway are turned on. After receiving the notification message, the television in the living room is turned on after a delay of t1. Alternatively, the television in the living room compares the rule ID and the trigger action in the notification message after a delay of t1; and if a comparison succeeds, the television in the living room is turned on. After receiving the notification message, the air conditioner in the living room is turned on after a delay of t1+t2. Alternatively, the air conditioner in the living room compares the rule ID and the trigger action in the notification message after a delay of t1+t2; and if a comparison succeeds, the air conditioner in the living room is turned on.

Optionally, after the light in the living room is turned on, the light in the living room may send, to the air conditioner in the living room, a message used to notify that the light in the living room is turned on. After the light in the hallway is turned on, the light in the hallway may send, to the television in the living room, a message used to notify that the light in the hallway is turned on. If the television in the living room receives, from the light in the living room and the light in the hallway within a time period t1, the messages respectively used to notify that the light in the living room is turned on and the light in the hallway is turned on, the television in the living room is turned on after a delay of t1 after the television in the living room receives the notification message from the anti-theft door lock. If the television in the living room does not receive, from the light in the hallway within a time period t1 (for example, 500 milliseconds), a message used to notify that the light in the hallway is turned on, the television in the living room may wait for t3 (for example, 1 second), and the television in the living room is not turned on after a delay of 500 milliseconds until the television in the living room receives, from the light in the hallway, the message used to notify that the light in the hallway is turned on. After the television in the living room is turned on, the television in the living room may send, to the air conditioner in the living room, a message used to notify that the television in the living room is turned on. If the air conditioner in the living room receives, from the television in the living room within a time period t2, the message used to notify that the television in the living room is turned on, the air conditioner in the living room is turned on after a delay of t2 after the air conditioner in the living room receives the notification message from the anti-theft door lock.

In some embodiments of this application, the "go home" rule may alternatively be stored on the anti-theft door lock. The electronic device detects the tap operation performed on the complete control in the scenario setting interface, and sends, to the anti-theft door lock, the message carrying the "go home" rule. Then, each smart home device may passively receive (a push type) or actively obtain (a pull type), from the anti-theft door lock, the message carrying the "go home" rule ID and the trigger action. Like the descriptions in the embodiments shown in FIG. 17A and FIG. 17B, and FIG. 18A to FIG. 18C, however, it is the anti-theft door lock that the light in the living room, the light in the hallway, the television in the living room, and the air conditioner in the living room each exchange a message with.

In some embodiments of this application, the electronic device 100, the smart home device, and the server 300 each include a chip that supports 5G communication. In the embodiments shown in FIG. 17A and FIG. 17B, and FIG. 18A to FIG. 18C, a message does not need to be forwarded by the router 200, but may be directly exchanged by the server with each smart home device. In the embodiments shown in FIG. 21A and FIG. 21B, and FIG. 22A and FIG. 22B, a message does not need to be forwarded by the router 200, but may be directly exchanged by the electronic device with each smart home device.

In some embodiments of this application, the "go home" rule may alternatively be stored on the electronic device. For example, when a trigger condition for the rule, namely, a tap operation performed by a user on a "go home" control 2052-a, is detected, the electronic device first sends, to the light in the living room and the light in the hallway according to the "go home" rule, a message carrying a start instruction. The light in the living room and the light in the hallway are turned on after receiving the message carrying the start instruction. Then, after sending the message to the light in the living room, the electronic device sends, to the television in the living room after a delay of a time period (for example, 5 milliseconds), the message carrying the start instruction. The television in the living room is turned on after receiving the message carrying the start instruction. Finally, after sending the message to the television in the living room, the electronic device sends, to the air conditioner in the living room after a delay of a time period (for example, 30 milliseconds), the message carrying the start instruction. The air conditioner in the living room is turned on after receiving the message carrying the start instruction.

In some embodiments of this application, when a smart home system executes the "go home" rule, for example, when it is detected that the anti-theft door is unlocked, if there is another rule that is executed at the same time, the server, the router, or the smart home device may detect, based on device tasks corresponding to the "go home" rule and the another rule, whether a surge current generated in these device tasks exceeds a preset threshold (for example, 27 A). If a surge current generated in these device tasks exceeds a preset threshold, the server, the router, or the smart home device may execute the device tasks in a staggered manner instead of being executed simultaneously.

For example, the "go home" rule is stored on the server, and a trigger condition for the "go home" rule is: When an anti-theft door is unlocked for entrance. In addition, when the anti-theft door is unlocked for entrance, another rule T is also triggered. Tasks to be executed according to the rule T are closing a smart window, turning on a smart speaker, and decreasing an operating temperature of a smart refrigerator by 5 degrees Celsius. The tasks corresponding to the rule T are not executed in sequence, but executed simultaneously. When the server detects that the anti-theft door is unlocked, trigger conditions for both the "go home" rule and the rule T are satisfied. For the "go home" rule, the server needs to immediately turn on the light in the living room and the light in the hallway by exchanging messages. For the rule T, the server needs to immediately execute the following tasks: Close the smart window, turn on the smart speaker, and decrease the operating temperature of the smart refrigerator by 5 degrees Celsius. In this case, the server determines that the tasks to be executed simultaneously are turning on the light in the living room and the light in the hallway, closing the smart window, turning on the smart speaker, and decreasing the operating temperature of the smart refrigerator by 5 degrees Celsius. If the server detects that a surge current in these tasks is greater than the preset threshold 27 A, the server may execute the tasks in a staggered manner: Turn on the light in the living room and the light in the hallway, close the smart window, turn on the smart speaker, and decrease the operating temperature of the smart refrigerator by 5 degrees Celsius. After completing the tasks, the server may execute remaining tasks corresponding to the "go home" rule, and turn on the television in the living room after a delay of t1. Then, the server turns on the air conditioner in the living room after a delay of t2.

For the tasks executed by the server in the staggered manner, an execution sequence of turning on the light in the living room and the light in the hallway, closing the smart window, turning on the smart speaker, and decreasing the operating temperature of the smart refrigerator by 5 degrees Celsius may be randomly determined by the server. The execution sequence may be further determined based on a magnitude of a surge current, or may be determined based on a user habit obtained by training collected data. This is not limited in this embodiment of this application. The surge current may be an empirical value or a measurement value. Start wait duration of each smart home device may be a fixed value, may be determined based on duration of a surge, or may be determined based on impact duration of a surge.

The foregoing descriptions are provided by using the example in which the "go home" rule and the rule T are stored on the server. It may be understood that the rules stored on the router or the smart home device may be executed in a similar way.

In a process in which the smart home system executes a rule, the system may further detect whether a surge current is excessively high during execution of a plurality of rules, and execute device tasks in a staggered manner when a surge current may be excessively high, to further reduce harm caused by the surge current to smart home devices and cables, and improve safety of the smart home system.

In some embodiments of this application, in a phase in which the electronic device sets a rule, the "go home" rule includes the trigger condition for the rule and device tasks. Execution wait duration of each smart home device and an execution sequence of a plurality of device tasks are determined by the server or the router. For example, when the electronic device sets a rule, according to the "go home" rule, after step S111 in the example shown in FIG. 8A and FIG. 8B is performed, the electronic device displays a scenario name setting interface 80, and performs steps S123 and S124. A trigger condition for the rule is: When a manual tap is performed. Device tasks corresponding to the rule are turning on the light in the living room, an air purifier, the air conditioner in the living room, the light in the hallway, and the television in the living room. The rule may be sent by the electronic device to the server, and the server stores and executes the rule. Specifically, in a rule execution phase, after the server receives a message used to notify that the condition is triggered, the server determines an execution sequence of the device tasks and execution wait duration of each smart home device. For example, the server may determine the execution sequence of the device tasks based on one or more of the following: surge currents of a plurality of device tasks, duration of a surge in each of the plurality of device tasks, impact duration of the surge in each of the plurality of device tasks, and a sequence of smart home device tasks that is historically set and obtained through statistics collection. The server determines that the execution sequence of the device tasks is sequentially turning on the light in the living room and the light in the hallway, the television in the living room, the air purifier, and the air conditioner in the living room. The server determines the execution wait duration of each smart home device based on one or more of the following: duration of a surge in each of a plurality of device tasks, impact duration of the surge in each of the plurality of device tasks, and a preset value set by the server. The server determines that the execution wait duration of the smart home devices is as follows: Immediately turn on the light in the living room and the light in the hallway, wait for 100 ms to turn on the television in the living room, wait for 100 ms to start the air purifier, and wait for 75 ms to turn on the air conditioner in the living room. Then, the server sends, to each smart home device according to a pull policy or a push policy, a message used to notify that the smart home device is started. For details of the pull policy and the push policy, refer to the descriptions in the examples shown in FIG. 17A and FIG. 17B, and FIG. 18A to FIG. 18C.

Figure 22A:
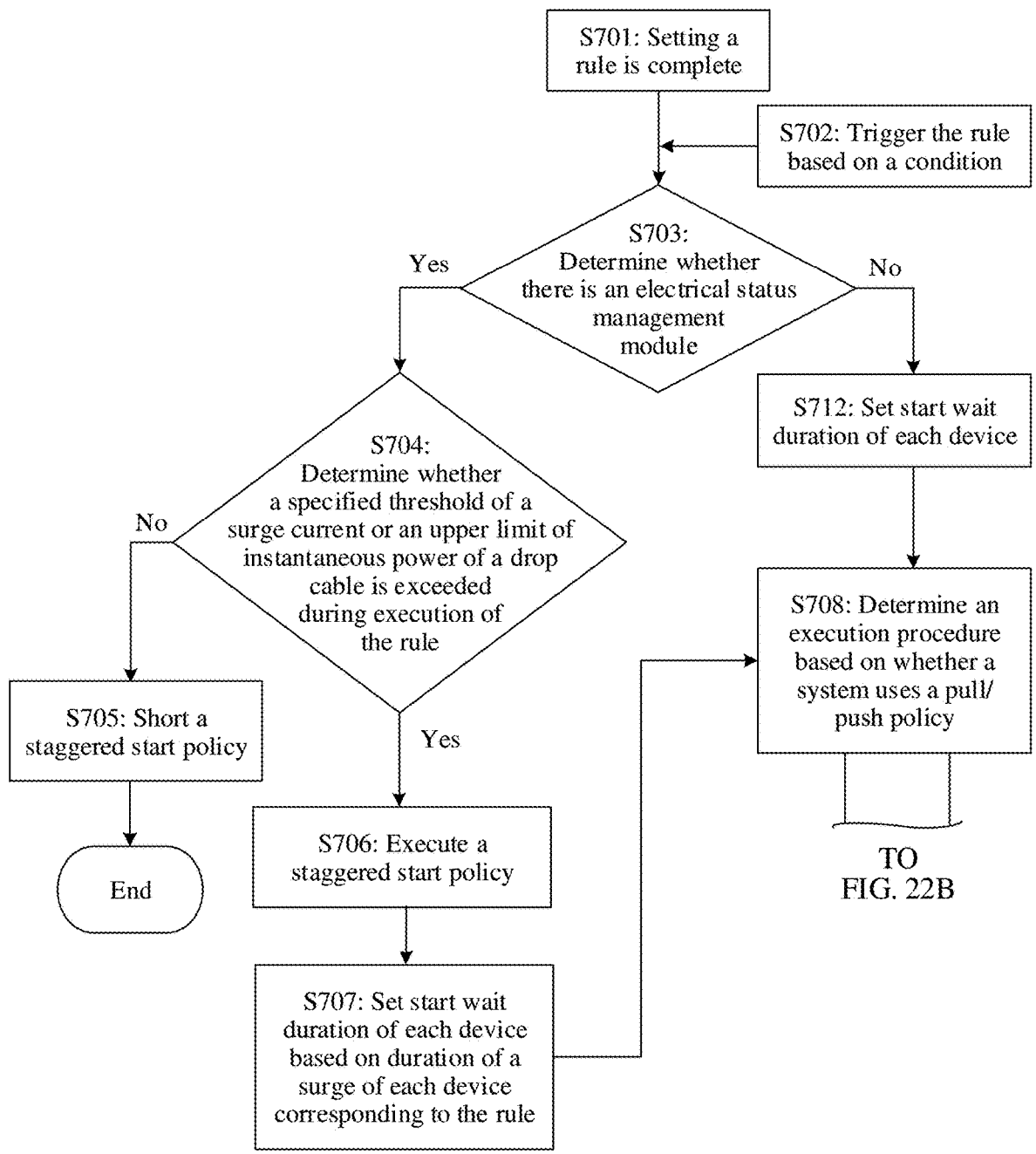
FIG. 22A and FIG. 22B are a schematic flowchart of a device control method according to an embodiment of this application.
Figure 22B:
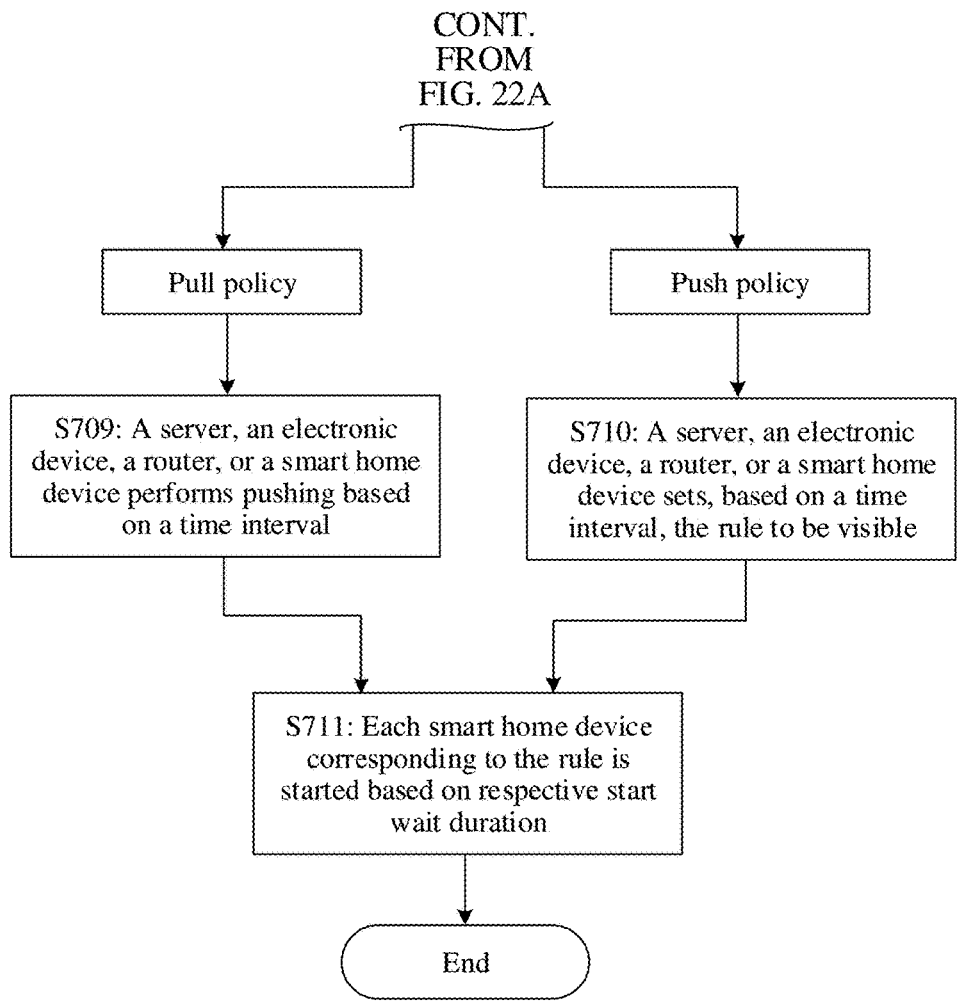

FIG. 22A and FIG. 22B are a schematic flowchart of a device control method according to an embodiment of this application. As shown in FIG. 22A and FIG. 22B, the device control method includes steps S701 to S712.

S701: Setting a rule is complete. For a rule setting process, refer to the descriptions in the example shown in FIG. 8A and FIG. 8B.

S702: Trigger the rule based on a condition.

For example, triggering the rule based on a condition may be that an electronic device 100 detects a tap operation performed on a "go home" control 2052-a in step S203.

S703: A smart home system determines whether there is an electrical status management module.

The electrical status management module may be implemented in the electronic device, a server, a router, or a smart home device. The electrical status management module may obtain, from a smart meter, corresponding surge parameters such as duration of a surge and a value of a surge current of each smart home device when the smart home device is started for a plurality of times.

If the smart home system determines that there is the electrical status management module, the smart home system performs step S704. If the smart home system determines that there is no electrical status management module, the smart home system performs step S712.

S704: The smart home system determines whether a specified threshold of a surge current or an upper limit of instantaneous power of a drop cable is exceeded during execution of the rule.

If the smart home system determines that the specified threshold of the surge current or the upper limit of the instantaneous power of the drop cable is not exceeded during execution of the rule, step S705 is performed. If the smart home system determines that the specified threshold of the surge current or the upper limit of the instantaneous power of the drop cable is exceeded during execution of the rule, step S706 is performed.

S712: Set start wait duration of each device.

Step S712 may be performed by the electronic device, the server, the router, or the smart home device. The start wait duration of each smart home device may be a preset value. The preset value may be an empirical value or a measurement value. For details, refer to the descriptions in step S113 in the example in FIG. 8A and FIG. 8B.

S705: Short a staggered start policy.

Shorting the staggered start policy means that staggered start is not performed and all smart home devices corresponding to the rule are directly started simultaneously.

S706: Execute a staggered start policy.

For a process of executing the staggered start policy, refer to steps S707 to S711.

S707: Set start wait duration of each device based on duration of a surge of each device corresponding to the rule.

Step S707 may be performed by the electronic device, the server, the router, or the smart home device. For details, refer to specific descriptions shown in FIG. 17A and FIG. 17B to FIG. 21A and FIG. 21B. Details are not described herein again.

S708: Determine an execution procedure based on whether the system uses a pull/push policy.

S709: The server, the electronic device, the router, or the smart home device performs pushing based on a time interval.

S710: The server, the electronic device, the router, or the smart home device sets, based on the time interval, the rule to be visible.

For specific descriptions of the pull policy and the push policy used by the server, the electronic device, the router, or the smart home device, refer to specific descriptions shown in FIG. 17A and FIG. 17B to FIG. 21A and FIG. 21B. Details are not described herein again.

S711: Each smart home device corresponding to the rule is started based on respective start wait duration.

Figure 23A:
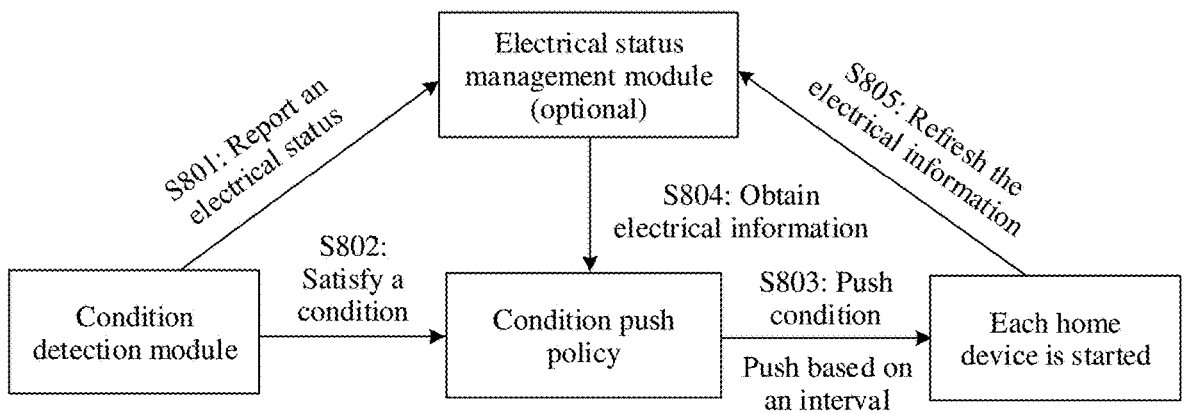
FIG. 23*a* is a schematic flowchart of a push policy according to an embodiment of this application.
Figure 23B:
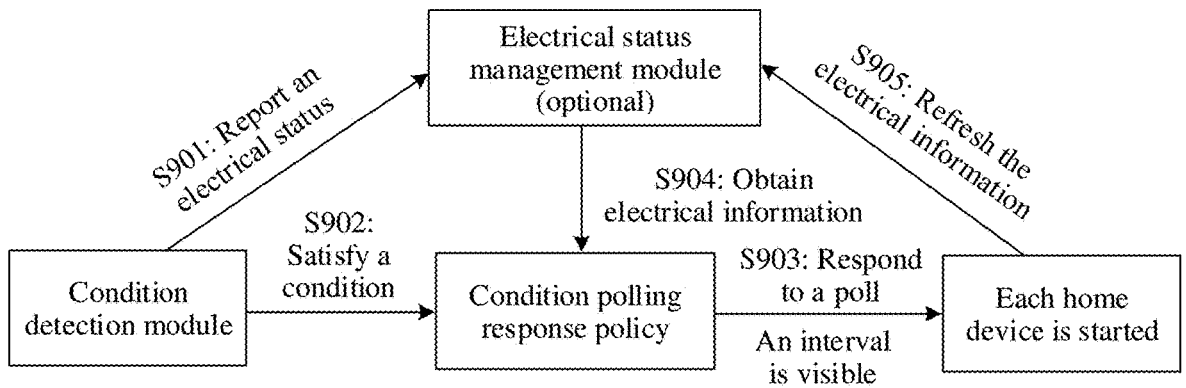
FIG. 23*b* is a schematic flowchart of a pull policy according to an embodiment of this application.

The following separately shows schematic flowcharts corresponding to a push policy and a pull policy. FIG. 23a is a schematic flowchart of a push policy according to an embodiment of this application. FIG. 23b is a schematic flowchart of a pull policy according to an embodiment of this application.

In FIG. 23a and FIG. 23b, an electrical status management module may be implemented in an electronic device, a server, a router, or a smart home device, and a condition detection module and a condition push policy may also be implemented in the electronic device, the server, the router, or the smart home device. This is not limited in the embodiments of this application.

As shown in FIG. 23a, a procedure of the push policy includes steps S801 to S805.

S801: If the condition detection module detects that a condition is satisfied, the condition detection module reports an electrical status to the electrical status management module.

Electrical status reporting is used to notify the electrical status management module to collect electrical information (that is, surge parameters such as a surge current and duration of a surge) of each smart home device.

Optionally, if there is no electrical status management module in a smart home system, an electrical status does not need to be reported, and start wait duration of each smart home device may be set based on a preset value.

S802: After detecting that the condition is satisfied, the condition detection module determines a condition push policy.

An example of the condition push policy is the "go home" rule in FIG. 17A and FIG. 17B to FIG. 22A and FIG. 22B. The condition push policy may include a start sequence, start wait duration, and the like of each smart home device. The start wait duration may be determined based on electrical information (that is, surge parameters such as a surge current and duration of a surge) described in step S804.

S803: Execute a push condition according to the condition push policy, and push a start message to each smart home device based on an interval.

The interval corresponds to the start wait duration of each smart home device. For details, refer to the examples in FIG. 17A and FIG. 17B to FIG. 22A and FIG. 22B.

S804: Obtain the electrical information.

A device that obtains the electrical information may be a device that stores the condition push policy, for example, the electronic device, the server, the router, or the smart home device. The electrical information is surge parameters such as a surge current and duration of a surge, and is used to determine the start sequence and the start wait duration of each smart home device.

S805: Refresh the electrical information after each smart home device is started.

Electrical information refreshing may be actively obtained by the electrical status management module from each smart home device, or may be actively reported by each smart home device. After each home device is started, surge parameters such as a surge current and duration of a surge are sent to the electrical status management module.

As shown in FIG. 23b, a procedure of the pull policy includes steps S901 to S905.

A condition polling module may be implemented in a smart home device. A condition polling response policy may also be implemented on an electronic device, a server, a router, or a smart home device.

For steps S901, S902, S904, and S905, respectively refer to the descriptions in steps S801, S802, S804, and S805 in FIG. 23a.

S903: Respond to a poll according to the condition polling response policy, where an interval is set to be visible to each smart home device.

The interval corresponds to the start wait duration of each smart home device. For details, refer to the examples in FIG. 17A and FIG. 17B to FIG. 22A and FIG. 22B. Each smart home device may periodically poll the server or the router about whether the smart home device is to be started. The server or the router may set, based on start wait duration of each smart home device, whether a message for the start is visible to each smart home device. For specific descriptions, refer to the examples described in FIG. 18A to FIG. 18C, and FIG. 20A to FIG. 20C. Details are not described herein again.

Based on some of the foregoing embodiments, the following describes a device control method provided in this application.

Figure 24:
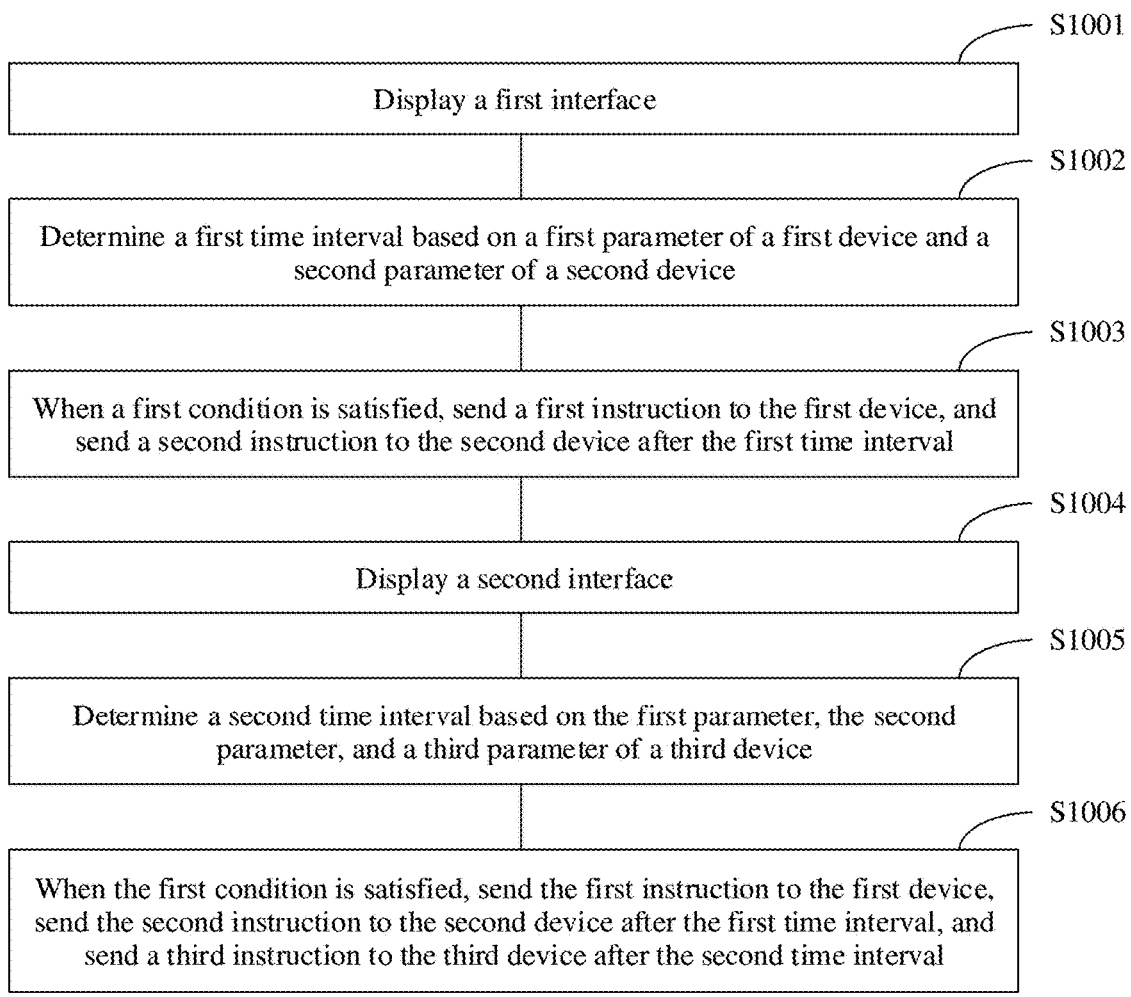
FIG. 24 is a schematic flowchart of a device control method according to an embodiment of this application.

FIG. 24 is a schematic flowchart of a device control method according to an embodiment of this application. An example shown in FIG. 24 is performed by an electronic device. The electronic device may be the electronic device 100 in the system shown in FIG. 1 or the electronic device shown in FIG. 2. The method includes the following steps.

S1001: Display a first interface.

The first interface includes a first condition, a name of a first device, and a name of a second device.

In this embodiment of this application, the first interface may be the scenario setting interface 30 shown in FIG. 10B. For example, the first condition is, for example, "when a manual tap is performed" or "when a door is unlocked for entrance". The name of the first device and the name of the second device correspond to a plurality of device task identifiers 3023 in the scenario setting interface 30. For example, the name of the first device is a light in a living room, and the name of the second device is an air conditioner in the living room.

S1002: Determine a first time interval based on a first parameter of the first device and a second parameter of the second device.

The first parameter is related to a first surge current of the first device, and the second parameter is related to a second surge current of the second device.

Optionally, determining the first time interval based on the first parameter of the first device and the second parameter of the second device may be specifically implemented as: determining whether a superposition of the first surge current and the second surge current is greater than or equal to a first threshold. When the superposition of the first surge current and the second surge current is less than the first threshold, a time interval between a moment for sending a first instruction and a moment for sending a second instruction is set as the first time interval.

An electronic device may determine whether the superposition of the first surge current and the second surge current is greater than or equal to the first threshold, and then send a determining result to a server; and the server determines the first time interval based on the determining result. Alternatively, an electronic device may perform the determining step, then determine the first time interval, and send the first time interval to a server. Alternatively, a server may determine whether the superposition of the first surge current and the second surge current is greater than or equal to the first threshold, and then determine the first time interval based on a determining result.

The superposition of the first surge current and the second surge current is a superposition of peak values of the surge currents, or may be a superposition of valid values of the surge currents.

The first threshold may be the specified threshold described in step S113 in the example shown in FIG. 8A and FIG. 8B. The specified threshold may be determined based on maximum power or a rated current that can be supported by a drop cable, may be specified by a user on the electronic device, may be determined based on a trip current of home electricity, or may be an empirical value.

The first surge current of the first device and the second surge current of the second device each may be a preset value. The preset value may be an empirical value or a measurement value. For details, refer to the descriptions in step S113. All of the first surge current, the second surge current, and the first threshold may be stored on the electronic device, or may be stored on the server. Alternatively, the first surge current may be determined in the following manner: A smart meter collects surge currents when the first device in the smart home system is started for several latest times (for example, 100 times); and the electronic device or the server calculates an average value of the surge currents that are collected when the first device is started for the latest 100 times, and uses the average value as a value of the first surge current. A similar manner is used to determine the second surge current.

The first time interval is 0. When the server sends two instructions in sequence, there is a non-manual time interval, namely, the first time interval, between the two instructions.

Optionally, the first parameter may be a parameter determined based on the first surge current. For example, the first parameter may be a power value.

Optionally, the first parameter is used to represent a value of the first surge current. For example, Table 3 shows an example of mapping between a parameter and a surge current. The first parameter is determined based on Table 3 and the first surge current. The second parameter is determined based on Table 3 and the second surge current.

TABLE 3

Example of mapping between a parameter and a surge current

| Surge current (I) | Parameter (a) |
|---|---|
| 0 ≤ I ≤ 4 A | 1 |
| 4 A < I ≤ 10 A | 2 |
| 10 A < I ≤ 13 A | 3 |
| 13 A < I ≤ 15 A | 4 |
| 15 A < I ≤ 16 A | 5 |
| >16 A | 6 |

For example, if the first surge current is 5 A, and the second surge current is 12 A, the first surge current 5 A falls within the range 4 A<I≤10 A, and the second surge current 12 A falls within the range 10 A<I≤13 A. Based on the example of the mapping between a parameter and a surge current shown in Table 3, the first parameter is 2, and the second parameter is 3. Whether a superposition or a weighted sum of the first parameter and the second parameter exceeds a threshold 10 may be determined. If the superposition or the weighted sum of the first parameter and the second parameter does not exceed the threshold 10, the first time interval is set.

It may be understood that the foregoing example of a relationship between the first parameter and the first surge current and a relationship between the second parameter and the second surge current is merely used to explain this embodiment of this application. This is not limited in this embodiment of this application.

S1003: When a first condition is satisfied, send a first instruction to the first device, and send a second instruction to the second device after the first time interval.

The first instruction enables the first device to perform a first action, and the first action generates the first surge current. The second instruction enables the second device to perform a second action, and the second action generates the second surge current. For example, the first instruction may be the start instruction carried in the message in S1 in the example shown in FIG. 17A and FIG. 17B. The first action may be "on".

Optionally, the first condition is a first operation of the user, for example, a tap operation performed by the user on the "go home" control 2052-*a* in the example interface 20 shown in FIG. 12C. Alternatively, the first condition may be that a first message from a fourth device is detected. For example, a first message from an intelligent door lock is detected, and the first message is used to notify that a door with the intelligent door lock is unlocked for entrance.

In step S1003, the first instruction and the second instruction may be sent by the server. Specifically, when the first condition is satisfied, a fourth instruction is sent to the server. When receiving the fourth instruction, the server sends the first instruction to the first device, and sends the second instruction to the second device after the first time interval. The fourth instruction may be sent by the electronic device to the server. For example, in the interface 20, when detecting the tap operation performed by the user on the "go home" control 2052-*a*, the electronic device sends the fourth instruction to the server. The fourth instruction may alternatively be sent by the fourth device to the server. For example, when detecting that a door is unlocked for entrance, the fourth device (the intelligent door lock) sends the fourth instruction to the server.

S1004: Display a second interface.

The second interface includes the first condition, the name of the first device, the name of the second device, and a name of a third device. The second interface and the first interface may be a same interface, for example, the scenario setting interface 30. Alternatively, the first interface may be different from the second interface. For example, the first interface is the scenario setting interface 30, and the second interface is the interface 70 shown in FIG. 10D or the interface 30 shown in FIG. 12C.

S1005: Determine a second time interval based on the first parameter, the second parameter, and a third parameter of the third device.

The third parameter is related to a third surge current of the third device. Descriptions of the third parameter and the third surge current may be similar to the descriptions of the first parameter and the first surge current in step S1002.

S1006: When the first condition is satisfied, send the first instruction to the first device, send the second instruction to the second device after the first time interval, and send a third instruction to the third device after the second time interval.

The third instruction enables the third device to perform a third action, and the third action generates the third surge current. The second time interval is greater than the first time interval.

Step S1005 may be specifically implemented as: determining whether a superposition of the first surge current, the second surge current, and the third surge current is greater than or equal to the first threshold; and when the superposition of the first surge current, the second surge current, and the third surge current is greater than or equal to the first threshold, setting a time interval between a moment for sending the second instruction and a moment for sending the third instruction as the second time interval.

Descriptions of the foregoing determining process may be similar to the specific descriptions of determining whether the superposition of the first surge current and the second surge current is greater than or equal to the first threshold in step S1002. Details are not described herein again.

The second time interval is determined based on one or more of the following: duration of a surge of the first device, duration of a surge of the second device, and duration of a surge of the third device; and impact duration of the surge of the first device, impact duration of the surge of the second device, and impact duration of the surge of the third device. For a specific determining process, refer to the descriptions of determining the start wait duration in S206 in the example described in FIG. 17A and FIG. 17B. Details are not described herein again.

Optionally, the duration of the surge of the first device, the duration of the surge of the second device, the duration of the surge of the third device, the impact duration of the surge of the first device, the impact duration of the surge of the second device, and the impact duration of the surge of the third device are obtained by the smart meter. The smart meter may periodically update these surge parameters based on actions of the first device and the second device.

Optionally, the duration of the surge of the first device, the duration of the surge of the second device, the duration of the surge of the third device, the impact duration of the surge of the first device, the impact duration of the surge of the second device, and the impact duration of the surge of the third device are all preset values, for example, empirical values shown in Table 2.

Optionally, the second time interval may be a first preset value, for example, fixed duration of 100 ms.

For example, when the electronic device detects that the first device (for example, a light in a living room) and the second device (for example, an air purifier) are started, and when a sum of surge currents does not exceed a specified threshold, the electronic device may set a time interval between start of the first device and start of the second device as the first time interval. Then, after start of the third device (for example, a television in the living room) is added, if a sum of surge currents generated in turn-on of the light in the living room, start of the air purifier, and turn-on of the television in the living room exceeds the specified threshold, the electronic device may set turn-on of the light in the living room and start of the air purifier as one group, and set turn-on of the television in the living room as one group after a timer-based delay. That turn-on of the light in the living room and start of the air purifier are set as one group means that a time interval between the two start actions is set as the first time interval. After instructions for turning on the light in the living room and turning on the air purifier are executed, the television in the living room is turned on after a timer-based delay of the second time interval.

Optionally, the devices to be started as the previous group are not limited to two devices (the first device and the second device) in the example, and may be more devices; and the device to be started as the latter group is also not limited to one device (the third device) in the example, and may be more devices.

In some embodiments of this application, the first interface further includes a first control; and before the determining a first time interval based on a first parameter of the first device and a second parameter of the second device, the method further includes: detecting a third operation performed by the user on the first control, where the first time interval is determined in response to the third operation based on the first parameter of the first device and the second parameter of the second device.

The first control is, for example, the complete control 303 in the scenario setting interface 30 shown in FIG. 10B.

In some embodiments of this application, the second interface further includes a second control; and before the determining a second time interval based on the first parameter, the second parameter, and a third parameter of the third device, the method further includes: detecting a fourth operation performed by the user on the second control, where the second time interval is determined based on the first parameter, the second parameter, and the third parameter of the third device in response to the fourth operation.

The second control is, for example, the complete control 303 in the scenario setting interface 30 shown in FIG. 12A or the option 1011 in the scenario setting interface 110A shown in FIG. 14.

An embodiment of this application further provides a system. The system includes an electronic device, a server, a first device, a second device, and a third device. The electronic device is configured to display a first interface, where the first interface includes a first condition, a name of the first device, and a name of the second device. The electronic device is further configured to determine a first time interval based on a first parameter of the first device and a second parameter of the second device, where the first parameter is related to a first surge current of the first device, and the second parameter is related to a second surge current of the second device.

The server is configured to: when a first condition is satisfied, send a first instruction to the first device, and send a second instruction to the second device after the first time interval.

The first device is configured to perform a first action when receiving the first instruction, where the first action generates the first surge current.

The second device is configured to perform a second action when receiving the second instruction, where the second action generates the second surge current.

The electronic device is further configured to display a second interface, where the second interface includes the first condition, the name of the first device, the name of the second device, and a name of the third device. The electronic device is further configured to determine a second time interval based on the first parameter, the second parameter, and a third parameter of the third device, where the third parameter is related to a third surge current of the third device.

The server is configured to: when the first condition is satisfied, send the first instruction to the first device, send the second instruction to the second device after the first time interval, and send a third instruction to the third device after the second time interval.

The third device is configured to perform a third action when receiving the third instruction, where the third action generates the third surge current. The second time interval is greater than the first time interval.

For the system, refer to the example described in FIG. 24. The system may be the smart home system shown in FIG. 1.

In the foregoing embodiments, all or some of the functions may be implemented by using software, hardware, or a combination of software and hardware. When software is used to implement the functions, all or some of the functions may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

A person of ordinary skill in the art may understand that all or some of the procedures of the methods in the foregoing embodiments may be implemented by a computer program instructing related hardware. The program may be stored in a computer-readable storage medium. When the program is executed, the processes of the methods in the embodiments may be performed. The foregoing storage medium includes any medium that can store program code, such as a ROM, a random access memory RAM, a magnetic disk, or an optical disc.

What is claimed is:

1. A method, comprising:
    displaying a first interface, wherein the first interface comprises a first condition, a name of a first device, and a name of a second device;
    determining a first time interval based on a first parameter of the first device and a second parameter of the second device, wherein the first parameter is related to a first surge current of the first device, and the second parameter is related to a second surge current of the second device;
    when the first interface is displayed, in response to the first condition being satisfied, sending a first instruction to the first device, and sending a second instruction to the second device after the first time interval, wherein the first instruction enables the first device to perform a first action, and the first action generates the first surge current, and wherein the second instruction enables the second device to perform a second action, and the second action generates the second surge current;
    displaying a second interface, wherein the second interface comprises the first condition, the name of the first device, the name of the second device, and a name of a third device;
    determining a second time interval based on the first parameter, the second parameter, and a third parameter of the third device, wherein the third parameter is related to a third surge current of the third device; and
    when the second interface is displayed, in response to the first condition being satisfied, sending the first instruction to the first device, sending the second instruction to the second device after the first time interval, and sending a third instruction to the third device after the second time interval, wherein the third instruction enables the third device to perform a third action, the third action generates the third surge current, and the second time interval is greater than the first time interval.

2. The method according to claim 1, wherein in response to the first condition being satisfied, sending the first instruction to the first device, and sending the second instruction to the second device after the first time interval, comprises:
    in response to the first condition being satisfied, sending a fourth instruction to a server; and
    in response to receiving the fourth instruction, sending, by the server, the first instruction to the first device, and sending the second instruction to the second device after the first time interval.

3. The method according to claim 1, wherein determining the second time interval based on the first parameter of the first device, the second parameter of the second device, and the third parameter of the third device comprises:
    determining whether a superposition of the first surge current, the second surge current, and the third surge current is greater than or equal to a first threshold; and
    in response to determining that the superposition of the first surge current, the second surge current, and the third surge current is greater than or equal to the first threshold, setting a time interval between a time for sending the second instruction and a time for sending the third instruction as the second time interval.

4. The method according to claim 1, wherein determining the first time interval based on the first parameter of the first device and the second parameter of the second device comprises:
  determining whether a superposition of the first surge current and the second surge current is greater than or equal to a first threshold; and
  in response to determining that the superposition of the first surge current and the second surge current is less than the first threshold, setting a time interval between a time for sending the first instruction and a time for sending the second instruction as the first time interval.

5. The method according to claim 1, wherein the second time interval is determined based on:
  a duration of the first surge current of the first device, a duration of the second surge current of the second device, and a duration of the third surge current of the third device; or
  an impact duration of the first surge current of the first device, an impact duration of the second surge current of the second device, and an impact duration of the third surge current of the third device.

6. The method according to claim 5, wherein the duration of the first surge current of the first device, the duration of the second surge current of the second device, the duration of the third surge current of the third device, the impact duration of the first surge current of the first device, the impact duration of the second surge current of the second device, and the impact duration of the third surge current of the third device, are obtained by a smart meter.

7. The method according to claim 1, wherein the second time interval is a first preset value.

8. The method according to claim 1, wherein the first time interval is zero (o).

9. The method according to claim 1, wherein the first condition is a first operation of a user, or the first condition is a first message from a fourth device being detected.

10. The method according to claim 1, wherein the first interface further comprises a first control, and before determining the first time interval based on the first parameter of the first device and the second parameter of the second device, the method further comprises:
  detecting a third operation performed by a user on the first control, wherein the first time interval is determined in response to the third operation and based on the first parameter of the first device and the second parameter of the second device.

11. The method according to claim 1, wherein the second interface further comprises a second control, and before determining the second time interval based on the first parameter, the second parameter, and a third parameter of the third device, the method further comprises:
  detecting a fourth operation performed by a user on the second control, wherein the second time interval is determined in response to the fourth operation and based on the first parameter, the second parameter, and the third parameter of the third device.

12. An electronic device, comprising:
one or more processors; and
one or more memories;
  wherein the one or more memories are coupled to the one or more processors, the one or more memories are configured to store computer program code, the computer program code comprises computer instructions, and when the one or more processors execute the computer instructions, the electronic device is caused to:
    display a first interface, wherein the first interface comprises a first condition, a name of a first device, and a name of a second device;
    determine a first time interval based on a first parameter of the first device and a second parameter of the second device, wherein the first parameter is related to a first surge current of the first device, and the second parameter is related to a second surge current of the second device;
    when the first interface is displayed, in response to the first condition being satisfied, send a first instruction to the first device, and send a second instruction to the second device after the first time interval, wherein the first instruction enables the first device to perform a first action, and the first action generates the first surge current, and wherein the second instruction enables the second device to perform a second action, and the second action generates the second surge current;
    display a second interface, wherein the second interface comprises the first condition, the name of the first device, the name of the second device, and a name of a third device;
    determine a second time interval based on the first parameter, the second parameter, and a third parameter of the third device, wherein the third parameter is related to a third surge current of the third device; and
    when the second interface is displayed, in response to the first condition being satisfied, send the first instruction to the first device, send the second instruction to the second device after the first time interval, and send a third instruction to the third device after the second time interval, wherein the third instruction enables the third device to perform a third action, the third action generates the third surge current, and the second time interval is greater than the first time interval.

13. The electronic device according to claim 12, wherein determining the second time interval based on the first parameter of the first device, the second parameter of the second device, and the third parameter of the third device comprises:
  determining whether a superposition of the first surge current, the second surge current, and the third surge current is greater than or equal to a first threshold; and
  in response to determining that the superposition of the first surge current, the second surge current, and the third surge current is greater than or equal to the first threshold, setting a time interval between a time for sending the second instruction and a time for sending the third instruction as the second time interval.

14. The electronic device according to claim 12, wherein determining the first time interval based on the first parameter of the first device and the second parameter of the second device comprises:
  determining whether a superposition of the first surge current and the second surge current is greater than or equal to a first threshold; and
  in response to determining that the superposition of the first surge current and the second surge current is less than the first threshold, setting a time interval between a time for sending the first instruction and a time for sending the second instruction as the first time interval.

15. The electronic device according to claim 12, wherein the second time interval is determined based on:

a duration of the first surge current of the first device, a duration of the second surge current of the second device, and a duration of the third surge current of the third device; or an impact duration of the first surge current of the first device, an impact duration of the second surge current of the second device, and an impact duration of the third surge current of the third device.

16. A system, comprising:
an electronic device;
a server;
a first device;
a second device; and
a third device;
wherein the electronic device is configured to:
   display a first interface, wherein the first interface comprises a first condition, a name of the first device, and a name of the second device;
   determine a first time interval based on a first parameter of the first device and a second parameter of the second device, wherein the first parameter is related to a first surge current of the first device, and the second parameter is related to a second surge current of the second device;
wherein the server is configured to:
   in response to the first condition being satisfied, send a first instruction to the first device, and send a second instruction to the second device after the first time interval;
wherein the first device is configured to perform a first action in response to receiving the first instruction, wherein the first action generates the first surge current;
wherein the second device is configured to perform a second action in response to receiving the second instruction, wherein the second action generates the second surge current;
wherein the electronic device is further configured to:
   display a second interface, wherein the second interface comprises the first condition, the name of the first device, the name of the second device, and a name of the third device;
   determine a second time interval based on the first parameter, the second parameter, and a third parameter of the third device, wherein the third parameter is related to a third surge current of the third device;
wherein the server is configured to:
   in response to the first condition being satisfied, send the first instruction to the first device, send the second instruction to the second device after the first time interval, and send a third instruction to the third device after the second time interval; and
wherein the third device is configured to perform a third action in response to receiving the third instruction, wherein the third action generates the third surge current, and the second time interval is greater than the first time interval.

17. The system according to claim 16, wherein determining the second time interval based on the first parameter of the first device, the second parameter of the second device, and the third parameter of the third device comprises:
   determining whether a superposition of the first surge current, the second surge current, and the third surge current is greater than or equal to a first threshold; and
   in response to determining that the superposition of the first surge current, the second surge current, and the third surge current is greater than or equal to the first threshold, setting a time interval between a time for sending the second instruction and a time for sending the third instruction as the second time interval.

18. The system according to claim 16, wherein determining the first time interval based on the first parameter of the first device and the second parameter of the second device comprises:
   determining whether a superposition of the first surge current and the second surge current is greater than or equal to a first threshold; and
   in response to determining that the superposition of the first surge current and the second surge current is less than the first threshold, setting a time interval between a time for sending the first instruction and a time for sending the second instruction as the first time interval.

19. The system according to claim 16, wherein the second time interval is determined based on:
   a duration of the first surge current of the first device, a duration of the second surge current of the second device, and a duration of the third surge current of the third device; or
   an impact duration of the first surge current of the first device, an impact duration of the second surge current of the second device, and an impact duration of the third surge current of the third device.

* * * * *

UNITED STATES PATENT AND TRADEMARK OFFICE
CERTIFICATE OF CORRECTION

| | |
|---|---|
| PATENT NO. | : 12,068,880 B2 |
| APPLICATION NO. | : 17/427399 |
| DATED | : August 20, 2024 |
| INVENTOR(S) | : Shi et al. |

Page 1 of 1

It is certified that error appears in the above-identified patent and that said Letters Patent is hereby corrected as shown below:

In the Claims

In Column 67, in Claim 8, Line 34, delete "(o)." and insert -- (0). --.

Signed and Sealed this
Eleventh Day of March, 2025

Coke Morgan Stewart
*Acting Director of the United States Patent and Trademark Office*